(12) United States Patent
Hsueh et al.

(10) Patent No.: US 11,579,412 B2
(45) Date of Patent: Feb. 14, 2023

(54) PHOTOGRAPHING LENS ASSEMBLY, IMAGE CAPTURING UNIT AND ELECTRONIC DEVICE

(71) Applicant: LARGAN PRECISION CO., LTD., Taichung (TW)

(72) Inventors: Chun-Che Hsueh, Taichung (TW); Hung-Shuo Chen, Taichung (TW); Kuan Chun Wang, Taichung (TW); Wei-Yu Chen, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 401 days.

(21) Appl. No.: 16/744,424

(22) Filed: Jan. 16, 2020

(65) Prior Publication Data
US 2021/0149158 A1  May 20, 2021

(30) Foreign Application Priority Data

Nov. 15, 2019 (TW) ................. 108141586

(51) Int. Cl.
*G02B 3/02* (2006.01)
*G02B 13/18* (2006.01)
(Continued)

(52) U.S. Cl.
CPC ............ *G02B 13/0045* (2013.01); *G02B 9/64* (2013.01); *G02B 13/0015* (2013.01)

(58) Field of Classification Search
CPC ... G02B 9/64; G02B 13/0045; G02B 13/0015
(Continued)

(56) References Cited

U.S. PATENT DOCUMENTS 9,523,841 B1   12/2016  Chen
2018/0239117 A1   8/2018  Lee et al.
(Continued)

FOREIGN PATENT DOCUMENTS

CN    108227145 A    6/2018
CN    108254890 A    7/2018
(Continued)

OTHER PUBLICATIONS

TW Office Action in Application No. 108141586 dated Feb. 20, 2020.
(Continued)

*Primary Examiner* — Mahidere S Sahle
(74) *Attorney, Agent, or Firm* — Maschoff Brennan

(57) ABSTRACT

A photographing lens assembly includes a total of eight lens elements which are, in order from an object side to an image side: a first lens element, a second lens element, a third lens element, a fourth lens element, a fifth lens element, a sixth lens element, a seventh lens element and an eighth lens element. The first lens element with positive refractive power has an object-side surface being convex in a paraxial region thereof. The second lens element has negative refractive power. The eighth lens element with negative refractive power has an object-side surface being concave in a paraxial region thereof. At least one lens element of the photographing lens assembly has at least one lens surface having at least one inflection point.

17 Claims, 25 Drawing Sheets

(51) Int. Cl.
  *G02B 13/00* (2006.01)
  *G02B 9/64* (2006.01)
(58) Field of Classification Search
  USPC .................................................. 359/708, 754
  See application file for complete search history.

(56) References Cited

U.S. PATENT DOCUMENTS

| | | | |
|---|---|---|---|
| 2019/0101728 A1 | 4/2019 | Hsieh et al. | |
| 2019/0101729 A1 | 4/2019 | Hsieh et al. | |
| 2019/0204556 A1 | 7/2019 | Jhang et al. | |
| 2019/0204557 A1 | 7/2019 | Jhang et al. | |
| 2019/0204558 A1 | 7/2019 | Jhang et al. | |
| 2019/0204559 A1 | 7/2019 | Jhang et al. | |
| 2019/0204560 A1 | 7/2019 | Jhang et al. | |
| 2020/0393648 A1 | 12/2020 | Lin et al. | |
| 2021/0015709 A1 | 1/2021 | Zollinger et al. | |
| 2021/0063697 A1* | 3/2021 | Li | G02B 9/64 |
| 2021/0103129 A1 | 4/2021 | Ji et al. | |
| 2021/0157098 A1 | 5/2021 | Hirano | |
| 2021/0191085 A1* | 6/2021 | Lin | G02B 9/64 |

FOREIGN PATENT DOCUMENTS

| | | |
|---|---|---|
| CN | 108445610 A | 8/2018 |
| CN | 108873272 A | 11/2018 |
| CN | 109343203 A | 2/2019 |
| CN | 109870788 A | 6/2019 |
| CN | 110412749 A | 11/2019 |
| CN | 110426822 A | 11/2019 |
| CN | 110456490 A | 11/2019 |
| CN | 110471168 A | 11/2019 |
| CN | 110515183 A | 11/2019 |
| CN | 201910804371 A * | 11/2019 |
| CN | 110531500 A | 12/2019 |
| CN | 110554482 A | 12/2019 |
| CN | 110554485 A | 12/2019 |
| CN | 201911327872 A * | 4/2020 |
| CN | 210605169 U | 5/2020 |
| CN | 211478747 | 9/2020 |
| CN | 112083550 A | 12/2020 |
| TW | I642990 B | 12/2018 |
| WO | 2021-026869 A1 | 2/2021 |
| WO | 2021-068753 A1 | 4/2021 |

OTHER PUBLICATIONS

CN Office Action in Application No. 201911222881.0 dated Sep. 13, 2021.
IN Office Action in Application No. 202034009357 dated Jun. 22, 2021.

* cited by examiner

PHOTOGRAPHING LENS ASSEMBLY, IMAGE CAPTURING UNIT AND ELECTRONIC DEVICE

RELATED APPLICATIONS

This application claims priority to Taiwan Application 108141586, filed on Nov. 15, 2019, which is incorporated by reference herein in its entirety.

BACKGROUND

Technical Field

The present disclosure relates to a photographing lens assembly, an image capturing unit and an electronic device, more particularly to a photographing lens assembly and an image capturing unit applicable to an electronic device.

Description of Related Art

With the development of semiconductor manufacturing technology, the performance of image sensors has improved, and the pixel size thereof has been scaled down. Therefore, featuring high image quality becomes one of the indispensable features of an optical system nowadays.

Furthermore, due to the rapid changes in technology, electronic devices equipped with optical systems are trending towards multi-functionality for various applications, and therefore the functionality requirements for the optical systems have been increasing. However, it is difficult for a conventional optical system to obtain a balance among the requirements such as high image quality, low sensitivity, a proper aperture size, miniaturization and a desirable field of view.

SUMMARY

According to one aspect of the present disclosure, a photographing lens assembly includes a total of eight lens elements. The eight lens elements are, in order from an object side to an image side, a first lens element, a second lens element, a third lens element, a fourth lens element, a fifth lens element, a sixth lens element, a seventh lens element and an eighth lens element.

The first lens element with positive refractive power has an object-side surface being convex in a paraxial region thereof. The second lens element has negative refractive power. The eighth lens element with negative refractive power has an object-side surface being concave in a paraxial region thereof. At least one lens element of the photographing lens assembly has at least one lens surface having at least one inflection point.

When a focal length of the photographing lens assembly is f, a focal length of the first lens element is f1, a focal length of the third lens element is f3, a focal length of the fourth lens element is f4, a focal length of the fifth lens element is f5, a focal length of the sixth lens element is f6, a focal length of the eighth lens element is f8, a maximum image height of the photographing lens assembly is ImgH, an axial distance between an image-side surface of the eighth lens element and an image surface is BL, and a curvature radius of an object-side surface of the fifth lens element is R9, the following conditions are satisfied:

$|f1/f8|<1.25;$ $0.45<|f/f3|+|f/f4|+|f/f5|+|f/f6|<1.50;$ $4.0<ImgH/BL<20.0;$ and $f5/R9<2.80.$ According to another aspect of the present disclosure, a photographing lens assembly includes a total of eight lens elements. The eight lens elements are, in order from an object side to an image side, a first lens element, a second lens element, a third lens element, a fourth lens element, a fifth lens element, a sixth lens element, a seventh lens element and an eighth lens element.

The first lens element with positive refractive power has an object-side surface being convex in a paraxial region thereof. The second lens element has negative refractive power. The eighth lens element with negative refractive power has an object-side surface being concave in a paraxial region thereof. At least one lens element of the photographing lens assembly has at least one lens surface having at least one inflection point.

When a focal length of the photographing lens assembly is f, a focal length of the first lens element is f1, a focal length of the second lens element is f2, a focal length of the third lens element is f3, a focal length of the fourth lens element is f4, a focal length of the fifth lens element is f5, a focal length of the sixth lens element is f6, a focal length of the eighth lens element is f8, a maximum image height of the photographing lens assembly is ImgH, an axial distance between an image-side surface of the eighth lens element and an image surface is BL, and a curvature radius of an image-side surface of the sixth lens element is R12, the following conditions are satisfied:

$|f1/f8|<1.60;$ $|f/f3|+|f/f4|+|f/f5|+|f/f6|<1.65;$ $4.0<ImgH/BL<20.0;$ $f/f2<-0.45;$ and $0 \leq f/R12.$ According to another aspect of the present disclosure, an image capturing unit includes one of the aforementioned photographing lens assemblies and an image sensor, wherein the image sensor is disposed on the image surface of the photographing lens assembly.

According to another aspect of the present disclosure, an electronic device includes the aforementioned image capturing unit.

BRIEF DESCRIPTION OF THE DRAWINGS

The disclosure can be better understood by reading the following detailed description of the embodiments, with reference made to the accompanying drawings as follows.

DETAILED DESCRIPTION

A photographing lens assembly includes a total of eight lens elements. The eight lens elements are, in order from an object side to an image side, a first lens element, a second lens element, a third lens element, a fourth lens element, a fifth lens element, a sixth lens element, a seventh lens element and an eighth lens element.

The first lens element has positive refractive power. Therefore, it is favorable for meeting the requirements such as compactness and a short total track length of the photographing lens assembly. The first lens element has an object-side surface being convex in a paraxial region thereof. Therefore, it is favorable for providing a sufficient field of view and further reducing the overall size of the photographing lens assembly.

The second lens element has negative refractive power. Therefore, it is favorable for balancing aberrations generated by the first lens element so as to correct spherical aberration and chromatic aberration.

The seventh lens element can have an image-side surface being concave in a paraxial region thereof. Therefore, it is favorable for moving the principal point toward the object side so as to reduce the back focal length and total track length.

The eighth lens element with negative refractive power has an object-side surface being concave in a paraxial region thereof. Therefore, it is favorable for meeting the requirements of compactness and good aberration correction capability.

Figure 25:
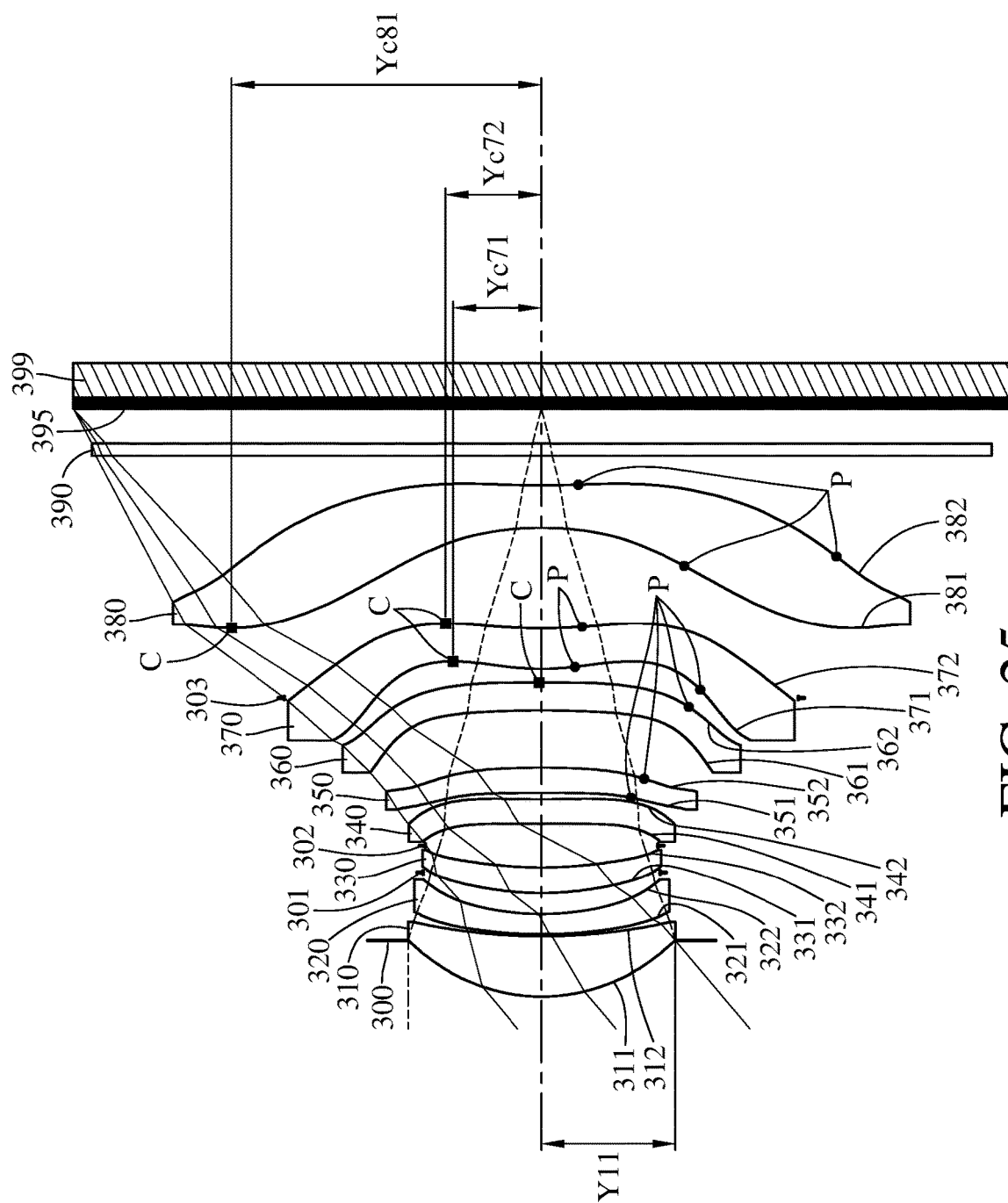
FIG. 25 shows a schematic view of Y11, Yc71, Yc72 and Yc81, as well as several inflection points and critical points of the lens elements according to the 3rd embodiment of the present disclosure.

According to the present disclosure, at least one of an object-side surface and an image-side surface of at least one lens element of the photographing lens assembly has at least one inflection point. Therefore, it is favorable for increasing aberration correction capability so as to provide good image quality and compactness. Please refer to FIG. 25, which shows a schematic view of several inflection points P of the lens elements according to the 3rd embodiment of the present disclosure. The inflection points on an object-side surface and an image-side surface of the fifth lens element, an image-side surface of the sixth lens element, an object-side surface and the image-side surface of the seventh lens element, and the object-side surface and an image-side surface of the eighth lens element in FIG. 25 are only exemplary. The aforementioned lens surfaces may also have more inflection points, and the other lens surfaces of the eight lens elements may also have one or more inflection points.

The image-side surface of the sixth lens element can have one convex critical point in an off-axis region thereof, the object-side surface of the seventh lens element can have one concave critical point in an off-axis region thereof, the image-side surface of the seventh lens element can have one convex critical point in an off-axis region thereof, and the object-side surface of the eighth lens element can have one convex critical point in an off-axis region thereof. Therefore, it is favorable for correcting off-axis aberrations so as to increase peripheral image resolution. Please refer to FIG. 25, which shows a schematic view of several critical points C of the lens elements according to the 3rd embodiment of the present disclosure. The critical points on the image-side surface of the sixth lens element, the object-side surface and the image-side surface of the seventh lens element, and the object-side surface of the eighth lens element in FIG. 25 are only exemplary. The other lens surfaces of the eight lens elements may also have one or more critical points.

When a focal length of the first lens element is f1, and a focal length of the eighth lens element is f8, the following condition is satisfied: |f1/f8|<1.60. Therefore, it is favorable for providing sufficient refractive power from the eighth lens element so as to miniaturize the photographing lens assembly with good image quality. Moreover, the following condition can also be satisfied: |f1/f8|<1.25.

When a focal length of the photographing lens assembly is f, a focal length of the third lens element is f3, a focal length of the fourth lens element is f4, a focal length of the fifth lens element is f5, and a focal length of the sixth lens element is f6, the following condition is satisfied: |f/f3|+|f/f4|+|f/f5|+|f/f6|<1.65. Therefore, it is favorable for preventing image overcorrections due to overly large differences among the refractive power of the lens elements and correcting ghosting due to excessive changes of the surface shapes of the lens elements. Moreover, the following condition can also be satisfied: $0.45<|f/f3|+|f/f4|+|f/f5|+|f/f6|<1.50$. Moreover, the following condition can also be satisfied: $0.50<|f/f3|+|f/f4|+|f/f5|+|f/f6|<1.25$.

When a maximum image height of the photographing lens assembly (half of a diagonal length of an effective photosensitive area of the image sensor) is ImgH, and an axial distance between the image-side surface of the eighth lens element and an image surface is BL, the following condition is satisfied: $4.0<ImgH/BL<20.0$. Therefore, it is favorable for further reducing the back focal length of the photographing lens assembly and having better space utilization. Moreover, the following condition can also be satisfied: $6.0<ImgH/BL<12.0$.

When the focal length of the fifth lens element is f5, and a curvature radius of the object-side surface of the fifth lens element is R9, the following condition can be satisfied: $f5/R9<2.80$. Therefore, it is favorable for correcting aberrations with a proper surface shape and refractive power of the fifth lens element.

When the focal length of the photographing lens assembly is f, and a focal length of the second lens element is f2, the following condition can be satisfied: $f/f2<-0.45$. Therefore, it is favorable for the second lens element to correct various aberrations when in combination with the first lens element. Moreover, the following condition can also be satisfied: $-1.25<f/f2<-0.50$.

When the focal length of the photographing lens assembly is f, and a curvature radius of the image-side surface of the sixth lens element is R12, the following condition can be satisfied: $-1.25<f/R12$. Therefore, it is favorable for preventing excessive refractive power of the sixth lens element due to overly curved surface shape thereof so as to better correct aberrations. Moreover, the following condition can also be satisfied: $-0.75<f/R12<3.0$. Moreover, the following condition can also be satisfied: $-0.30<f/R12<2.50$. Moreover, the following condition can also be satisfied: $0\leq f/R12$.

When a curvature radius of the object-side surface of the eighth lens element is R15, and a curvature radius of the image-side surface of the eighth lens element is R16, the following condition can be satisfied: $(R15+R16)/(R15-R16)<0.30$. Therefore, the surface shape of the eighth lens element is favorable for achieving a short back focal length and large image height configuration. Moreover, the following condition can also be satisfied: $(R15+R16)/(R15-R16)<0$. Moreover, the following condition can also be satisfied: $(R15+R16)/(R15-R16)<-0.25$. Moreover, the following condition can also be satisfied: $-2.0<(R15+R16)/(R15-R16)<-0.50$.

When a vertical distance between the concave critical point on the object-side surface of the seventh lens element and an optical axis is Yc71, and a vertical distance between the convex critical point on the image-side surface of the seventh lens element and the optical axis is Yc72, the following condition can be satisfied: $0.30<Yc71/Yc72<3.0$. Therefore, it is favorable for correcting off-axis aberrations so as to increase peripheral image resolution while meeting the requirements such as compactness and a short total track length of the photographing lens assembly. Please refer to FIG. 25, which shows a schematic view of Yc71 and Yc72 according to the 3rd embodiment of the present disclosure.

When an axial distance between the object-side surface of the first lens element and the image surface is TL, and the maximum image height of the photographing lens assembly is ImgH, the following condition can be satisfied: $0.50<TL/ImgH<1.30$. Therefore, it is favorable for balancing between compactness and manufacturability of the photographing lens assembly.

When an f-number of the photographing lens assembly is Fno, the following condition can be satisfied: $0.8<Fno<2.05$. Therefore, it is favorable for providing sufficient incident light so as to increase image resolution. Moreover, the following condition can also be satisfied: $0.8<Fno<2.0$.

When the maximum image height of the photographing lens assembly is ImgH, and a curvature radius of the object-side surface of the first lens element is R1, the following condition can be satisfied: $1.75<ImgH/R1$. Therefore, it is favorable for providing a large image height configuration. Moreover, the following condition can also be satisfied: $2.20<ImgH/R1<4.0$.

When a sum of axial distances between each of all adjacent lens elements of the photographing lens assembly is ΣAT, and an axial distance between the seventh lens element and the eighth lens element is T78, the following condition can be satisfied: $\Sigma AT/T78<3.0$. Therefore, it is favorable for providing sufficient space between the seventh and eighth lens elements so as to have proper lens surface shapes of the seventh and eighth lens elements.

When an Abbe number of the first lens element is V1, an Abbe number of the second lens element is V2, an Abbe number of the third lens element is V3, an Abbe number of the fourth lens element is V4, an Abbe number of the fifth lens element is V5, an Abbe number of the sixth lens element is V6, an Abbe number of the seventh lens element is V7, an Abbe number of the eighth lens element is V8, an Abbe number of the i-th lens element is Vi, a refractive index of the first lens element is N1, a refractive index of the second lens element is N2, a refractive index of the third lens element is N3, a refractive index of the fourth lens element is N4, a refractive index of the fifth lens element is N5, a refractive index of the sixth lens element is N6, a refractive index of the seventh lens element is N7, a refractive index of the eighth lens element is N8, and a refractive index of the i-th lens element is Ni, at least one lens element of the photographing lens assembly can satisfy the following condition: $5.0<Vi/Ni<11.9$, wherein $i=1, 2, 3, 4, 5, 6, 7$ or $8$. Therefore, it is favorable for further correcting chromatic aberration. Moreover, at least two lens elements of the photographing lens assembly can satisfy the following condition: $5.0<Vi/Ni<11.9$, wherein $i=1, 2, 3, 4, 5, 6, 7$ or $8$. Moreover, at least one lens element of the photographing lens assembly can also satisfy the following condition: $6.0<Vi/Ni<11.0$, wherein $i=1, 2, 3, 4, 5, 6, 7$ or $8$.

When the focal length of the first lens element is f1, the focal length of the second lens element is f2, the focal length of the third lens element is f3, the focal length of the fourth lens element is f4, the focal length of the fifth lens element is f5, the focal length of the sixth lens element is f6, and a focal length of the seventh lens element is f7, the following conditions can be satisfied: $|f1/f2|<1.0$; $|f1/f3|<1.0$; $|f1/f4|<1.0$; $|f1/f5|<1.0$; $|f1/f6|<1.0$; and $|f1/f7|<1.0$. Therefore, it is favorable for providing sufficient refractive power of the first lens element so as to retrieve more peripheral light at the entrance pupil while achieving a large aperture.

When the focal length of the second lens element is f2, the focal length of the third lens element is f3, the focal length of the fourth lens element is f4, the focal length of the fifth lens element is f5, the focal length of the sixth lens element is f6, the focal length of the seventh lens element is f7, and the focal length of the eighth lens element is f8, the following conditions can be satisfied: $|f8/f2|<1.0$; $|f8/f3|<1.0$; $|f8/f4|<1.0$; $|f8/f5|<1.0$; $|f8/f6|<1.0$; and $|f8/f7|<1.0$.

Therefore, it is favorable for providing sufficient refractive power of the eighth lens element so as to reduce the size of the photographing lens assembly.

When a sum of central thicknesses of all lens elements of the photographing lens assembly is ΣCT, and the sum of axial distances between each of all adjacent lens elements of the photographing lens assembly is ΣAT, the following condition can be satisfied: 0.80<ΣCT/ΣAT<1.60. Therefore, it is favorable for improving the space utilization efficiency by avoiding overly small or large distances between each of all adjacent lens elements of the photographing lens assembly. Moreover, the following condition can also be satisfied: 0.90<ΣCT/ΣAT<1.50.

When the maximum image height of the photographing lens assembly is ImgH, and a maximum effective radius of the object-side surface of the first lens element is Y11, the following condition can be satisfied: 2.5<ImgH/Y11<5.0. Therefore, it is favorable for providing a large image height configuration. Moreover, the following condition can also be satisfied: 2.50<ImgH/Y11<4.50. Moreover, the following condition can also be satisfied: 3.0<ImgH/Y11<4.50. Please refer to FIG. 25, which shows a schematic view of Y11 according to the 3rd embodiment of the present disclosure.

When the focal length of the photographing lens assembly is f, a curvature radius of an object-side surface of one lens element of the photographing lens assembly is Ro, a curvature radius of an image-side surface of the lens element of the photographing lens assembly is Ri, and the total number of lens elements satisfying the condition of f/|Ro|+f/|Ri|<0.8 in the photographing lens assembly is NLR_80, the following condition can be satisfied: 1≤NLR_80. Therefore, it is favorable for preventing image overcorrections due to overly large differences among the refractive power of the lens elements and correcting image ghosting due to excessive changes of the surface shapes of the lens elements. Moreover, the following condition can also be satisfied: 2≤NLR_80. Moreover, the following condition can also be satisfied: 3≤NLR_80. Moreover, when the total number of lens elements satisfying the condition of f/|Ro|+f/|Ri|<0.5 in the photographing lens assembly is NLR_50, the following condition can be satisfied: 1≤NLR_50. Moreover, the following condition can also be satisfied: 2≤NLR_50.

When a vertical distance between the convex critical point on the object-side surface of the eighth lens element and the optical axis is Yc81, and the maximum image height of the photographing lens assembly is ImgH, the following condition can be satisfied: 0.20<Yc81/ImgH<0.80. Therefore, it is favorable for meeting the requirements such as compactness and a short total track length, and for increasing peripheral image resolution. Please refer to FIG. 25, which shows a schematic view of Yc81 according to the 3rd embodiment of the present disclosure.

When an axial distance between the first lens element and the second lens element is T12, an axial distance between the second lens element and the third lens element is T23, an axial distance between the third lens element and the fourth lens element is T34, an axial distance between the fourth lens element and the fifth lens element is T45, an axial distance between the fifth lens element and the sixth lens element is T56, an axial distance between the sixth lens element and the seventh lens element is T67, and the axial distance between the seventh lens element and the eighth lens element is T78, the following conditions can be satisfied: 1.0<T78/T12; 1.0<T78/T23; 1.0<T78/T34; 1.0<T78/T45; 1.0<T78/T56; and 1.0<T78/T67. Therefore, it is favorable for providing sufficient space between the seventh and eighth lens elements so as to have proper lens surface shapes of the seventh and eighth lens elements.

When the total number of lens elements having an Abbe number smaller than 20 in the photographing lens assembly is V20, the following condition can be satisfied: 2≤V20. Therefore, it is favorable for further correcting chromatic aberration. Moreover, when the total number of lens elements having an Abbe number smaller than 40 in the photographing lens assembly is V40, the following condition can be satisfied: 4≤V40.

According to the present disclosure, the aforementioned features and conditions can be utilized in numerous combinations so as to achieve corresponding effects.

According to the present disclosure, the lens elements of the photographing lens assembly can be made of either glass or plastic material. When the lens elements are made of glass material, the refractive power distribution of the photographing lens assembly may be more flexible, and the influence on imaging caused by external environment temperature change may be reduced. The glass lens element can either be made by grinding or molding. When the lens elements are made of plastic material, the manufacturing costs can be effectively reduced. Furthermore, surfaces of each lens element can be arranged to be spherical or aspheric, wherein the former reduces manufacturing difficulty, and the latter allows more control variables for eliminating aberrations thereof, the required number of the lens elements can be reduced, and the total track length of the photographing lens assembly can be effectively shortened. Furthermore, the aspheric surfaces may be formed by plastic injection molding or glass molding.

According to the present disclosure, when a lens surface is aspheric, it means that the lens surface has an aspheric shape throughout its optically effective area, or a portion(s) thereof.

According to the present disclosure, one or more of the lens elements' material may optionally include an additive which alters the lens elements' transmittance in a specific range of wavelength for a reduction in unwanted stray light or colour deviation. For example, the additive may optionally filter out light in the wavelength range of 600 nm to 800 nm to reduce excessive red light and/or near infrared light; or may optionally filter out light in the wavelength range of 350 nm to 450 nm to reduce excessive blue light and/or near ultraviolet light from interfering the final image. The additive may be homogeneously mixed with a plastic material to be used in manufacturing a mixed-material lens element by injection molding.

According to the present disclosure, each of an object-side surface and an image-side surface has a paraxial region and an off-axis region. The paraxial region refers to the region of the surface where light rays travel close to the optical axis, and the off-axis region refers to the region of the surface away from the paraxial region. Particularly, unless otherwise stated, when the lens element has a convex surface, it indicates that the surface is convex in the paraxial region thereof; when the lens element has a concave surface, it indicates that the surface is concave in the paraxial region thereof. Moreover, when a region of refractive power or focus of a lens element is not defined, it indicates that the region of refractive power or focus of the lens element is in the paraxial region thereof.

According to the present disclosure, an inflection point is a point on the surface of the lens element at which the surface changes from concave to convex, or vice versa. A critical point is a non-axial point of the lens surface where its tangent is perpendicular to the optical axis.

According to the present disclosure, the image surface of the photographing lens assembly, based on the corresponding image sensor, can be flat or curved, especially a curved surface being concave facing towards the object side of the photographing lens assembly.

According to the present disclosure, an image correction unit, such as a field flattener, can be optionally disposed between the lens element closest to the image side of the photographing lens assembly and the image surface for correction of aberrations such as field curvature. The optical properties of the image correction unit, such as curvature, thickness, index of refraction, position and surface shape (convex or concave surface with spherical, aspheric, diffractive or Fresnel types), can be adjusted according to the design of the image capturing unit. In general, a preferable image correction unit is, for example, a thin transparent element having a concave object-side surface and a planar image-side surface, and the thin transparent element is disposed near the image surface.

According to the present disclosure, the photographing lens assembly can include at least one stop, such as an aperture stop, a glare stop or a field stop. Said glare stop or said field stop is set for eliminating the stray light and thereby improving image quality thereof.

According to the present disclosure, an aperture stop can be configured as a front stop or a middle stop. A front stop disposed between an imaged object and the first lens element can provide a longer distance between an exit pupil of the photographing lens assembly and the image surface to produce a telecentric effect, and thereby improves the image-sensing efficiency of an image sensor (for example, CCD or CMOS). A middle stop disposed between the first lens element and the image surface is favorable for enlarging the viewing angle of the photographing lens assembly and thereby provides a wider field of view for the same.

According to the present disclosure, the photographing lens assembly can include an aperture control unit. The aperture control unit may be a mechanical component or a light modulator, which can control the size and shape of the aperture through electricity or electrical signals. The mechanical component can include a movable member, such as a blade assembly or a light baffle. The light modulator can include a shielding element, such as a filter, an electrochromic material or a liquid-crystal layer. The aperture control unit controls the amount of incident light or exposure time to enhance the capability of image quality adjustment. In addition, the aperture control unit can be the aperture stop of the present disclosure, which changes the f-number to obtain different image effects, such as the depth of field or lens speed.

According to the above description of the present disclosure, the following specific embodiments are provided for further explanation.

1st Embodiment

Figure 1:
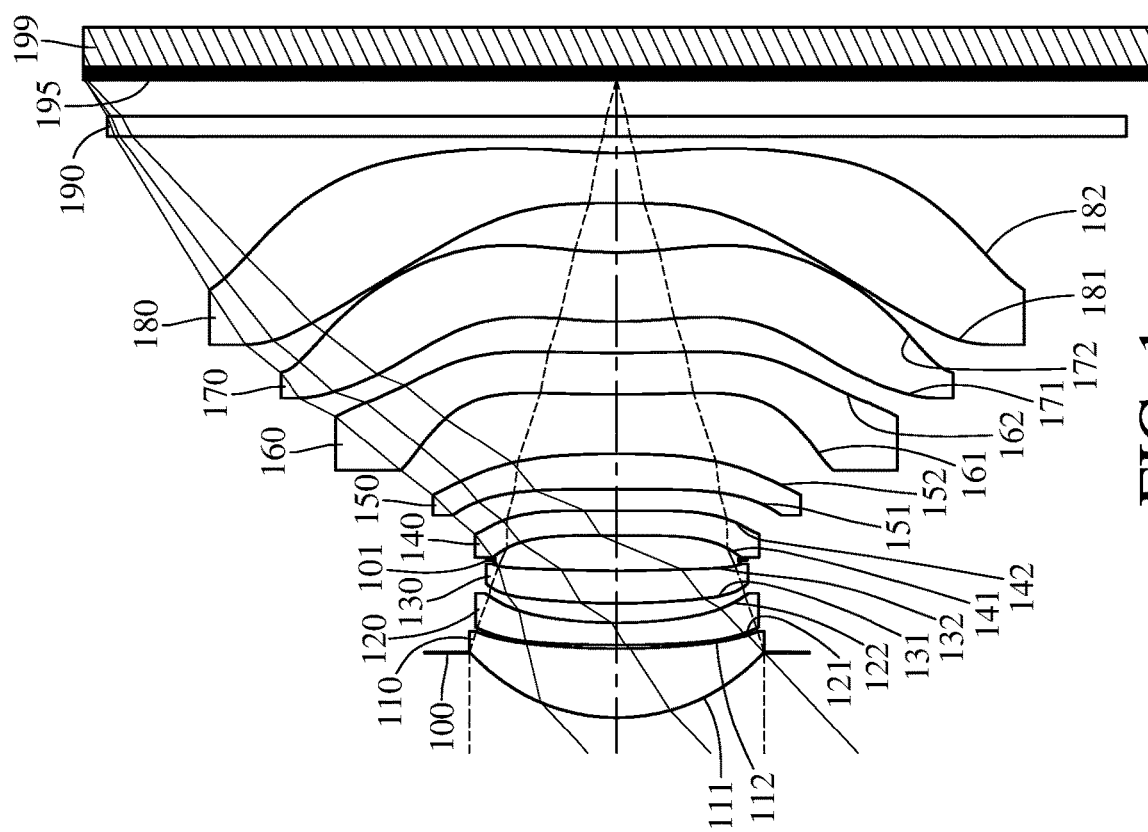
FIG. 1 is a schematic view of an image capturing unit according to the 1st embodiment of the present disclosure.
Figure 2:
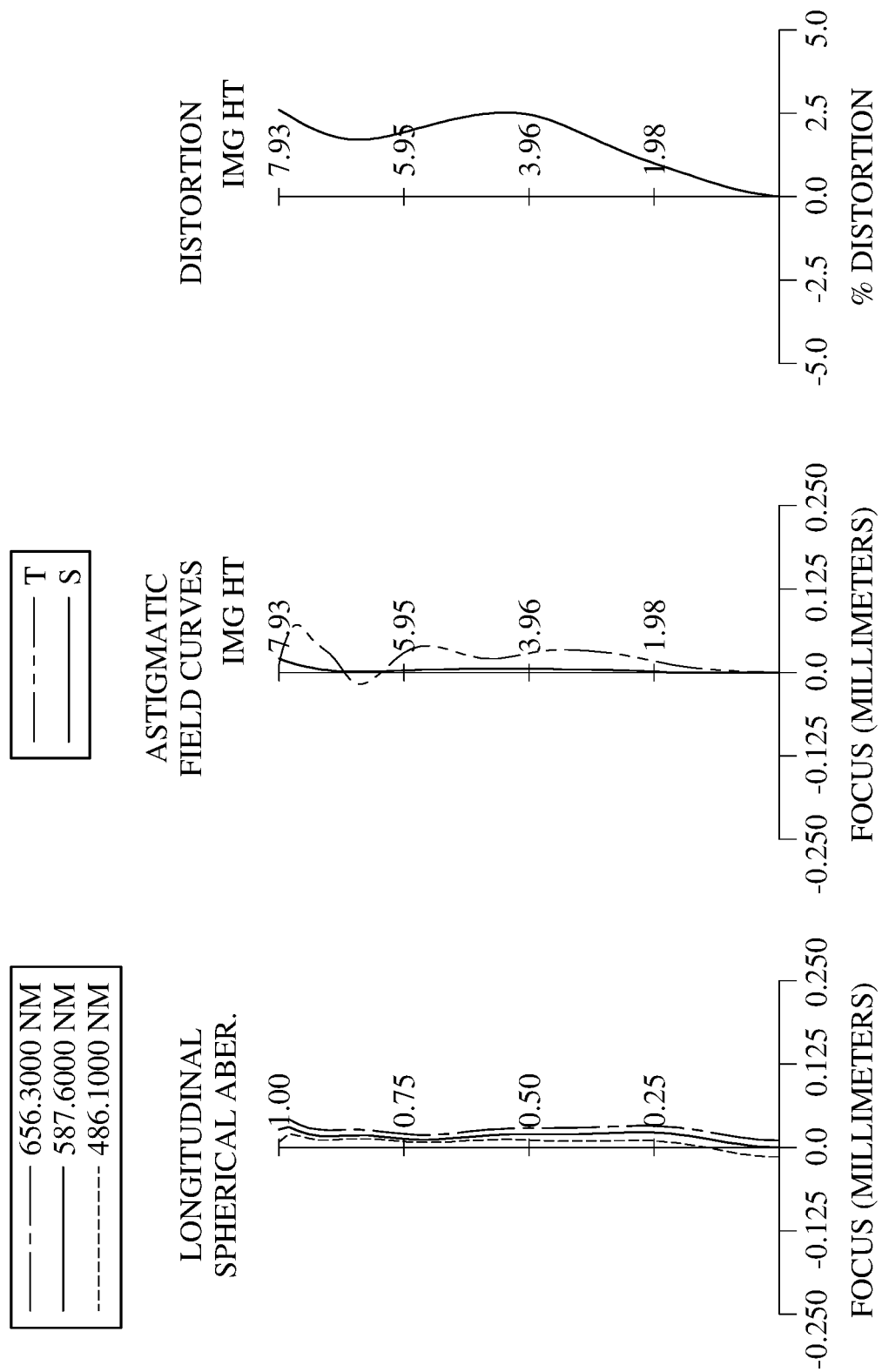
FIG. 2 shows spherical aberration curves, astigmatic field curves and a distortion curve of the image capturing unit according to the 1st embodiment.

FIG. 1 is a schematic view of an image capturing unit according to the 1st embodiment of the present disclosure. FIG. 2 shows, in order from left to right, spherical aberration curves, astigmatic field curves and a distortion curve of the image capturing unit according to the 1st embodiment. In FIG. 1, the image capturing unit includes the photographing lens assembly (its reference numeral is omitted) of the present disclosure and an image sensor 199. The photographing lens assembly includes, in order from an object side to an image side, an aperture stop 100, a first lens element 110, a second lens element 120, a third lens element 130, a stop 101, a fourth lens element 140, a fifth lens element 150, a sixth lens element 160, a seventh lens element 170, an eighth lens element 180, an IR-cut filter 190 and an image surface 195. The photographing lens assembly includes eight lens elements (110, 120, 130, 140, 150, 160, 170 and 180) with no additional lens element disposed between each of the adjacent eight lens elements.

The first lens element 110 with positive refractive power has an object-side surface 111 being convex in a paraxial region thereof and an image-side surface 112 being concave in a paraxial region thereof. The first lens element 110 is made of plastic material and has the object-side surface 111 and the image-side surface 112 being both aspheric.

The second lens element 120 with negative refractive power has an object-side surface 121 being convex in a paraxial region thereof and an image-side surface 122 being concave in a paraxial region thereof. The second lens element 120 is made of plastic material and has the object-side surface 121 and the image-side surface 122 being both aspheric. The image-side surface 122 of the second lens element 120 has at least one inflection point.

The third lens element 130 with positive refractive power has an object-side surface 131 being convex in a paraxial region thereof and an image-side surface 132 being concave in a paraxial region thereof. The third lens element 130 is made of plastic material and has the object-side surface 131 and the image-side surface 132 being both aspheric.

The fourth lens element 140 with negative refractive power has an object-side surface 141 being convex in a paraxial region thereof and an image-side surface 142 being concave in a paraxial region thereof. The fourth lens element 140 is made of plastic material and has the object-side surface 141 and the image-side surface 142 being both aspheric. The object-side surface 141 of the fourth lens element 140 has at least one inflection point. The image-side surface 142 of the fourth lens element 140 has at least one inflection point.

The fifth lens element 150 with positive refractive power has an object-side surface 151 being convex in a paraxial region thereof and an image-side surface 152 being convex in a paraxial region thereof. The fifth lens element 150 is made of plastic material and has the object-side surface 151 and the image-side surface 152 being both aspheric. The object-side surface 151 of the fifth lens element 150 has at least one inflection point.

The sixth lens element 160 with negative refractive power has an object-side surface 161 being convex in a paraxial region thereof and an image-side surface 162 being concave in a paraxial region thereof. The sixth lens element 160 is made of plastic material and has the object-side surface 161 and the image-side surface 162 being both aspheric. The object-side surface 161 of the sixth lens element 160 has at least one inflection point. The image-side surface 162 of the sixth lens element 160 has at least one inflection point. The image-side surface 162 of the sixth lens element 160 has one convex critical point in an off-axis region thereof.

The seventh lens element 170 with negative refractive power has an object-side surface 171 being convex in a paraxial region thereof and an image-side surface 172 being concave in a paraxial region thereof. The seventh lens element 170 is made of plastic material and has the object-side surface 171 and the image-side surface 172 being both aspheric. The object-side surface 171 of the seventh lens element 170 has at least one inflection point. The image-side surface 172 of the seventh lens element 170 has at least one inflection point. The object-side surface 171 of the seventh lens element 170 has one concave critical point in an off-axis region thereof. The image-side surface 172 of the seventh lens element 170 has one convex critical point in an off-axis region thereof.

The eighth lens element 180 with negative refractive power has an object-side surface 181 being concave in a paraxial region thereof and an image-side surface 182 being concave in a paraxial region thereof. The eighth lens element 180 is made of plastic material and has the object-side surface 181 and the image-side surface 182 being both aspheric. The object-side surface 181 of the eighth lens element 180 has at least one inflection point. The image-side surface 182 of the eighth lens element 180 has at least one inflection point.

The IR-cut filter 190 is made of glass material and located between the eighth lens element 180 and the image surface 195, and will not affect the focal length of the photographing lens assembly. The image sensor 199 is disposed on or near the image surface 195 of the photographing lens assembly.

The equation of the aspheric surface profiles of the aforementioned lens elements of the 1st embodiment is expressed as follows:

$$X(Y) = (Y^2/R)/(1+\mathrm{sqrt}(1-(1+k)\times(Y/R)^2)) + \sum_i (Ai)\times(Y^i),$$

where,

X is the relative distance between a point on the aspheric surface spaced at a distance Y from an optical axis and the tangential plane at the aspheric surface vertex on the optical axis;

Y is the vertical distance from the point on the aspheric surface to the optical axis;

R is the curvature radius;

k is the conic coefficient; and

Ai is the i-th aspheric coefficient, and in the embodiments, i may be, but is not limited to, 4, 6, 8, 10, 12, 14, 16, 18 and 20.

In the photographing lens assembly of the image capturing unit according to the 1st embodiment, when a focal length of the photographing lens assembly is f, an f-number of the photographing lens assembly is Fno, and half of a maximum field of view of the photographing lens assembly is HFOV, these parameters have the following values: f=8.30 millimeters (mm), Fno=1.89, HFOV=42.9 degrees (deg.).

When a sum of central thicknesses of all lens elements of the photographing lens assembly is ΣCT, and a sum of axial distances between each of all adjacent lens elements of the photographing lens assembly is ΣAT, the following condition is satisfied: ΣCT/ΣAT=1.56. In this embodiment, an axial distance between two adjacent lens elements is an axial distance between two adjacent lens surfaces of the two adjacent lens elements; ΣCT is a sum of a central thickness CT1 of the first lens element 110, a central thickness CT2 of the second lens element 120, a central thickness CT3 of the third lens element 130, a central thickness CT4 of the fourth lens element 140, a central thickness CT5 of the fifth lens element 150, a central thickness CT6 of the sixth lens element 160, a central thickness CT7 of the seventh lens element 170 and a central thickness CT8 of the eighth lens element 180 (that is, ΣCT=CT1+CT2+CT3+CT4+CT5+CT6+CT7+CT8); in addition, an axial distance between the first lens element 110 and the second lens element 120 is T12, an axial distance between the second lens element 120 and the third lens element 130 is T23, an axial distance between the third lens element 130 and the fourth lens element 140 is T34, an axial distance between the fourth lens element 140 and the fifth lens element 150 is T45, an axial distance between the fifth lens element 150 and the sixth lens element 160 is T56, an axial distance between the sixth lens element 160 and the seventh lens element 170 is T67, and an axial distance between the seventh lens element 170 and the eighth lens element 180 is T78; and ΣAT is a sum of the axial distances between the first lens element 110 and the second lens element 120, the second lens element 120 and the third lens element 130, the third lens element 130 and the fourth lens element 140, the fourth lens element 140 and the fifth lens element 150, the fifth lens element 150 and the sixth lens element 160, the sixth lens element 160 and the seventh lens element 170, and the seventh lens element 170 and the eighth lens element 180 (that is, ΣAT=T12+T23+T34+T45+T56+T67+T78). Moreover, the following conditions are satisfied: T78/T12=13.87; T78/T23=2.53; T78/T34=1.40; T78/T45=2.27; T78/T56=0.82; T78/T67=1.57; and ΣAT/T78=4.48.

When a maximum image height of the photographing lens assembly is ImgH, and a maximum effective radius of the object-side surface 111 of the first lens element 110 is Y11, the following condition is satisfied: ImgH/Y11=3.61.

When a curvature radius of the object-side surface 181 of the eighth lens element 180 is R15, and a curvature radius of the image-side surface 182 of the eighth lens element 180 is R16, the following condition is satisfied: (R15+R16)/(R15−R16)=0.57.

When a focal length of the first lens element 110 is f1, and a focal length of the eighth lens element 180 is f8, the following condition is satisfied: |f1/f8|=0.66.

When the focal length of the photographing lens assembly is f, a focal length of the third lens element 130 is f3, a focal length of the fourth lens element 140 is f4, a focal length of the fifth lens element 150 is f5, and a focal length of the sixth lens element 160 is f6, the following condition is satisfied: |f/f3|+|f/f4|+|f/f5|+|f/f6|=0.66.

When the maximum image height of the photographing lens assembly is ImgH, and an axial distance between the image-side surface 182 of the eighth lens element 180 and the image surface 195 is BL, the following condition is satisfied: ImgH/BL=7.22.

When the focal length of the first lens element 110 is f1, a focal length of the second lens element 120 is f2, the focal length of the third lens element 130 is f3, the focal length of the fourth lens element 140 is f4, the focal length of the fifth lens element 150 is f5, the focal length of the sixth lens element 160 is f6, and a focal length of the seventh lens element 170 is f7, the following conditions are satisfied: |f1/f2|=0.42; |f1/f3|=0.16; |f1/f4|=0.11; |f1/f5|=0.25; |f1/f6|=0.02; and |f1/f7|=0.02.

When the focal length of the fifth lens element 150 is f5, and a curvature radius of the object-side surface 151 of the fifth lens element 150 is R9, the following condition is satisfied: f5/R9=0.12.

When the focal length of the second lens element 120 is f2, the focal length of the third lens element 130 is f3, the focal length of the fourth lens element 140 is f4, the focal length of the fifth lens element 150 is f5, the focal length of the sixth lens element 160 is f6, the focal length of the seventh lens element 170 is f7, and the focal length of the eighth lens element 180 is f8, the following conditions are satisfied: |f8/f2|=0.64; |f8/f3|=0.24; |f8/f4|=0.17; |f8/f5|=0.38; |f8/f6|=0.04; and |f8/f7|=0.04.

When the focal length of the photographing lens assembly is f, and the focal length of the second lens element 120 is f2, the following condition is satisfied: f/f2=−0.51.

When the focal length of the photographing lens assembly is f, and a curvature radius of the image-side surface 162 of the sixth lens element 160 is R12, the following condition is satisfied: f/R12=0.40.

When an axial distance between the object-side surface 111 of the first lens element 110 and the image surface 195 is TL, and the maximum image height of the photographing lens assembly is ImgH, the following condition is satisfied: TL/ImgH=1.20.

When the maximum image height of the photographing lens assembly is ImgH, and a curvature radius of the object-side surface 111 of the first lens element 110 is R1, the following condition is satisfied: ImgH/R1=2.69.

When an Abbe number of the first lens element 110 is V1, and a refractive index of the first lens element 110 is N1, the following condition is satisfied: V1/N1=36.30.

When an Abbe number of the second lens element 120 is V2, and a refractive index of the second lens element 120 is N2, the following condition is satisfied: V2/N2=13.01.

When an Abbe number of the third lens element 130 is V3, and a refractive index of the third lens element 130 is N3, the following condition is satisfied: V3/N3=36.30.

When an Abbe number of the fourth lens element 140 is V4, and a refractive index of the fourth lens element 140 is N4, the following condition is satisfied: V4/N4=11.65.

When an Abbe number of the fifth lens element 150 is V5, and a refractive index of the fifth lens element 150 is N5, the following condition is satisfied: V5/N5=36.30.

When an Abbe number of the sixth lens element 160 is V6, and a refractive index of the sixth lens element 160 is N6, the following condition is satisfied: V6/N6=16.57.

When an Abbe number of the seventh lens element 170 is V7, and a refractive index of the seventh lens element 170 is N7, the following condition is satisfied: V7/N7=23.91.

When an Abbe number of the eighth lens element 180 is V8, and a refractive index of the eighth lens element 180 is N8, the following condition is satisfied: V8/N8=36.46.

When the total number of lens elements having an Abbe number smaller than 20 in the photographing lens assembly is V20, the following condition is satisfied: V20=1.

When the total number of lens elements having an Abbe number smaller than 40 in the photographing lens assembly is V40, the following condition is satisfied: V40=4.

When the focal length of the photographing lens assembly is f, a curvature radius of an object-side surface of one lens element of the photographing lens assembly is Ro, a curvature radius of an image-side surface of the lens element of the photographing lens assembly is Ri, and the total number of lens elements satisfying the condition of f/|Ro|+f/|Ri|<0.8 in the photographing lens assembly is NLR_80, the following condition is satisfied: NLR_80=3.

When the focal length of the photographing lens assembly is f, a curvature radius of an object-side surface of one lens element of the photographing lens assembly is Ro, a curvature radius of an image-side surface of the lens element of the photographing lens assembly is Ri, and the total number of lens elements satisfying the condition of f/|Ro|+f/|Ri|<0.5 in the photographing lens assembly is NLR_50, the following condition is satisfied: NLR_50=1.

When a vertical distance between the concave critical point on the object-side surface 171 of the seventh lens element 170 and the optical axis is Yc71, the following condition is satisfied: Yc71=1.34 [mm].

When a vertical distance between the convex critical point on the image-side surface 172 of the seventh lens element 170 and the optical axis is Yc72, the following condition is satisfied: Yc72=1.60 [mm].

When the vertical distance between the concave critical point on the object-side surface 171 of the seventh lens element 170 and the optical axis is Yc71, and the vertical distance between the convex critical point on the image-side surface 172 of the seventh lens element 170 and the optical axis is Yc72, the following condition is satisfied: Yc71/Yc72=0.83.

The detailed optical data of the 1st embodiment are shown in Table 1 and the aspheric surface data are shown in Table 2 below.

TABLE 1

1st Embodiment
f = 8.30 mm, Fno = 1.89, HFOV = 42.9 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.968 | | | | |
| 2 | Lens 1 | 2.950 | (ASP) | 1.030 | Plastic | 1.545 | 56.1 | 6.87 |
| 3 | | 12.194 | (ASP) | 0.053 | | | | |
| 4 | Lens 2 | 22.438 | (ASP) | 0.330 | Plastic | 1.650 | 21.5 | −16.39 |
| 5 | | 7.185 | (ASP) | 0.291 | | | | |
| 6 | Lens 3 | 10.580 | (ASP) | 0.484 | Plastic | 1.545 | 56.1 | 43.99 |
| 7 | | 18.634 | (ASP) | 0.165 | | | | |
| 8 | Stop | Plano | | 0.361 | | | | |
| 9 | Lens 4 | 182.995 | (ASP) | 0.366 | Plastic | 1.669 | 19.5 | −60.29 |
| 10 | | 33.026 | (ASP) | 0.324 | | | | |
| 11 | Lens 5 | 223.613 | (ASP) | 0.527 | Plastic | 1.545 | 56.1 | 27.22 |
| 12 | | −15.876 | (ASP) | 0.894 | | | | |
| 13 | Lens 6 | 23.606 | (ASP) | 0.614 | Plastic | 1.607 | 26.6 | −278.20 |
| 14 | | 20.508 | (ASP) | 0.468 | | | | |
| 15 | Lens 7 | 5.793 | (ASP) | 1.032 | Plastic | 1.566 | 37.4 | −275.96 |
| 16 | | 5.226 | (ASP) | 0.735 | | | | |
| 17 | Lens 8 | −26.103 | (ASP) | 0.744 | Plastic | 1.534 | 55.9 | −10.44 |
| 18 | | 7.157 | (ASP) | 0.257 | | | | |
| 19 | IR-cut Filter | Plano | | 0.300 | Glass | 1.517 | 64.2 | — |
| 20 | | Plano | | 0.542 | | | | |
| 21 | Image | Plano | | 0.000 | | | | |

Note:
Reference wavelength is 587.6 nm (d-line).
An effective radius of the stop 101 (Surface 8) is 1.830 mm.

TABLE 2

Aspheric Coefficients

| Surface # | 2 | 3 | 4 | 5 | 6 | 7 |
|---|---|---|---|---|---|---|
| k= | 2.1614E−01 | −8.8782E+01 | 0.0000E+00 | 0.0000E+00 | −4.6694E+01 | 0.0000E+00 |
| A4= | −1.3079E−03 | 4.0868E−03 | 1.6476E−03 | 4.2418E−03 | −2.5224E−03 | −6.5295E−03 |
| A6= | 1.0874E−03 | 3.7378E−03 | 4.6173E−03 | −2.3841E−04 | 3.1125E−03 | −2.0648E−03 |
| A8= | −9.8956E−04 | −4.1068E−03 | −3.2778E−03 | 2.3566E−03 | −4.4751E−03 | 5.2499E−03 |
| A10= | 4.5839E−04 | 1.9725E−03 | 1.3372E−03 | −1.5178E−03 | 5.7002E−03 | −4.6741E−03 |
| A12= | −1.2516E−04 | −4.4937E−04 | −2.3704E−04 | 4.8746E−04 | −4.0715E−03 | 2.4632E−03 |
| A14= | 1.7846E−05 | 4.9233E−05 | 1.5098E−05 | −5.6333E−05 | 1.7796E−03 | −7.1917E−04 |
| A16= | −1.1158E−06 | −2.1254E−06 | — | — | −4.5441E−04 | 1.0738E−04 |
| A18= | — | — | — | — | 6.2818E−05 | −5.9356E−06 |
| A20= | — | — | — | — | −3.6381E−06 | — |

| Surface # | 9 | 10 | 11 | 12 | 13 | 14 |
|---|---|---|---|---|---|---|
| k= | 0.0000E+00 | 0.0000E+00 | 8.9692E+01 | 0.0000E+00 | 0.0000E+00 | 0.0000E+00 |
| A4= | −2.3947E−02 | −2.3283E−02 | −8.1927E−03 | −6.7696E−03 | −1.7976E−05 | −8.3767E−03 |
| A6= | 2.3905E−05 | 4.9268E−03 | −4.1975E−03 | −5.1438E−03 | −4.3424E−03 | 6.9740E−04 |
| A8= | −1.3907E−03 | −9.3775E−03 | 3.5489E−03 | 3.9672E−03 | 1.4155E−03 | −2.1023E−04 |
| A10= | 1.7772E−03 | 9.7459E−03 | −1.6453E−03 | −1.7268E−03 | −4.3208E−04 | 3.4915E−06 |
| A12= | −1.6648E−03 | −6.0473E−03 | 4.2169E−04 | 4.7396E−04 | 8.3795E−05 | 4.9336E−06 |
| A14= | 9.3665E−04 | 2.2652E−03 | −5.5015E−05 | −8.1856E−05 | −9.6558E−06 | −6.5350E−07 |
| A16= | −3.0754E−04 | −5.0013E−04 | 2.2390E−06 | 8.6427E−06 | 6.0159E−07 | 3.6133E−08 |
| A18= | 5.3987E−05 | 5.9697E−05 | 1.8969E−07 | −5.0769E−07 | −1.5294E−08 | −9.4316E−10 |
| A20= | −3.9220E−06 | −2.9477E−06 | −1.5788E−08 | 1.2613E−08 | — | 9.4880E−12 |

| Surface # | 15 | 16 | 17 | 18 |
|---|---|---|---|---|
| k= | −2.4426E−01 | 0.0000E+00 | −1.0000E+00 | 0.0000E+00 |
| A4= | −3.2977E−02 | −2.8751E−02 | −2.8779E−02 | −2.3564E−02 |
| A6= | 4.3454E−03 | 3.8943E−03 | 4.6339E−03 | 3.4148E−03 |
| A8= | −7.0387E−04 | −6.9720E−04 | −4.5050E−04 | −3.1164E−04 |
| A10= | 9.4410E−05 | 1.0670E−04 | 3.0085E−05 | 1.7566E−05 |
| A12= | −8.0999E−06 | −1.0733E−05 | −1.3906E−06 | −6.4331E−07 |
| A14= | 4.3952E−07 | 6.6881E−07 | 4.2774E−08 | 1.5865E−08 |
| A16= | −1.4964E−08 | −2.5028E−08 | −8.1314E−10 | −2.7000E−10 |
| A18= | 2.9525E−10 | 5.1607E−10 | 8.4153E−12 | 3.0388E−12 |
| A20= | −2.5815E−12 | −4.5040E−12 | −3.5095E−14 | −1.7096E−14 |

In Table 1, the curvature radius, the thickness and the focal length are shown in millimeters (mm). Surface numbers 0-21 represent the surfaces sequentially arranged from the object side to the image side along the optical axis. In Table 2, k represents the conic coefficient of the equation of the aspheric surface profiles. A4-20 represent the aspheric coefficients ranging from the 4th order to the 20th order. The tables presented below for each embodiment are the corresponding schematic parameter and aberration curves, and the definitions of the tables are the same as Table 1 and Table 2 of the 1st embodiment. Therefore, an explanation in this regard will not be provided again.

2nd Embodiment

Figure 3:
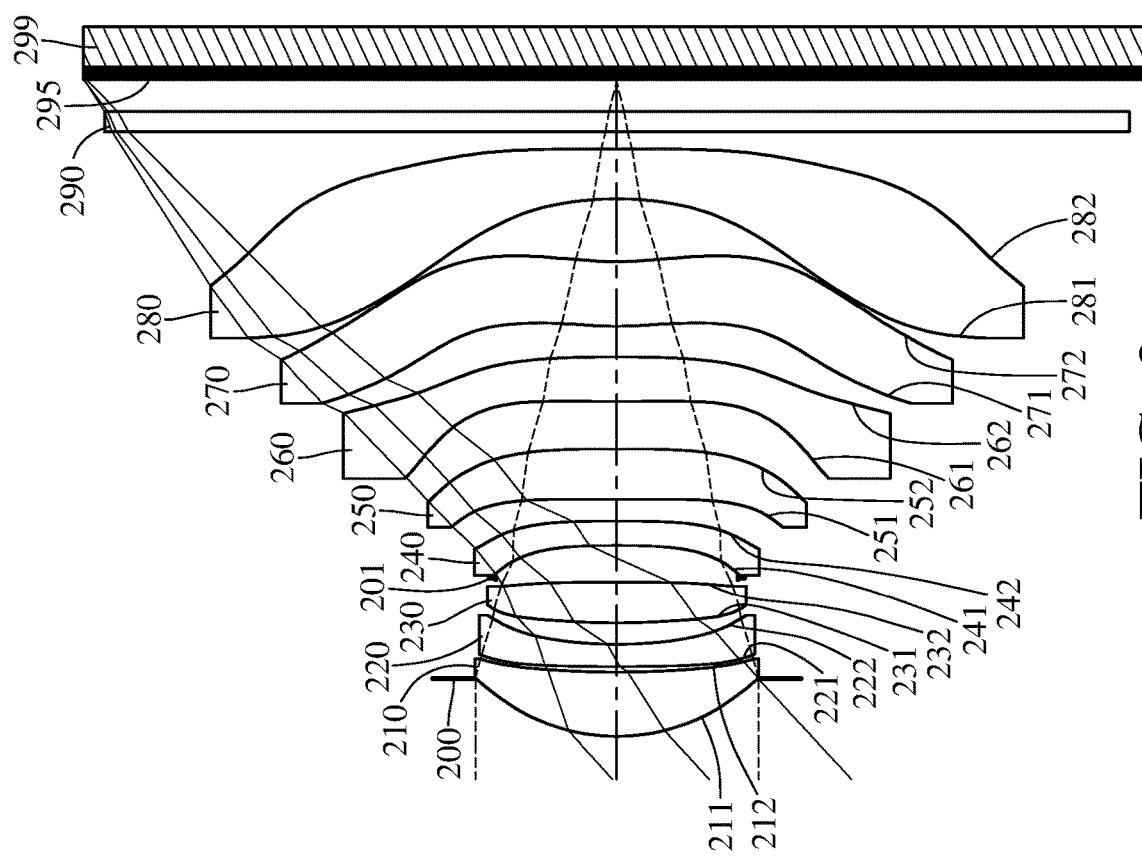
FIG. 3 is a schematic view of an image capturing unit according to the 2nd embodiment of the present disclosure.
Figure 4:
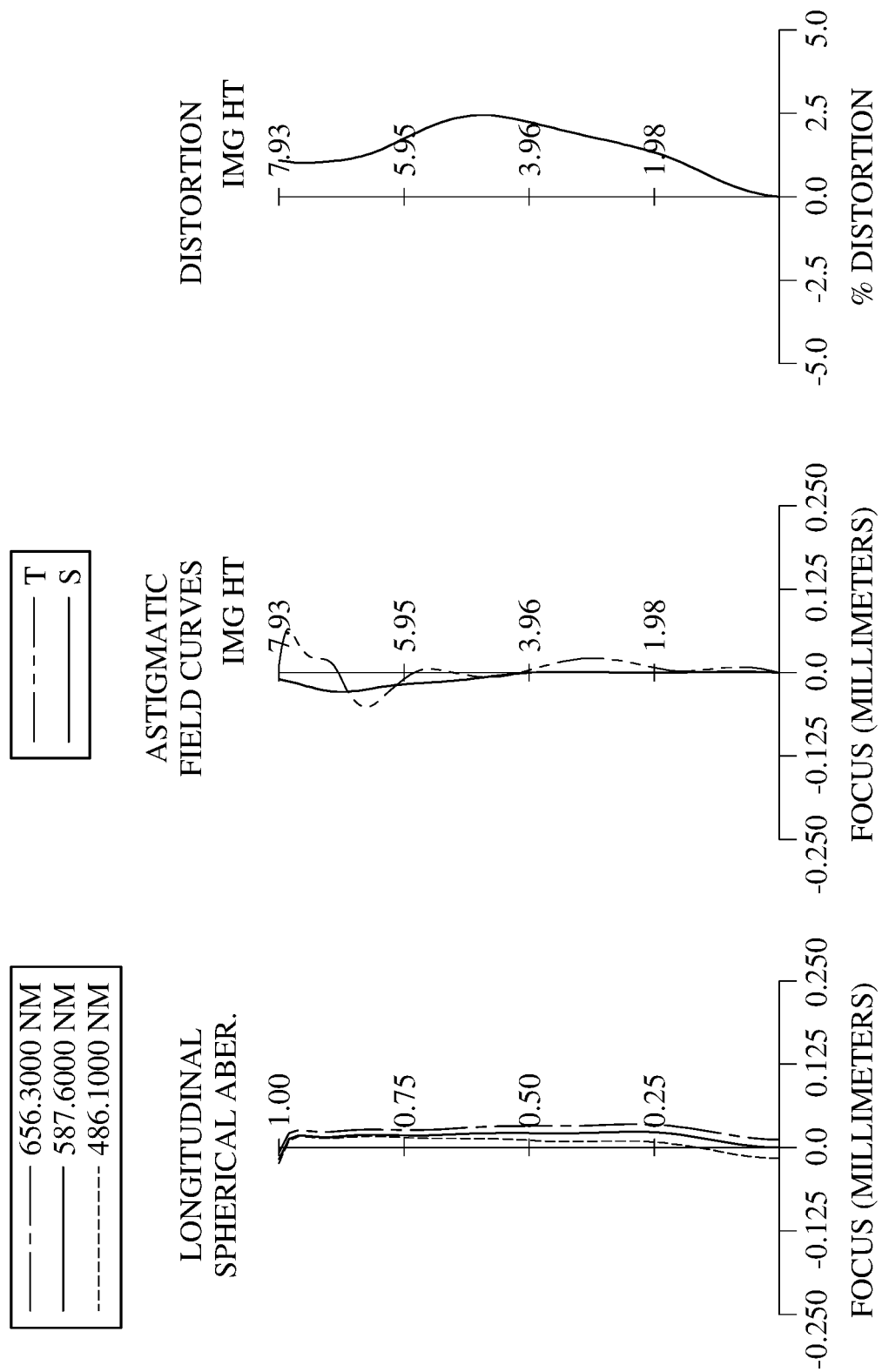
FIG. 4 shows spherical aberration curves, astigmatic field curves and a distortion curve of the image capturing unit according to the 2nd embodiment.

FIG. 3 is a schematic view of an image capturing unit according to the 2nd embodiment of the present disclosure. FIG. 4 shows, in order from left to right, spherical aberration curves, astigmatic field curves and a distortion curve of the image capturing unit according to the 2nd embodiment. In FIG. 3, the image capturing unit includes the photographing lens assembly (its reference numeral is omitted) of the present disclosure and an image sensor 299. The photographing lens assembly includes, in order from an object side to an image side, an aperture stop 200, a first lens element 210, a second lens element 220, a third lens element 230, a stop 201, a fourth lens element 240, a fifth lens element 250, a sixth lens element 260, a seventh lens element 270, an eighth lens element 280, an IR-cut filter 290 and an image surface 295. The photographing lens assembly includes eight lens elements (210, 220, 230, 240, 250, 260, 270 and 280) with no additional lens element disposed between each of the adjacent eight lens elements.

The first lens element 210 with positive refractive power has an object-side surface 211 being convex in a paraxial region thereof and an image-side surface 212 being concave in a paraxial region thereof. The first lens element 210 is made of plastic material and has the object-side surface 211 and the image-side surface 212 being both aspheric. The object-side surface 211 of the first lens element 210 has at least one inflection point. The image-side surface 212 of the first lens element 210 has at least one inflection point.

The second lens element 220 with negative refractive power has an object-side surface 221 being convex in a paraxial region thereof and an image-side surface 222 being concave in a paraxial region thereof. The second lens element 220 is made of plastic material and has the object-side surface 221 and the image-side surface 222 being both aspheric. The image-side surface 222 of the second lens element 220 has at least one inflection point.

The third lens element 230 with positive refractive power has an object-side surface 231 being convex in a paraxial region thereof and an image-side surface 232 being convex in a paraxial region thereof. The third lens element 230 is made of plastic material and has the object-side surface 231 and the image-side surface 232 being both aspheric. The image-side surface 232 of the third lens element 230 has at least one inflection point.

The fourth lens element 240 with negative refractive power has an object-side surface 241 being concave in a paraxial region thereof and an image-side surface 242 being convex in a paraxial region thereof. The fourth lens element 240 is made of plastic material and has the object-side surface 241 and the image-side surface 242 being both aspheric. The image-side surface 242 of the fourth lens element 240 has at least one inflection point.

The fifth lens element 250 with positive refractive power has an object-side surface 251 being convex in a paraxial region thereof and an image-side surface 252 being convex in a paraxial region thereof. The fifth lens element 250 is made of plastic material and has the object-side surface 251 and the image-side surface 252 being both aspheric. The object-side surface 251 of the fifth lens element 250 has at least one inflection point.

The sixth lens element 260 with positive refractive power has an object-side surface 261 being convex in a paraxial region thereof and an image-side surface 262 being convex in a paraxial region thereof. The sixth lens element 260 is made of plastic material and has the object-side surface 261 and the image-side surface 262 being both aspheric. The object-side surface 261 of the sixth lens element 260 has at least one inflection point. The image-side surface 262 of the sixth lens element 260 has at least one inflection point.

The seventh lens element 270 with negative refractive power has an object-side surface 271 being convex in a paraxial region thereof and an image-side surface 272 being concave in a paraxial region thereof. The seventh lens element 270 is made of plastic material and has the object-side surface 271 and the image-side surface 272 being both aspheric. The object-side surface 271 of the seventh lens element 270 has at least one inflection point. The image-side surface 272 of the seventh lens element 270 has at least one inflection point. The object-side surface 271 of the seventh lens element 270 has one concave critical point in an off-axis region thereof. The image-side surface 272 of the seventh lens element 270 has one convex critical point in an off-axis region thereof.

The eighth lens element 280 with negative refractive power has an object-side surface 281 being concave in a paraxial region thereof and an image-side surface 282 being convex in a paraxial region thereof. The eighth lens element 280 is made of plastic material and has the object-side surface 281 and the image-side surface 282 being both aspheric. The object-side surface 281 of the eighth lens element 280 has at least one inflection point. The image-side surface 282 of the eighth lens element 280 has at least one inflection point.

The IR-cut filter 290 is made of glass material and located between the eighth lens element 280 and the image surface 295, and will not affect the focal length of the photographing lens assembly. The image sensor 299 is disposed on or near the image surface 295 of the photographing lens assembly.

The detailed optical data of the 2nd embodiment are shown in Table 3 and the aspheric surface data are shown in Table 4 below.

TABLE 3

2nd Embodiment
f = 8.51 mm, Fno = 2.02, HFOV = 42.6 deg.

| Surface # |  | Curvature Radius |  | Thickness | Material | Index | Abbe # | Focal Length |
|---|---|---|---|---|---|---|---|---|
| 0 | Object | Plano |  | Infinity |  |  |  |  |
| 1 | Ape. Stop | Plano |  | −0.860 |  |  |  |  |
| 2 | Lens 1 | 2.960 | (ASP) | 0.954 | Plastic | 1.544 | 56.0 | 6.52 |
| 3 |  | 15.850 | (ASP) | 0.084 |  |  |  |  |
| 4 | Lens 2 | 59.615 | (ASP) | 0.330 | Plastic | 1.607 | 26.6 | −12.28 |
| 5 |  | 6.616 | (ASP) | 0.322 |  |  |  |  |
| 6 | Lens 3 | 11.357 | (ASP) | 0.610 | Plastic | 1.544 | 56.0 | 18.78 |
| 7 |  | −100.000 | (ASP) | 0.059 |  |  |  |  |
| 8 | Stop | Plano |  | 0.487 |  |  |  |  |
| 9 | Lens 4 | −15.224 | (ASP) | 0.360 | Plastic | 1.634 | 23.8 | −30.31 |
| 10 |  | −73.937 | (ASP) | 0.325 |  |  |  |  |
| 11 | Lens 5 | 48.960 | (ASP) | 0.749 | Plastic | 1.551 | 48.0 | 44.68 |
| 12 |  | −49.247 | (ASP) | 0.707 |  |  |  |  |
| 13 | Lens 6 | 51.529 | (ASP) | 0.659 | Plastic | 1.566 | 37.4 | 61.97 |
| 14 |  | −109.393 | (ASP) | 0.459 |  |  |  |  |
| 15 | Lens 7 | 5.821 | (ASP) | 0.970 | Plastic | 1.607 | 26.6 | −545.45 |
| 16 |  | 5.360 | (ASP) | 0.932 |  |  |  |  |
| 17 | Lens 8 | −5.013 | (ASP) | 0.740 | Plastic | 1.544 | 56.0 | −9.73 |
| 18 |  | −99.650 | (ASP) | 0.257 |  |  |  |  |
| 19 | IR-cut Filter | Plano |  | 0.300 | Glass | 1.517 | 64.2 | — |
| 20 |  | Plano |  | 0.473 |  |  |  |  |
| 21 | Image | Plano |  | 0.000 |  |  |  |  |

Note:
Reference wavelength is 587.6 nm (d-line).
An effective radius of the stop 201 (Surface 8) is 1.800 mm.

TABLE 4

Aspheric Coefficients

| Surface # | 2 | 3 | 4 | 5 | 6 | 7 |
|---|---|---|---|---|---|---|
| k= | 2.1207E−01 | −9.0000E+01 | 0.0000E+00 | 0.0000E+00 | −3.7794E+01 | 0.0000E+00 |
| A4= | −8.7259E−04 | 2.8109E−03 | 2.1682E−03 | 4.0024E−03 | −3.1564E−03 | −7.3961E−03 |
| A6= | 1.0047E−03 | 3.9159E−03 | 4.5390E−03 | −4.2167E−06 | 2.9629E−03 | −2.5717E−03 |

TABLE 4-continued

Aspheric Coefficients

| | | | | | | |
|---|---|---|---|---|---|---|
| A8= | −1.0020E−03 | −4.0959E−03 | −3.2603E−03 | 2.3495E−03 | −4.4226E−03 | 5.1615E−03 |
| A10= | 4.5934E−04 | 1.9709E−03 | 1.3385E−03 | −1.4973E−03 | 5.7077E−03 | −4.6812E−03 |
| A12= | −1.2421E−04 | −4.4965E−04 | −2.3829E−04 | 4.9047E−04 | −4.0698E−03 | 2.4675E−03 |
| A14= | 1.7943E−05 | 4.9048E−05 | 1.5001E−05 | −5.9774E−05 | 1.7789E−03 | −7.1879E−04 |
| A16= | −1.2628E−06 | −2.1432E−06 | — | — | −4.5466E−04 | 1.0713E−04 |
| A18= | — | — | — | — | 6.2713E−05 | −6.0677E−06 |
| A20= | — | — | — | — | −3.5983E−06 | — |

| Surface # | 9 | 10 | 11 | 12 | 13 | 14 |
|---|---|---|---|---|---|---|
| k= | 0.0000E+00 | 0.0000E+00 | 8.2025E+01 | 0.0000E+00 | 0.0000E+00 | 0.0000E+00 |
| A4= | −2.4591E−02 | −2.2168E−02 | −8.0586E−03 | −9.1311E−03 | −7.6822E−03 | −2.7241E−02 |
| A6= | −1.7884E−04 | 5.0642E−03 | −3.7192E−03 | −4.7752E−03 | −5.2578E−04 | 1.3092E−02 |
| A8= | −1.3276E−03 | −9.2983E−03 | 3.4976E−03 | 3.9340E−03 | −4.7806E−05 | −4.3296E−03 |
| A10= | 1.7811E−03 | 9.7469E−03 | −1.6670E−03 | −1.7371E−03 | −1.0894E−04 | 8.0060E−04 |
| A12= | −1.6658E−03 | −6.0531E−03 | 4.2032E−04 | 4.7313E−04 | 4.6349E−05 | −8.5989E−05 |
| A14= | 9.3563E−04 | 2.2643E−03 | −5.4886E−05 | −8.1852E−05 | −7.4265E−06 | 5.5554E−06 |
| A16= | −3.0824E−04 | −4.9996E−04 | 2.2858E−06 | 8.6558E−06 | 5.4258E−07 | −2.1353E−07 |
| A18= | 5.3795E−05 | 5.9752E−05 | 1.9245E−07 | −5.0525E−07 | −1.4928E−08 | 4.5030E−09 |
| A20= | −3.8777E−06 | −2.9548E−06 | −1.6035E−08 | 1.2416E−08 | — | −4.0096E−11 |

| Surface # | 15 | 16 | 17 | 18 |
|---|---|---|---|---|
| k= | −3.0991E−01 | 0.0000E+00 | −1.0000E+00 | 0.0000E+00 |
| A4= | −5.2472E−02 | −3.7193E−02 | −5.6693E−03 | 3.3892E−04 |
| A6= | 1.4805E−02 | 7.6914E−03 | −1.5915E−03 | −1.6590E−03 |
| A8= | −3.1255E−03 | −1.3904E−03 | 5.3065E−04 | 3.3192E−04 |
| A10= | 3.8281E−04 | 1.6240E−04 | −6.2007E−05 | −3.2272E−05 |
| A12= | −2.5992E−05 | −1.1981E−05 | 4.0163E−06 | 1.8351E−06 |
| A14= | 9.0985E−07 | 5.6481E−07 | −1.5738E−07 | −6.4296E−08 |
| A16= | −1.0812E−08 | −1.6652E−08 | 3.7174E−09 | 1.3642E−09 |
| A18= | −1.9548E−10 | 2.8101E−10 | −4.8823E−11 | −1.6005E−11 |
| A20= | 4.9124E−12 | −2.0765E−12 | 2.7423E−13 | 7.9305E−14 |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from Table 3 and Table 4 as the following values and satisfy the following conditions:

| 2nd Embodiment | | | |
|---|---|---|---|
| f [mm] | 8.51 | |f8/f3| | 0.52 |
| Fno | 2.02 | |f8/f4| | 0.32 |
| HFOV [deg.] | 42.6 | |f8/f5| | 0.22 |
| ΣCT/ΣAT | 1.59 | |f8/f6| | 0.16 |
| T78/T12 | 11.10 | |f8/f7| | 0.02 |
| T78/T23 | 2.89 | f/f2 | −0.69 |
| T78/T34 | 1.71 | f/R12 | −0.08 |
| T78/T45 | 2.87 | TL/ImgH | 1.23 |
| T78/T56 | 1.32 | ImgH/R1 | 2.68 |
| T78/T67 | 2.03 | V1/N1 | 36.26 |
| ΣAT/T78 | 3.62 | V2/N2 | 16.57 |
| ImgH/Y11 | 3.76 | V3/N3 | 36.26 |
| (R15 + R16)/(R15 − R16) | −1.11 | V4/N4 | 14.59 |
| |f1/f8| | 0.67 | V5/N5 | 30.95 |
| |f/f3| + |f/f4| + |f/f5| + |f/f6| | 1.06 | V6/N6 | 23.91 |
| ImgH/BL | 7.70 | V7/N7 | 16.57 |
| |f1/f2| | 0.53 | V8/N8 | 36.26 |
| |f1/f3| | 0.35 | V20 | 0 |
| |f1/f4| | 0.22 | V40 | 4 |
| |f1/f5| | 0.15 | NLR_80 | 3 |
| |f1/f6| | 0.11 | NLR_50 | 2 |
| |f1/f7| | 0.01 | Yc71 [mm] | 1.18 |
| f5/R9 | 0.91 | Yc72 [mm] | 1.51 |
| |f8/f2| | 0.79 | Yc71/Yc72 | 0.78 |

3rd Embodiment

Figure 5:
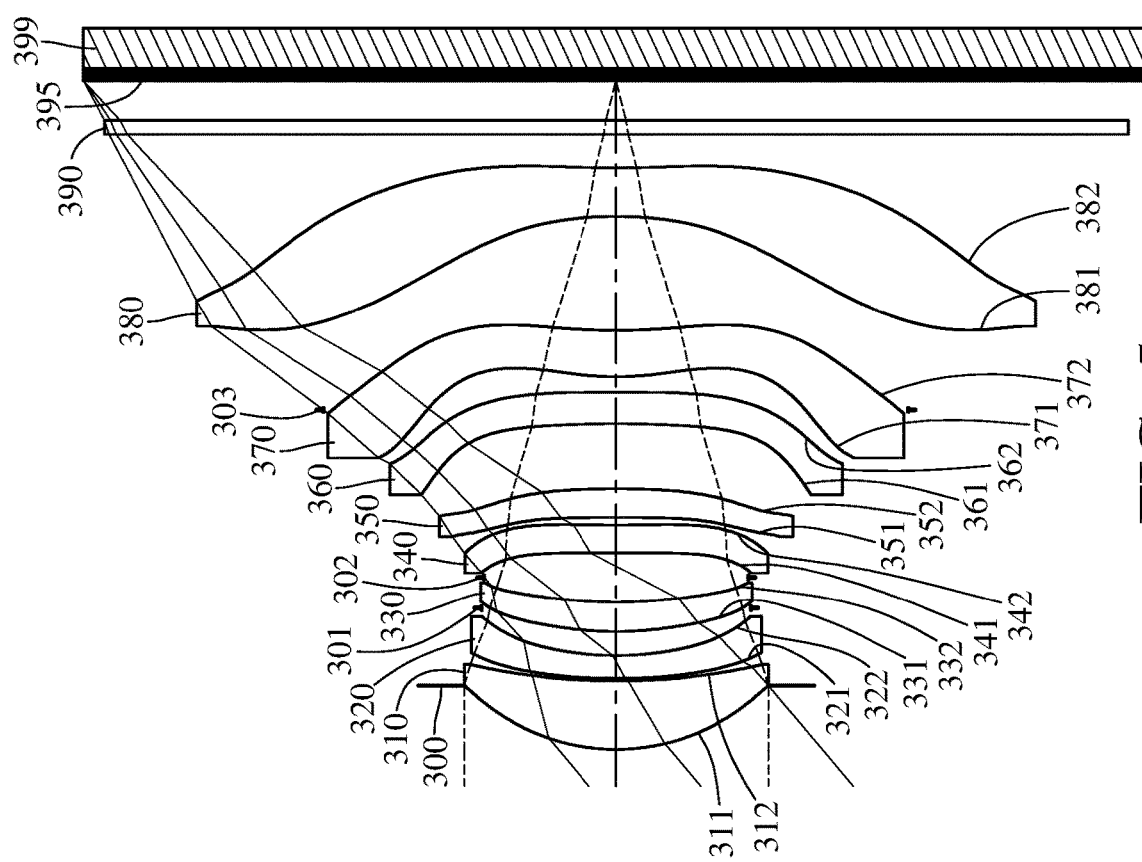
FIG. 5 is a schematic view of an image capturing unit according to the 3rd embodiment of the present disclosure.
Figure 6:
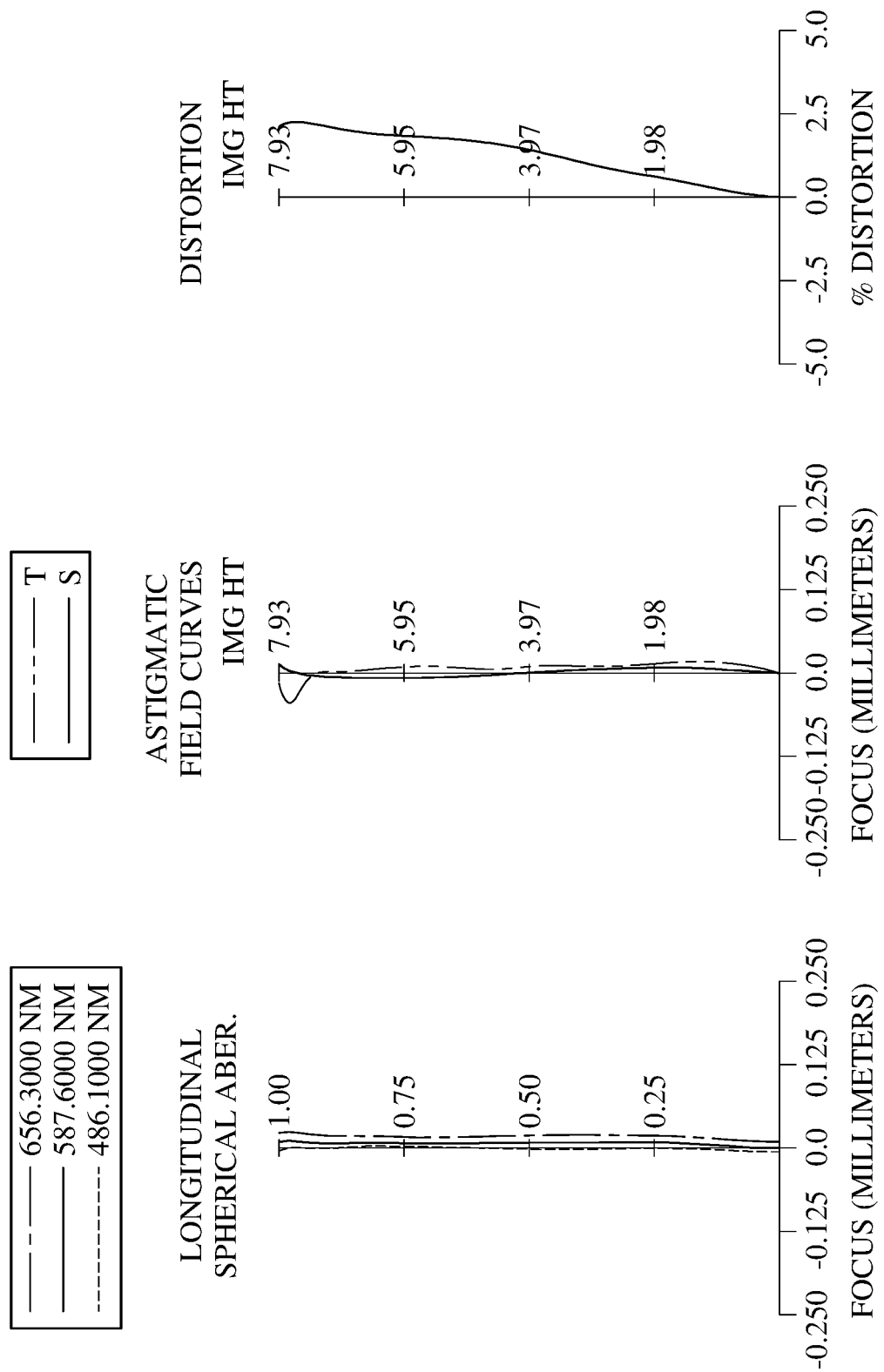
FIG. 6 shows spherical aberration curves, astigmatic field curves and a distortion curve of the image capturing unit according to the 3rd embodiment.

FIG. 5 is a schematic view of an image capturing unit according to the 3rd embodiment of the present disclosure. FIG. 6 shows, in order from left to right, spherical aberration curves, astigmatic field curves and a distortion curve of the image capturing unit according to the 3rd embodiment. In FIG. 5, the image capturing unit includes the photographing lens assembly (its reference numeral is omitted) of the present disclosure and an image sensor 399. The photographing lens assembly includes, in order from an object side to an image side, an aperture stop 300, a first lens element 310, a second lens element 320, a stop 301, a third lens element 330, a stop 302, a fourth lens element 340, a fifth lens element 350, a sixth lens element 360, a seventh lens element 370, a stop 303, an eighth lens element 380, an IR-cut filter 390 and an image surface 395. The photographing lens assembly includes eight lens elements (310, 320, 330, 340, 350, 360, 370 and 380) with no additional lens element disposed between each of the adjacent eight lens elements.

The first lens element 310 with positive refractive power has an object-side surface 311 being convex in a paraxial region thereof and an image-side surface 312 being concave in a paraxial region thereof. The first lens element 310 is made of plastic material and has the object-side surface 311 and the image-side surface 312 being both aspheric. The image-side surface 312 of the first lens element 310 has at least one inflection point.

The second lens element 320 with negative refractive power has an object-side surface 321 being convex in a paraxial region thereof and an image-side surface 322 being concave in a paraxial region thereof. The second lens element 320 is made of plastic material and has the object-side surface 321 and the image-side surface 322 being both aspheric.

The third lens element 330 with positive refractive power has an object-side surface 331 being convex in a paraxial region thereof and an image-side surface 332 being concave in a paraxial region thereof. The third lens element 330 is made of plastic material and has the object-side surface 331 and the image-side surface 332 being both aspheric.

The fourth lens element 340 with negative refractive power has an object-side surface 341 being convex in a paraxial region thereof and an image-side surface 342 being concave in a paraxial region thereof. The fourth lens element 340 is made of plastic material and has the object-side surface 341 and the image-side surface 342 being both aspheric. The object-side surface 341 of the fourth lens element 340 has at least one inflection point. The image-side surface 342 of the fourth lens element 340 has at least one inflection point.

The fifth lens element 350 with positive refractive power has an object-side surface 351 being concave in a paraxial region thereof and an image-side surface 352 being convex in a paraxial region thereof. The fifth lens element 350 is made of plastic material and has the object-side surface 351 and the image-side surface 352 being both aspheric. The object-side surface 351 of the fifth lens element 350 has at least one inflection point. The image-side surface 352 of the fifth lens element 350 has at least one inflection point.

The sixth lens element 360 with negative refractive power has an object-side surface 361 being concave in a paraxial region thereof and an image-side surface 362 being concave in a paraxial region thereof. The sixth lens element 360 is made of plastic material and has the object-side surface 361 and the image-side surface 362 being both aspheric. The object-side surface 361 of the sixth lens element 360 has at least one inflection point. The image-side surface 362 of the sixth lens element 360 has at least one inflection point. The image-side surface 362 of the sixth lens element 360 has one convex critical point in an off-axis region thereof.

The seventh lens element 370 with positive refractive power has an object-side surface 371 being convex in a paraxial region thereof and an image-side surface 372 being concave in a paraxial region thereof. The seventh lens element 370 is made of plastic material and has the object-side surface 371 and the image-side surface 372 being both aspheric. The object-side surface 371 of the seventh lens element 370 has at least one inflection point. The image-side surface 372 of the seventh lens element 370 has at least one inflection point. The object-side surface 371 of the seventh lens element 370 has one concave critical point in an off-axis region thereof. The image-side surface 372 of the seventh lens element 370 has one convex critical point in an off-axis region thereof.

The eighth lens element 380 with negative refractive power has an object-side surface 381 being concave in a paraxial region thereof and an image-side surface 382 being concave in a paraxial region thereof. The eighth lens element 380 is made of plastic material and has the object-side surface 381 and the image-side surface 382 being both aspheric. The object-side surface 381 of the eighth lens element 380 has at least one inflection point. The image-side surface 382 of the eighth lens element 380 has at least one inflection point. The object-side surface 381 of the eighth lens element 380 has one convex critical point in an off-axis region thereof.

The IR-cut filter 390 is made of glass material and located between the eighth lens element 380 and the image surface 395, and will not affect the focal length of the photographing lens assembly. The image sensor 399 is disposed on or near the image surface 395 of the photographing lens assembly.

When a vertical distance between the convex critical point on the object-side surface 381 of the eighth lens element 380 and an optical axis is Yc81, the following condition is satisfied: Yc81=5.27 [mm].

When the vertical distance between the convex critical point on the object-side surface 381 of the eighth lens element 380 and the optical axis is Yc81, and a maximum image height of the photographing lens assembly is ImgH, the following condition is satisfied: Yc81/ImgH=0.66.

The detailed optical data of the 3rd embodiment are shown in Table 5 and the aspheric surface data are shown in Table 6 below.

TABLE 5

3rd Embodiment
f = 9.22 mm, Fno 2.04, HFOV = 40.1 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Ape. Stop | Plano | −0.953 | | | | |
| 2 | Lens 1 | 3.099 (ASP) | 1.021 | Plastic | 1.545 | 56.1 | 7.91 |
| 3 | | 9.755 (ASP) | 0.040 | | | | |
| 4 | Lens 2 | 8.883 (ASP) | 0.340 | Plastic | 1.669 | 19.5 | −16.11 |
| 5 | | 4.794 (ASP) | 0.710 | | | | |
| 6 | Stop | Plano | −0.353 | | | | |
| 7 | Lens 3 | 5.191 (ASP) | 0.440 | Plastic | 1.544 | 56.0 | 34.03 |
| 8 | | 6.998 (ASP) | 0.372 | | | | |
| 9 | Stop | Plano | 0.366 | | | | |
| 10 | Lens 4 | 61.843 (ASP) | 0.418 | Plastic | 1.669 | 19.5 | −64.40 |
| 11 | | 25.325 (ASP) | 0.109 | | | | |
| 12 | Lens 5 | −159.622 (ASP) | 0.429 | Plastic | 1.544 | 56.0 | 30.78 |
| 13 | | −15.170 (ASP) | 0.970 | | | | |
| 14 | Lens 6 | −15.795 (ASP) | 0.470 | Plastic | 1.639 | 23.5 | −24.70 |
| 15 | | 9961.205 (ASP) | 0.228 | | | | |
| 16 | Lens 7 | 4.223 (ASP) | 0.696 | Plastic | 1.584 | 28.2 | 12.66 |
| 17 | | 9.246 (ASP) | −1.188 | | | | |
| 18 | Stop | Plano | 2.891 | | | | |
| 19 | Lens 8 | −5.906 (ASP) | 0.720 | Plastic | 1.534 | 55.9 | −7.65 |
| 20 | | 13.793 (ASP) | 0.500 | | | | |

TABLE 5-continued

3rd Embodiment
f = 9.22 mm, Fno 2.04, HFOV = 40.1 deg.

| Surface # | | Curvature Radius | Thickness | Material | Index | Abbe # | Focal Length |
|---|---|---|---|---|---|---|---|
| 21 | IR-cut Filter | Plano | 0.210 | Glass | 1.517 | 64.2 | — |
| 22 | | Plano | 0.589 | | | | |
| 23 | Image | Plano | 0.000 | | | | |

Note:
Reference wavelength is 587.6 nm (d-line).
An effective radius of the stop 301 (Surface 6) is 2.010 mm.
An effective radius of the stop 302 (Surface 9) is 1.970 mm.
An effective radius of the stop 303 (Surface 18) is 4.360 mm.

TABLE 6

Aspheric Coefficients

| Surface # | 2 | 3 | 4 | 5 | 7 | 8 |
|---|---|---|---|---|---|---|
| k= | −1.3284E−01 | −4.3090E+01 | −3.9469E+00 | 3.9851E−03 | −1.2895E+01 | −1.0795E+00 |
| A4= | 6.1051E−04 | 8.9546E−03 | 4.7590E−03 | 9.8948E−04 | 4.2904E−03 | −5.2760E−03 |
| A6= | 2.1216E−04 | −3.7600E−03 | −1.2099E−03 | 2.2910E−03 | −8.0094E−04 | 1.5579E−04 |
| A8= | −2.0701E−04 | 7.7532E−04 | 3.0634E−04 | −4.4951E−04 | 5.0803E−04 | 1.3132E−03 |
| A10= | 1.1297E−04 | 4.6691E−05 | 8.3915E−05 | 1.6498E−04 | −1.1788E−04 | −1.6913E−03 |
| A12= | −3.5139E−05 | −4.1132E−05 | −2.1726E−05 | −1.8506E−05 | 8.4528E−05 | 1.3413E−03 |
| A14= | 5.3866E−06 | 5.5584E−06 | −2.0597E−07 | 1.9411E−06 | −4.1139E−05 | −6.2385E−04 |
| A16= | −3.4313E−07 | −2.5745E−07 | 2.1143E−07 | −4.5331E−07 | 1.4595E−05 | 1.7354E−04 |
| A18= | — | — | — | — | −2.8161E−06 | −2.6502E−05 |
| A20= | — | — | — | — | 2.2080E−07 | 1.7220E−06 |

| Surface # | 10 | 11 | 12 | 13 | 14 | 15 |
|---|---|---|---|---|---|---|
| k= | −9.0000E+01 | −9.0000E+01 | −7.6554E+01 | −8.3044E+00 | −2.9832E+00 | 9.0000E+01 |
| A4= | −1.4553E−02 | −1.6765E−02 | −1.5069E−02 | −8.8415E−03 | 5.6602E−03 | −1.5860E−02 |
| A6= | 2.8718E−03 | 2.6421E−03 | 5.2500E−04 | −3.6469E−03 | −4.7773E−03 | 1.1579E−03 |
| A8= | −4.6939E−03 | −3.2677E−03 | −1.6777E−03 | 2.6565E−03 | 1.1370E−03 | 2.9957E−04 |
| A10= | 3.5416E−03 | 1.9332E−03 | 1.7991E−03 | −1.3262E−03 | −1.5537E−04 | −1.1525E−04 |
| A12= | −1.7959E−03 | −7.3705E−04 | −9.1455E−04 | 5.1925E−04 | −1.5457E−05 | 1.1118E−05 |
| A14= | 5.8491E−04 | 1.7356E−04 | 2.7921E−04 | −1.3640E−04 | 8.4655E−06 | −1.8652E−07 |
| A16= | −1.1855E−04 | −2.2559E−05 | −4.9967E−05 | 2.2178E−05 | −1.2641E−06 | −1.8462E−08 |
| A18= | 1.3603E−05 | 1.2134E−06 | 4.8186E−06 | −1.9663E−06 | 8.8414E−08 | 5.9534E−10 |
| A20= | −6.8977E−07 | — | −1.9487E−07 | 7.1302E−08 | −2.3687E−09 | — |

| Surface # | 16 | 17 | 19 | 20 |
|---|---|---|---|---|
| k= | −1.2278E+01 | 1.4880E+00 | −7.2467E−01 | −9.0000E+01 |
| A4= | −9.7661E−03 | −1.1257E−03 | −1.0336E−02 | −9.8444E−03 |
| A6= | −4.8588E−03 | −5.8625E−03 | 1.4636E−03 | 9.4188E−04 |
| A8= | 1.4214E−03 | 1.5052E−03 | −8.4186E−05 | −5.0907E−05 |
| A10= | −2.3288E−04 | −2.0931E−04 | 2.3318E−06 | 4.6621E−07 |
| A12= | 3.2465E−05 | 1.7253E−05 | 7.3009E−09 | 1.1776E−07 |
| A14= | −4.8191E−06 | −8.2770E−07 | −2.9020E−09 | −7.9290E−09 |
| A16= | 5.1240E−07 | 2.1293E−08 | 9.8591E−11 | 2.3754E−10 |
| A18= | −2.8072E−08 | −2.2677E−10 | −1.4993E−12 | −3.5144E−12 |
| A20= | 5.9185E−10 | −1.6350E−14 | 8.9789E−15 | 2.0672E−14 |

In the 3rd embodiment, the equation of the aspheric surface profiles of the aforementioned lens elements is the same as the equation of the 1st embodiment. Also, except for the Yc81 mentioned in this embodiment, the definitions of these parameters shown in the following table are the same as those stated in the 1st embodiment with corresponding values for the 3rd embodiment, so an explanation in this regard will not be provided again.

Moreover, these parameters can be calculated from Table 5 and Table 6 as the following values and satisfy the following conditions:

| 3rd Embodiment | | | |
|---|---|---|---|
| f [mm] | 9.22 | |f8/f4| | 0.12 |
| Fno | 2.04 | |f8/f5| | 0.25 |
| HFOV [deg.] | 40.1 | |f8/f6| | 0.31 |
| ΣCT/ΣAT | 1.09 | |f8/f7| | 0.60 |
| T78/T12 | 42.58 | f/f2 | −0.57 |
| T78/T23 | 4.77 | f/R12 | 0.001 |
| T78/T34 | 2.31 | TL/ImgH | 1.26 |
| T78/T45 | 15.62 | ImgH/R1 | 2.56 |
| T78/T56 | 1.76 | V1/N1 | 36.30 |
| T78/T67 | 7.47 | V2/N2 | 11.65 |
| ΣAT/T78 | 2.43 | V3/N3 | 36.26 |
| ImgH/Y11 | 3.51 | V4/N4 | 11.65 |
| (R15 + R16)/(R15 − R16) | −0.40 | V5/N5 | 36.26 |

-continued

| 3rd Embodiment | | | |
|---|---|---|---|
| \|f1/f8\| | 1.03 | V6/N6 | 14.34 |
| \|f/f3\| + \|f/f4\| + \|f/f5\| + \|f/f6\| | 1.09 | V7/N7 | 17.80 |
| ImgH/BL | 6.11 | V8/N8 | 36.46 |
| \|f1/f2\| | 0.49 | V20 | 2 |
| \|f1/f3\| | 0.23 | V40 | 4 |
| \|f1/f4\| | 0.12 | NLR_80 | 3 |
| \|f1/f5\| | 0.26 | NLR_50 | 0 |
| \|f1/f6\| | 0.32 | Yc71 [mm] | 1.51 |
| \|f1/f7\| | 0.62 | Yc72 [mm] | 1.61 |
| f5/R9 | −0.19 | Yc71/Yc72 | 0.93 |
| \|f8/f2\| | 0.47 | Yc81 [mm] | 5.27 |
| \|f8/f3\| | 0.22 | Yc81/ImgH | 0.66 |

4th Embodiment

Figure 7:
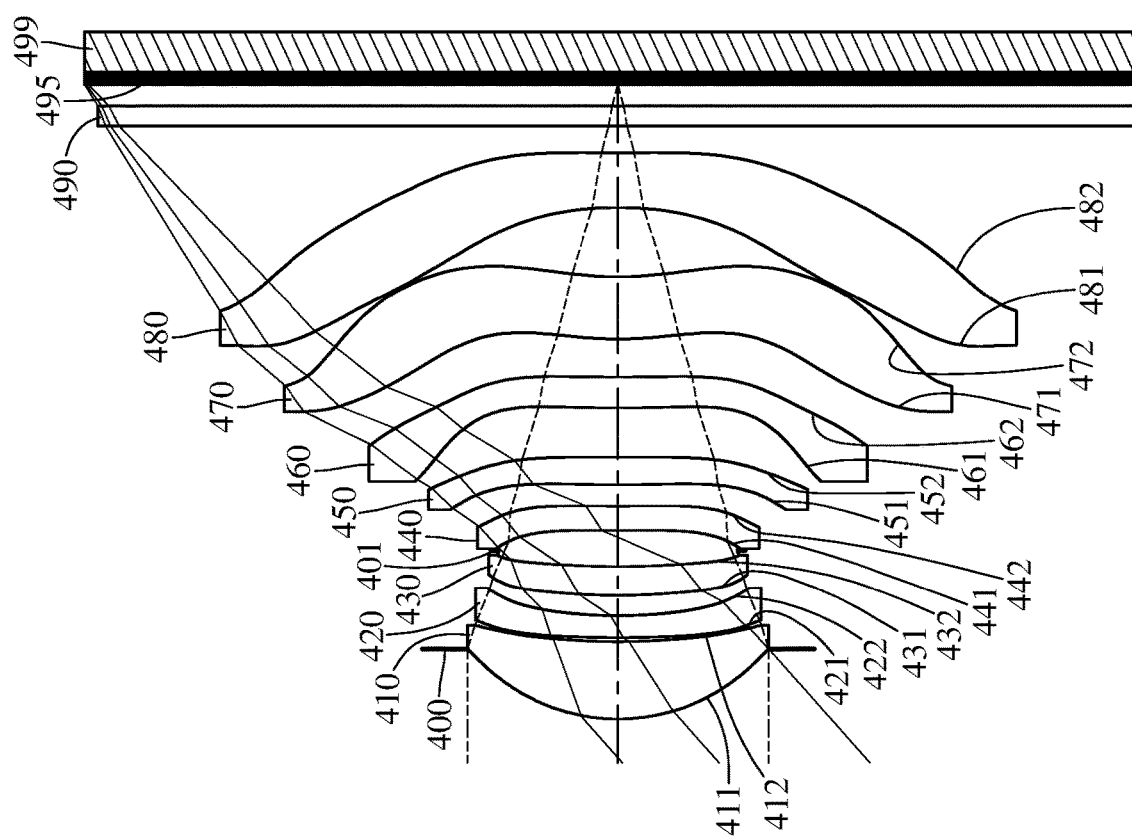
FIG. 7 is a schematic view of an image capturing unit according to the 4th embodiment of the present disclosure.
Figure 8:
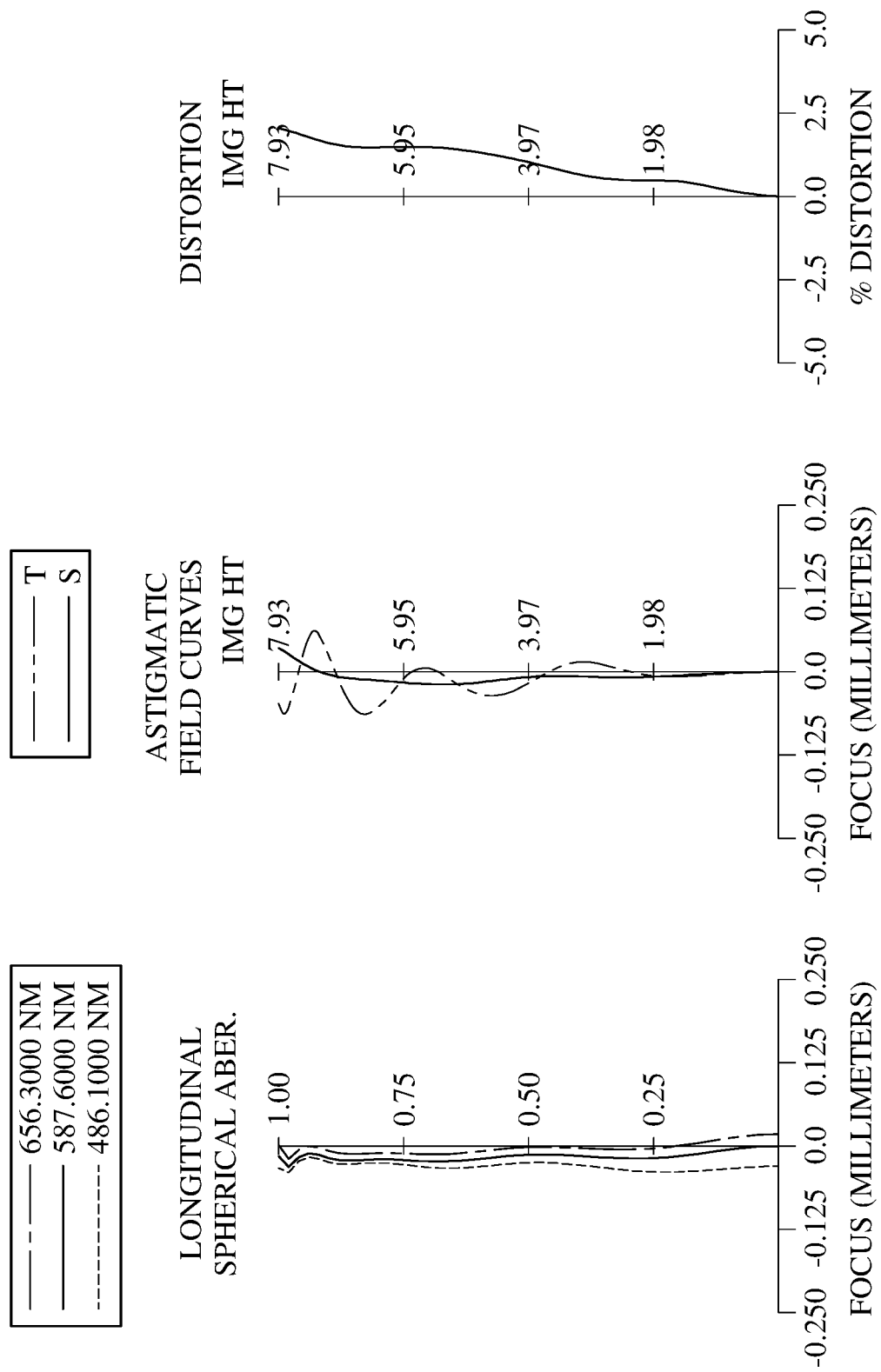
FIG. 8 shows spherical aberration curves, astigmatic field curves and a distortion curve of the image capturing unit according to the 4th embodiment.

FIG. 7 is a schematic view of an image capturing unit according to the 4th embodiment of the present disclosure. FIG. 8 shows, in order from left to right, spherical aberration curves, astigmatic field curves and a distortion curve of the image capturing unit according to the 4th embodiment. In FIG. 7, the image capturing unit includes the photographing lens assembly (its reference numeral is omitted) of the present disclosure and an image sensor 499. The photographing lens assembly includes, in order from an object side to an image side, an aperture stop 400, a first lens element 410, a second lens element 420, a third lens element 430, a stop 401, a fourth lens element 440, a fifth lens element 450, a sixth lens element 460, a seventh lens element 470, an eighth lens element 480, an IR-cut filter 490 and an image surface 495. The photographing lens assembly includes eight lens elements (410, 420, 430, 440, 450, 460, 470 and 480) with no additional lens element disposed between each of the adjacent eight lens elements.

The first lens element 410 with positive refractive power has an object-side surface 411 being convex in a paraxial region thereof and an image-side surface 412 being concave in a paraxial region thereof. The first lens element 410 is made of plastic material and has the object-side surface 411 and the image-side surface 412 being both aspheric. The object-side surface 411 of the first lens element 410 has at least one inflection point. The image-side surface 412 of the first lens element 410 has at least one inflection point.

The second lens element 420 with negative refractive power has an object-side surface 421 being convex in a paraxial region thereof and an image-side surface 422 being concave in a paraxial region thereof. The second lens element 420 is made of plastic material and has the object-side surface 421 and the image-side surface 422 being both aspheric. The image-side surface 422 of the second lens element 420 has at least one inflection point.

The third lens element 430 with positive refractive power has an object-side surface 431 being convex in a paraxial region thereof and an image-side surface 432 being concave in a paraxial region thereof. The third lens element 430 is made of plastic material and has the object-side surface 431 and the image-side surface 432 being both aspheric.

The fourth lens element 440 with negative refractive power has an object-side surface 441 being convex in a paraxial region thereof and an image-side surface 442 being concave in a paraxial region thereof. The fourth lens element 440 is made of plastic material and has the object-side surface 441 and the image-side surface 442 being both aspheric. The object-side surface 441 of the fourth lens element 440 has at least one inflection point. The image-side surface 442 of the fourth lens element 440 has at least one inflection point.

The fifth lens element 450 with positive refractive power has an object-side surface 451 being convex in a paraxial region thereof and an image-side surface 452 being concave in a paraxial region thereof. The fifth lens element 450 is made of plastic material and has the object-side surface 451 and the image-side surface 452 being both aspheric. The object-side surface 451 of the fifth lens element 450 has at least one inflection point. The image-side surface 452 of the fifth lens element 450 has at least one inflection point.

The sixth lens element 460 with positive refractive power has an object-side surface 461 being convex in a paraxial region thereof and an image-side surface 462 being concave in a paraxial region thereof. The sixth lens element 460 is made of plastic material and has the object-side surface 461 and the image-side surface 462 being both aspheric. The object-side surface 461 of the sixth lens element 460 has at least one inflection point. The image-side surface 462 of the sixth lens element 460 has at least one inflection point. The image-side surface 462 of the sixth lens element 460 has one convex critical point in an off-axis region thereof.

The seventh lens element 470 with positive refractive power has an object-side surface 471 being convex in a paraxial region thereof and an image-side surface 472 being concave in a paraxial region thereof. The seventh lens element 470 is made of plastic material and has the object-side surface 471 and the image-side surface 472 being both aspheric. The object-side surface 471 of the seventh lens element 470 has at least one inflection point. The image-side surface 472 of the seventh lens element 470 has at least one inflection point. The object-side surface 471 of the seventh lens element 470 has one concave critical point in an off-axis region thereof. The image-side surface 472 of the seventh lens element 470 has one convex critical point in an off-axis region thereof.

The eighth lens element 480 with negative refractive power has an object-side surface 481 being concave in a paraxial region thereof and an image-side surface 482 being concave in a paraxial region thereof. The eighth lens element 480 is made of plastic material and has the object-side surface 481 and the image-side surface 482 being both aspheric. The object-side surface 481 of the eighth lens element 480 has at least one inflection point. The image-side surface 482 of the eighth lens element 480 has at least one inflection point. The object-side surface 481 of the eighth lens element 480 has one convex critical point in an off-axis region thereof.

The IR-cut filter 490 is made of glass material and located between the eighth lens element 480 and the image surface 495, and will not affect the focal length of the photographing lens assembly. The image sensor 499 is disposed on or near the image surface 495 of the photographing lens assembly.

The detailed optical data of the 4th embodiment are shown in Table 7 and the aspheric surface data are shown in Table 8 below.

TABLE 7

4th Embodiment
f = 8.78 mm, Fno = 1.95, HFOV = 41.6 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −1.045 | | | | |
| 2 | Lens 1 | 2.879 | (ASP) | 1.156 | Plastic | 1.545 | 56.1 | 7.22 |
| 3 | | 9.228 | (ASP) | 0.060 | | | | |
| 4 | Lens 2 | 14.984 | (ASP) | 0.330 | Plastic | 1.669 | 19.5 | −20.45 |
| 5 | | 7.089 | (ASP) | 0.298 | | | | |
| 6 | Lens 3 | 8.415 | (ASP) | 0.437 | Plastic | 1.544 | 56.0 | 54.86 |
| 7 | | 11.505 | (ASP) | 0.242 | | | | |
| 8 | Stop | Plano | | 0.301 | | | | |
| 9 | Lens 4 | 99.010 | (ASP) | 0.360 | Plastic | 1.669 | 19.5 | −54.09 |
| 10 | | 26.464 | (ASP) | 0.320 | | | | |
| 11 | Lens 5 | 21.743 | (ASP) | 0.410 | Plastic | 1.566 | 37.4 | 49.13 |
| 12 | | 99.010 | (ASP) | 0.739 | | | | |
| 13 | Lens 6 | 23.076 | (ASP) | 0.460 | Plastic | 1.614 | 26.0 | 132.44 |
| 14 | | 31.980 | (ASP) | 0.564 | | | | |
| 15 | Lens 7 | 5.314 | (ASP) | 0.938 | Plastic | 1.566 | 37.4 | 176.92 |
| 16 | | 5.253 | (ASP) | 1.030 | | | | |
| 17 | Lens 8 | −5.523 | (ASP) | 0.819 | Plastic | 1.534 | 55.9 | −9.77 |
| 18 | | 99.010 | (ASP) | 0.400 | | | | |
| 19 | IR-cut Filter | Plano | | 0.300 | Glass | 1.517 | 64.2 | — |
| 20 | | Plano | | 0.316 | | | | |
| 21 | Image | Plano | | 0.000 | | | | |

Note:
Reference wavelength is 587.6 nm (d-line).
An effective radius of the stop 401 (Surface 8) is 1.795 mm.

TABLE 8

Aspheric Coefficients

| Surface # | 2 | 3 | 4 | 5 | 6 | 7 |
|---|---|---|---|---|---|---|
| k= | 1.4333E−01 | −8.9079E+01 | 2.8768E+01 | 4.9263E+00 | −3.5674E+01 | 0.0000E+00 |
| A4= | −1.5877E−03 | −4.9261E−03 | −2.0840E−02 | −8.8828E−03 | −1.8244E−03 | −8.9703E−03 |
| A6= | 1.3391E−03 | 8.5371E−03 | 2.0056E−02 | 9.8981E−03 | −2.9158E−03 | 3.0748E−03 |
| A8= | −1.1368E−03 | −1.4315E−03 | −7.0535E−03 | −2.5982E−03 | 7.8122E−03 | −5.1969E−04 |
| A10= | 5.1921E−04 | −1.2966E−03 | 4.5236E−04 | −6.1108E−04 | −6.8389E−03 | −3.8645E−04 |
| A12= | −1.3925E−04 | 7.1962E−04 | 4.2239E−04 | 6.1199E−04 | 3.6039E−03 | 6.6481E−04 |
| A14= | 1.9783E−05 | −1.3656E−04 | −1.1199E−04 | −1.2659E−04 | −1.1270E−03 | −3.1083E−04 |
| A16= | −1.2517E−06 | 9.0421E−06 | 8.3811E−06 | 7.3258E−06 | 2.1745E−04 | 6.7627E−05 |
| A18= | — | — | — | — | −2.4529E−05 | −5.4957E−06 |
| A20= | — | — | — | — | 1.2604E−06 | — |

| Surface # | 9 | 10 | 11 | 12 | 13 | 14 |
|---|---|---|---|---|---|---|
| k= | 0.0000E+00 | 0.0000E+00 | −1.0805E+01 | 0.0000E+00 | 2.8456E+01 | 0.0000E+00 |
| A4= | −1.9739E−02 | −1.9521E−02 | −5.6213E−03 | −4.4183E−03 | 5.2749E−04 | −5.5161E−03 |
| A6= | −7.1700E−03 | 8.1571E−03 | −8.8414E−03 | −9.3285E−03 | −6.9913E−03 | −3.4727E−03 |
| A8= | 1.0574E−02 | −6.1733E−03 | 5.7112E−03 | 5.5692E−03 | 1.2244E−03 | 5.1944E−04 |
| A10= | −1.0263E−02 | 8.6060E−03 | −1.5663E−03 | −1.6769E−03 | −1.2148E−04 | −2.0535E−05 |
| A12= | 5.9590E−03 | −6.1184E−03 | −6.2335E−05 | 2.4276E−04 | 1.4127E−05 | 3.1123E−06 |
| A14= | −2.1146E−03 | 2.4594E−03 | 1.3805E−04 | −8.2014E−06 | −3.1528E−06 | −8.1421E−07 |
| A16= | 4.3764E−04 | −5.6436E−04 | −3.2494E−05 | −1.8732E−06 | 3.8190E−07 | 7.9160E−08 |
| A18= | −4.6038E−05 | 6.8883E−05 | 3.2242E−06 | 2.1595E−07 | −1.5420E−08 | −3.3984E−09 |
| A20= | 1.6037E−06 | −3.4511E−06 | −1.1963E−07 | −6.8235E−09 | — | 5.6052E−11 |

| Surface # | 15 | 16 | 17 | 18 |
|---|---|---|---|---|
| k= | −2.1050E−01 | 0.0000E+00 | −1.0000E+00 | 0.0000E+00 |
| A4= | −2.5345E−02 | −1.6039E−02 | −8.1335E−03 | −9.9771E−03 |
| A6= | 7.4899E−04 | −5.6224E−04 | −6.4442E−04 | −4.1563E−04 |
| A8= | −6.3532E−05 | 3.4904E−04 | 3.8824E−04 | 2.3717E−04 |
| A10= | 2.6827E−05 | −5.7048E−05 | −4.6977E−05 | −2.8496E−05 |
| A12= | −3.0073E−06 | 5.6062E−06 | 2.8468E−06 | 1.8470E−06 |
| A14= | 1.5071E−07 | −3.5113E−07 | −9.8932E−08 | −7.2143E−08 |
| A16= | −3.6441E−09 | 1.3272E−08 | 2.0005E−09 | 1.6856E−09 |
| A18= | 3.5992E−11 | −2.7022E−10 | −2.1877E−11 | −2.1585E−11 |
| A20= | −4.3429E−14 | 2.2483E−12 | 9.9628E−14 | 1.1607E−13 |

In the 4th embodiment, the equation of the aspheric surface profiles of the aforementioned lens elements is the same as the equation of the 1st embodiment. Also, the definitions of these parameters shown in the following table are the same as those stated in the aforementioned embodiments with corresponding values for the 4th embodiment, so an explanation in this regard will not be provided again.

Moreover, these parameters can be calculated from Table 7 and Table 8 as the following values and satisfy the following conditions:

| 4th Embodiment | | | |
|---|---|---|---|
| f [mm] | 8.78 | \|f8/f4\| | 0.18 |
| Fno | 1.95 | \|f8/f5\| | 0.20 |
| HFOV [deg.] | 41.6 | \|f8/f6\| | 0.07 |
| ΣCT/ΣAT | 1.38 | \|f8/f7\| | 0.06 |
| T78/T12 | 17.17 | f/f2 | −0.43 |
| T78/T23 | 3.46 | f/R12 | 0.27 |
| T78/T34 | 1.90 | TL/ImgH | 1.20 |
| T78/T45 | 3.22 | ImgH/R1 | 2.75 |
| T78/T56 | 1.39 | V1/N1 | 36.30 |
| T78/T67 | 1.83 | V2/N2 | 11.65 |
| ΣAT/T78 | 3.45 | V3/N3 | 36.26 |
| ImgH/Y11 | 3.53 | V4/N4 | 11.65 |
| (R15 + R16)/(R15 − R16) | −0.89 | V5/N5 | 23.91 |
| \|f1/f8\| | 0.74 | V6/N6 | 16.09 |
| \|f/f3\| + \|f/f4\| + \|f/f5\| + \|f/f6\| | 0.57 | V7/N7 | 23.91 |
| ImgH/BL | 7.81 | V8/N8 | 36.46 |
| \|f1/f2\| | 0.35 | V20 | 2 |
| \|f1/f3\| | 0.13 | V40 | 5 |
| \|f1/f4\| | 0.13 | NLR_80 | 3 |
| \|f1/f5\| | 0.15 | NLR_50 | 2 |
| \|f1/f6\| | 0.05 | Yc71 [mm] | 1.45 |
| \|f1/f7\| | 0.04 | Yc72 [mm] | 1.87 |
| f5/R9 | 2.26 | Yc71/Yc72 | 0.78 |
| \|f8/f2\| | 0.48 | Yc81 [mm] | 5.40 |
| \|f8/f3\| | 0.18 | Yc81/ImgH | 0.68 |

5th Embodiment

Figure 9:
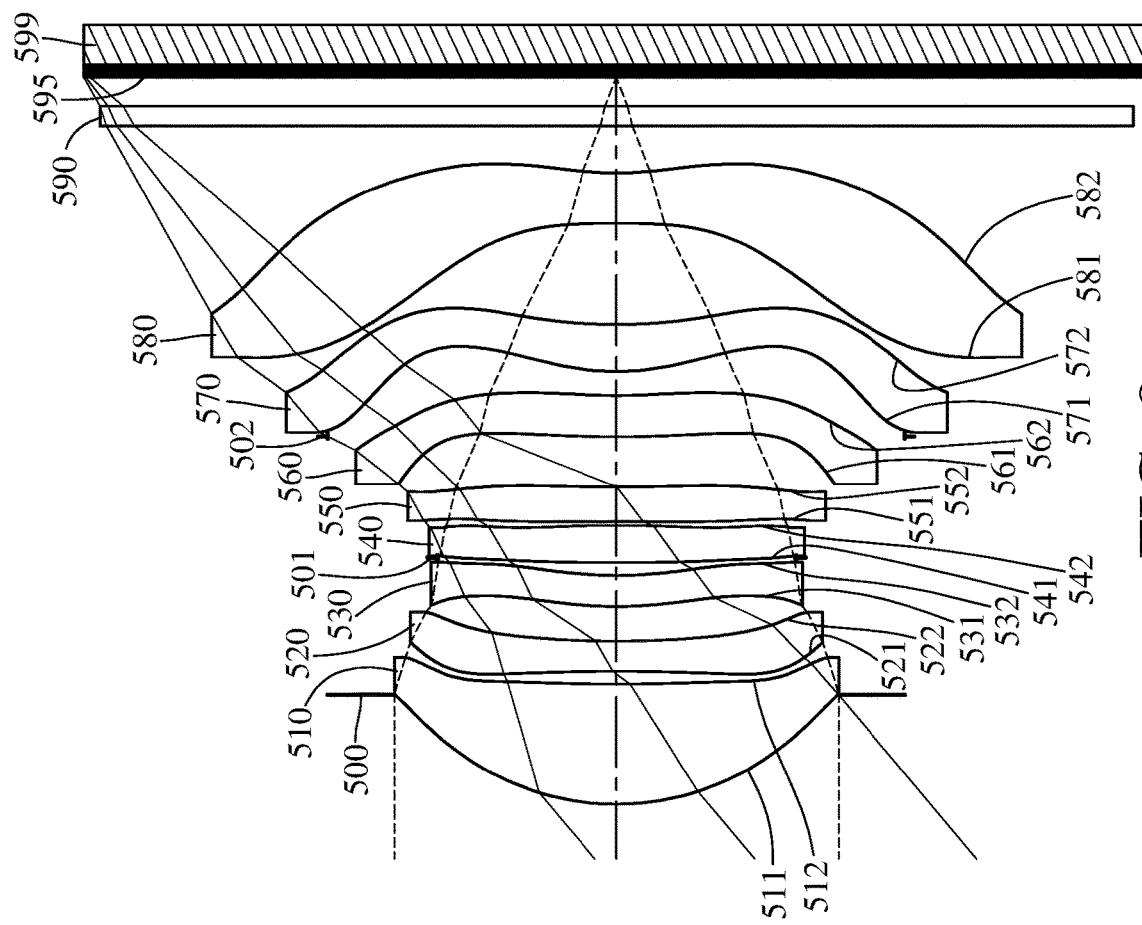
FIG. 9 is a schematic view of an image capturing unit according to the 5th embodiment of the present disclosure.
Figure 10:
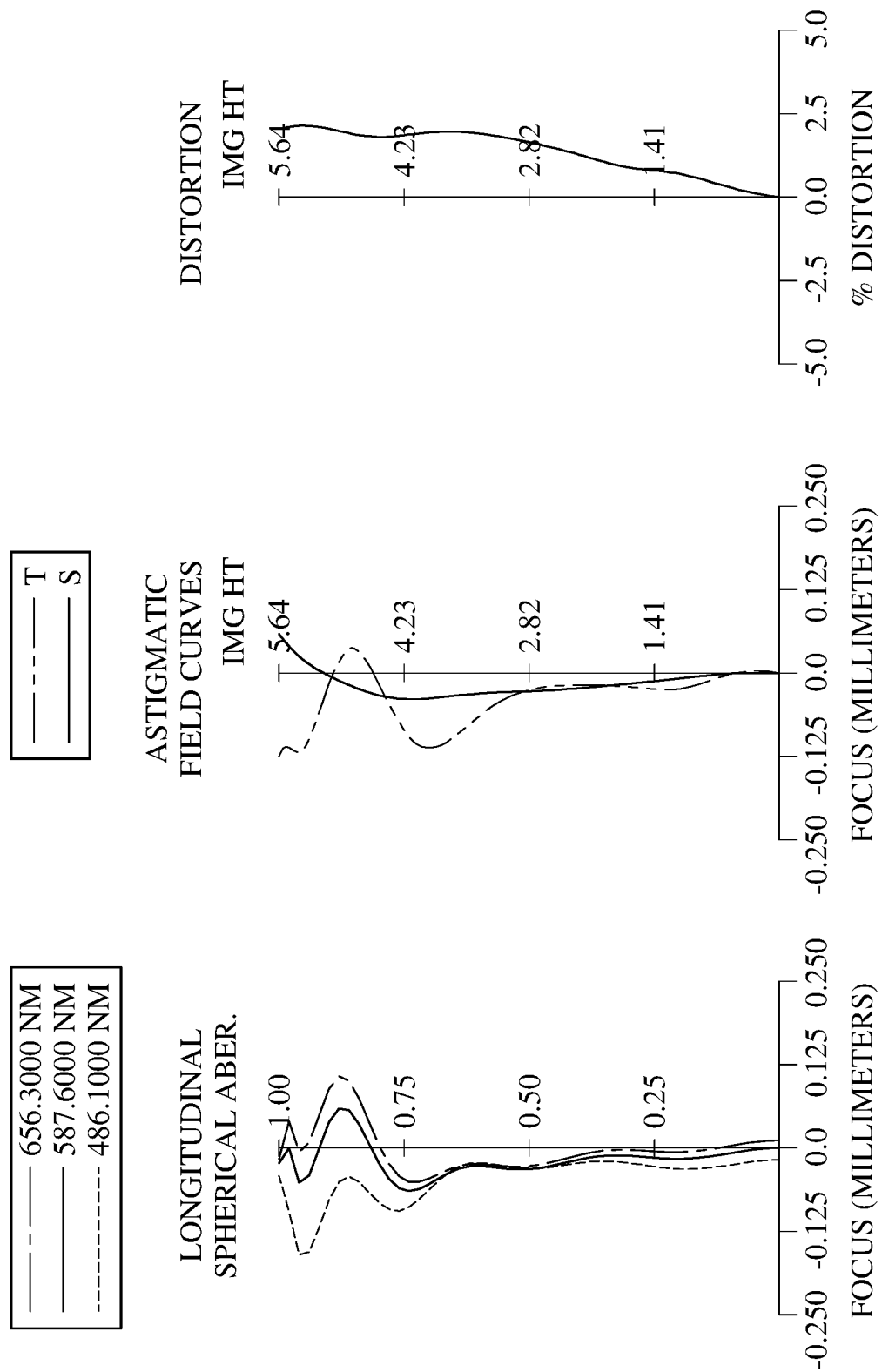
FIG. 10 shows spherical aberration curves, astigmatic field curves and a distortion curve of the image capturing unit according to the 5th embodiment.

FIG. 9 is a schematic view of an image capturing unit according to the 5th embodiment of the present disclosure. FIG. 10 shows, in order from left to right, spherical aberration curves, astigmatic field curves and a distortion curve of the image capturing unit according to the 5th embodiment. In FIG. 9, the image capturing unit includes the photographing lens assembly (its reference numeral is omitted) of the present disclosure and an image sensor 599. The photographing lens assembly includes, in order from an object side to an image side, an aperture stop 500, a first lens element 510, a second lens element 520, a third lens element 530, a stop 501, a fourth lens element 540, a fifth lens element 550, a sixth lens element 560, a stop 502, a seventh lens element 570, an eighth lens element 580, an IR-cut filter 590 and an image surface 595. The photographing lens assembly includes eight lens elements (510, 520, 530, 540, 550, 560, 570 and 580) with no additional lens element disposed between each of the adjacent eight lens elements.

The first lens element 510 with positive refractive power has an object-side surface 511 being convex in a paraxial region thereof and an image-side surface 512 being concave in a paraxial region thereof. The first lens element 510 is made of plastic material and has the object-side surface 511 and the image-side surface 512 being both aspheric. The object-side surface 511 of the first lens element 510 has at least one inflection point. The image-side surface 512 of the first lens element 510 has at least one inflection point.

The second lens element 520 with negative refractive power has an object-side surface 521 being concave in a paraxial region thereof and an image-side surface 522 being concave in a paraxial region thereof. The second lens element 520 is made of plastic material and has the object-side surface 521 and the image-side surface 522 being both aspheric. The object-side surface 521 of the second lens element 520 has at least one inflection point. The image-side surface 522 of the second lens element 520 has at least one inflection point.

The third lens element 530 with positive refractive power has an object-side surface 531 being convex in a paraxial region thereof and an image-side surface 532 being concave in a paraxial region thereof. The third lens element 530 is made of plastic material and has the object-side surface 531 and the image-side surface 532 being both aspheric. The object-side surface 531 of the third lens element 530 has at least one inflection point. The image-side surface 532 of the third lens element 530 has at least one inflection point.

The fourth lens element 540 with positive refractive power has an object-side surface 541 being convex in a paraxial region thereof and an image-side surface 542 being convex in a paraxial region thereof. The fourth lens element 540 is made of plastic material and has the object-side surface 541 and the image-side surface 542 being both aspheric. The object-side surface 541 of the fourth lens element 540 has at least one inflection point. The image-side surface 542 of the fourth lens element 540 has at least one inflection point.

The fifth lens element 550 with negative refractive power has an object-side surface 551 being convex in a paraxial region thereof and an image-side surface 552 being concave in a paraxial region thereof. The fifth lens element 550 is made of plastic material and has the object-side surface 551 and the image-side surface 552 being both aspheric. The object-side surface 551 of the fifth lens element 550 has at least one inflection point. The image-side surface 552 of the fifth lens element 550 has at least one inflection point.

The sixth lens element 560 with negative refractive power has an object-side surface 561 being convex in a paraxial region thereof and an image-side surface 562 being concave in a paraxial region thereof. The sixth lens element 560 is made of plastic material and has the object-side surface 561 and the image-side surface 562 being both aspheric. The object-side surface 561 of the sixth lens element 560 has at least one inflection point. The image-side surface 562 of the sixth lens element 560 has at least one inflection point. The image-side surface 562 of the sixth lens element 560 has one convex critical point in an off-axis region thereof.

The seventh lens element 570 with positive refractive power has an object-side surface 571 being convex in a paraxial region thereof and an image-side surface 572 being concave in a paraxial region thereof. The seventh lens element 570 is made of plastic material and has the object-side surface 571 and the image-side surface 572 being both aspheric. The object-side surface 571 of the seventh lens element 570 has at least one inflection point. The image-side surface 572 of the seventh lens element 570 has at least one inflection point. The object-side surface 571 of the seventh lens element 570 has one concave critical point in an off-axis region thereof. The image-side surface 572 of the seventh lens element 570 has one convex critical point in an off-axis region thereof.

The eighth lens element 580 with negative refractive power has an object-side surface 581 being concave in a paraxial region thereof and an image-side surface 582 being concave in a paraxial region thereof. The eighth lens element 580 is made of plastic material and has the object-side surface 581 and the image-side surface 582 being both aspheric. The object-side surface 581 of the eighth lens element 580 has at least one inflection point. The image-side surface 582 of the eighth lens element 580 has at least one inflection point. The object-side surface 581 of the eighth lens element 580 has one convex critical point in an off-axis region thereof.

The IR-cut filter 590 is made of glass material and located between the eighth lens element 580 and the image surface 595, and will not affect the focal length of the photographing lens assembly. The image sensor 599 is disposed on or near the image surface 595 of the photographing lens assembly.

The detailed optical data of the 5th embodiment are shown in Table 9 and the aspheric surface data are shown in Table 10 below.

TABLE 9

5th Embodiment
f = 6.61 mm, Fno = 1.40, HFOV = 40.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −1.166 | | | | |
| 2 | Lens 1 | 2.795 | (ASP) | 1.283 | Plastic | 1.545 | 56.1 | 5.93 |
| 3 | | 17.356 | (ASP) | 0.133 | | | | |
| 4 | Lens 2 | −34.065 | (ASP) | 0.320 | Plastic | 1.669 | 19.4 | −10.65 |
| 5 | | 9.039 | (ASP) | 0.370 | | | | |
| 6 | Lens 3 | 3.869 | (ASP) | 0.330 | Plastic | 1.669 | 19.4 | 72.10 |
| 7 | | 4.062 | (ASP) | 0.191 | | | | |
| 8 | Stop | Plano | | −0.054 | | | | |
| 9 | Lens 4 | 19.811 | (ASP) | 0.395 | Plastic | 1.544 | 56.0 | 25.99 |
| 10 | | −49.026 | (ASP) | 0.041 | | | | |
| 11 | Lens 5 | 39.319 | (ASP) | 0.373 | Plastic | 1.544 | 56.0 | −346.25 |
| 12 | | 32.420 | (ASP) | 0.536 | | | | |
| 13 | Lens 6 | 9.032 | (ASP) | 0.438 | Plastic | 1.566 | 37.4 | −24.95 |
| 14 | | 5.413 | (ASP) | −0.433 | | | | |
| 15 | Stop | Plano | | 0.690 | | | | |
| 16 | Lens 7 | 2.584 | (ASP) | 0.499 | Plastic | 1.544 | 56.0 | 7.47 |
| 17 | | 6.613 | (ASP) | 1.076 | | | | |
| 18 | Lens 8 | −15.433 | (ASP) | 0.541 | Plastic | 1.534 | 55.9 | −5.25 |
| 19 | | 3.469 | (ASP) | 0.500 | | | | |
| 20 | IR-cut Filter | Plano | | 0.210 | Glass | 1.517 | 64.2 | — |
| 21 | | Plano | | 0.306 | | | | |
| 22 | Image | Plano | | 0.000 | | | | |

Note:
Reference wavelength is 587.6 nm (d-line).
An effective radius of the image-side surface 522 (Surface 5) is 2.030 mm.
An effective radius of the stop 501 (Surface 8) is 1.910 mm.
An effective radius of the stop 502 (Surface 15) is 3.070 mm.

TABLE 10

Aspheric Coefficients

| Surface # | 2 | 3 | 4 | 5 | 6 | 7 |
|---|---|---|---|---|---|---|
| k= | −1.6341E−01 | −1.9233E+01 | −6.6861E+01 | 1.1285E+01 | −1.8972E−01 | −4.7910E+00 |
| A4= | 3.2122E−04 | −1.8049E−02 | −3.0656E−02 | −3.5046E−02 | −3.5070E−02 | −2.6152E−02 |
| A6= | −1.2559E−04 | 2.5859E−02 | 6.1611E−02 | 6.2573E−02 | −3.0714E−02 | 1.2464E−02 |
| A8= | 6.8685E−04 | −2.5037E−02 | −6.1840E−02 | −6.3359E−02 | 5.7010E−02 | −2.0897E−02 |
| A10= | −5.6141E−04 | 1.1715E−02 | 3.4257E−02 | 3.9718E−02 | −5.1008E−02 | 1.4296E−02 |
| A12= | 1.8424E−04 | −2.5437E−03 | −1.0464E−02 | −1.5313E−02 | 2.6183E−02 | −5.3187E−03 |
| A14= | −2.6711E−05 | 2.5339E−04 | 1.7951E−03 | 3.6568E−03 | −7.8852E−03 | 1.3717E−03 |
| A16= | 1.3584E−06 | −9.3366E−06 | −1.5976E−04 | −5.2200E−04 | 1.3609E−03 | −2.5769E−04 |
| A18= | — | — | 5.1864E−06 | 3.9641E−05 | −1.2351E−04 | 2.9877E−05 |
| A20= | — | — | 6.1601E−08 | −1.1793E−06 | 4.5360E−06 | −1.4986E−06 |

| Surface # | 9 | 10 | 11 | 12 | 13 | 14 |
|---|---|---|---|---|---|---|
| k= | 3.3071E+01 | −4.2971E+01 | −2.2639E+00 | −1.9875E+01 | 2.3480E−01 | −4.8317E+00 |
| A4= | −7.1820E−02 | −1.3183E−01 | −4.5373E−02 | 2.8089E−02 | −5.1145E−02 | −1.0960E−01 |
| A6= | 1.8996E−01 | 2.8025E−01 | 8.0514E−02 | −6.3269E−02 | 5.8347E−02 | 8.6681E−02 |
| A8= | −2.3125E−01 | −2.8143E−01 | −7.3704E−02 | 5.2931E−02 | −4.9690E−02 | −5.3850E−02 |
| A10= | 1.5892E−01 | 1.7497E−01 | 4.2032E−02 | −2.8045E−02 | 2.6085E−02 | 2.3058E−02 |
| A12 = | −6.7096E−02 | −7.0333E−02 | −1.4683E−02 | 9.9748E−03 | −8.8299E−03 | −6.5656E−03 |
| A14 = | 1.7705E−02 | 1.8101E−02 | 2.9414E−03 | −2.3568E−03 | 1.8810E−03 | 1.1896E−03 |
| A16 = | −2.8253E−03 | −2.8843E−03 | −2.9705E−04 | 3.5341E−04 | −2.4303E−04 | −1.2996E−04 |
| A18 = | 2.4721E−04 | 2.6115E−04 | 9.4492E−06 | −3.0152E−05 | 1.7337E−05 | 7.7537E−06 |
| A20 = | −9.0389E−06 | −1.0339E−05 | 2.9435E−07 | 1.1004E−06 | −5.1848E−07 | −1.9338E−07 |

TABLE 10-continued

| Aspheric Coefficients | | | | |
|---|---|---|---|---|
| Surface # | 16 | 17 | 18 | 19 |
| k = | −7.5549E−01 | −3.6826E+01 | 7.0844E−01 | −1.1066E+00 |
| A4 = | −3.7576E−02 | 5.4137E−02 | −6.9063E−02 | −7.3722E−02 |
| A6 = | 3.4691E−03 | −4.1244E−02 | 1.2782E−02 | 1.7020E−02 |
| A8 = | −4.0132E−03 | 1.4315E−02 | −7.3645E−04 | −2.6941E−03 |
| A10 = | 2.0578E−03 | −3.2005E−03 | −7.8002E−05 | 2.8185E−04 |
| A12 = | −5.5893E−04 | 4.6738E−04 | 1.8992E−05 | −1.8736E−05 |
| A14 = | 8.4560E−05 | −4.3892E−05 | −1.7053E−06 | 7.1320E−07 |
| A16 = | −7.0788E−06 | 2.5461E−06 | 8.2233E−08 | −1.1464E−08 |
| A18 = | 3.0695E−07 | −8.2707E−08 | −2.0908E−09 | −6.8554E−11 |
| A20 = | −5.3916E−09 | 1.1460E−09 | 2.1923E−11 | 3.2080E−12 |

In the 5th embodiment, the equation of the aspheric surface profiles of the aforementioned lens elements is the same as the equation of the 1st embodiment. Also, the definitions of these parameters shown in the following table are the same as those stated in the aforementioned embodiments with corresponding values for the 5th embodiment, so an explanation in this regard will not be provided again.

Moreover, these parameters can be calculated from Table 9 and Table 10 as the following values and satisfy the following conditions:

| 5th Embodiment | | | |
|---|---|---|---|
| f [mm] | 6.61 | |f8/f4| | 0.20 |
| Fno | 1.40 | |f8/f5| | 0.02 |
| HFOV [deg.] | 40.0 | |f8/f6| | 0.21 |
| ΣCT/ΣAT | 1.64 | |f8/f7| | 0.70 |
| T78/T12 | 8.09 | f/f2 | −0.62 |
| T78/T23 | 2.91 | f/R12 | 1.22 |
| T78/T34 | 7.85 | TL/ImgH | 1.37 |
| T78/T45 | 26.24 | ImgH/R1 | 2.02 |
| T78/T56 | 2.01 | V1/N1 | 36.30 |
| T78/T67 | 4.19 | V2/N2 | 11.65 |
| ΣAT/T78 | 2.37 | V3/N3 | 11.65 |
| ImgH/Y11 | 2.39 | V4/N4 | 36.26 |
| (R15 + R16)/(R15 − R16) | 0.63 | V5/N5 | 36.26 |
| |f1/f8| | 1.13 | V6/N6 | 23.91 |
| |f/f3| + |f/f4| + |f/f5| + |f/f6| | 0.63 | V7/N7 | 36.26 |
| ImgH/BL | 5.56 | V8/N8 | 36.46 |
| |f1/f2| | 0.56 | V20 | 2 |
| |f1/f3| | 0.08 | V40 | 3 |
| |f1/f4| | 0.23 | NLR_80 | 2 |
| |f1/f5| | 0.02 | NLR_50 | 2 |
| |f1/f6| | 0.24 | Yc71 [mm] | 1.66 |
| |f1/f7| | 0.79 | Yc72 [mm] | 1.73 |
| f5/R9 | −8.81 | Yc71/Yc72 | 0.96 |
| |f8/f2| | 0.49 | Yc81 [mm] | 3.84 |
| |f8/f3| | 0.07 | Yc81/ImgH | 0.68 |

6th Embodiment

Figure 11:
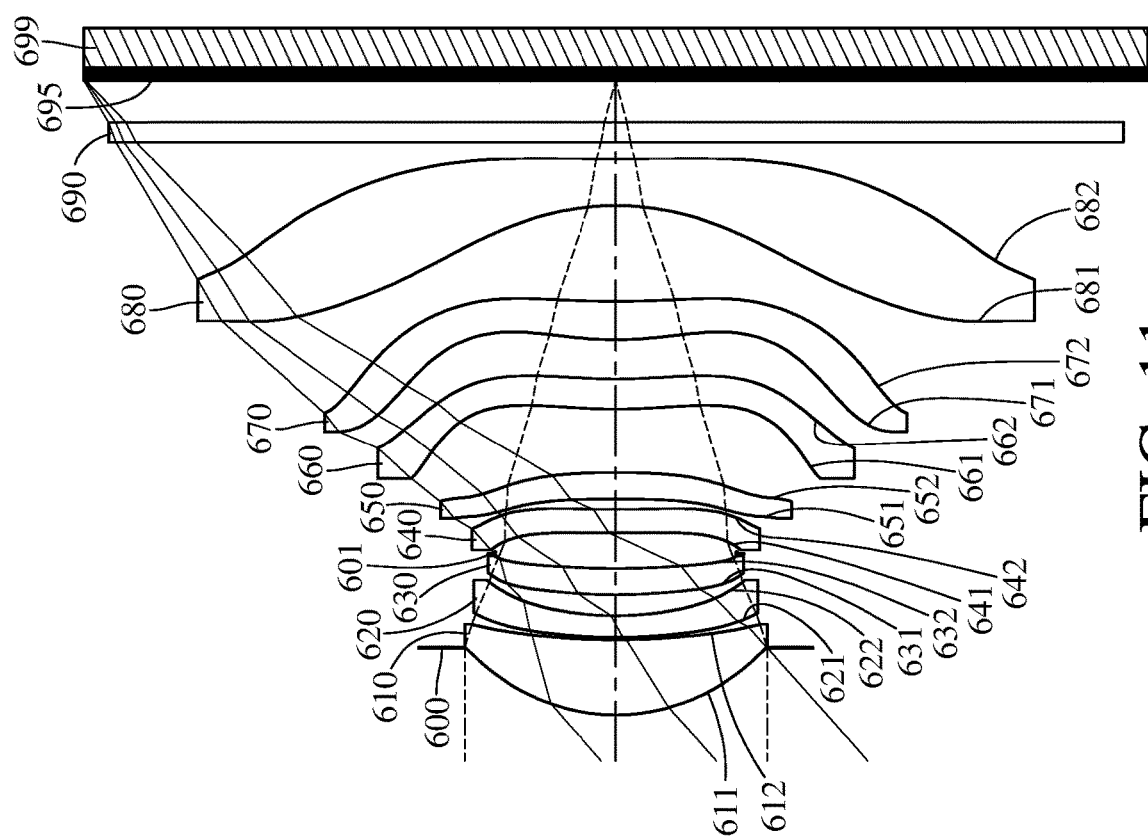
FIG. 11 is a schematic view of an image capturing unit according to the 6th embodiment of the present disclosure.
Figure 12:
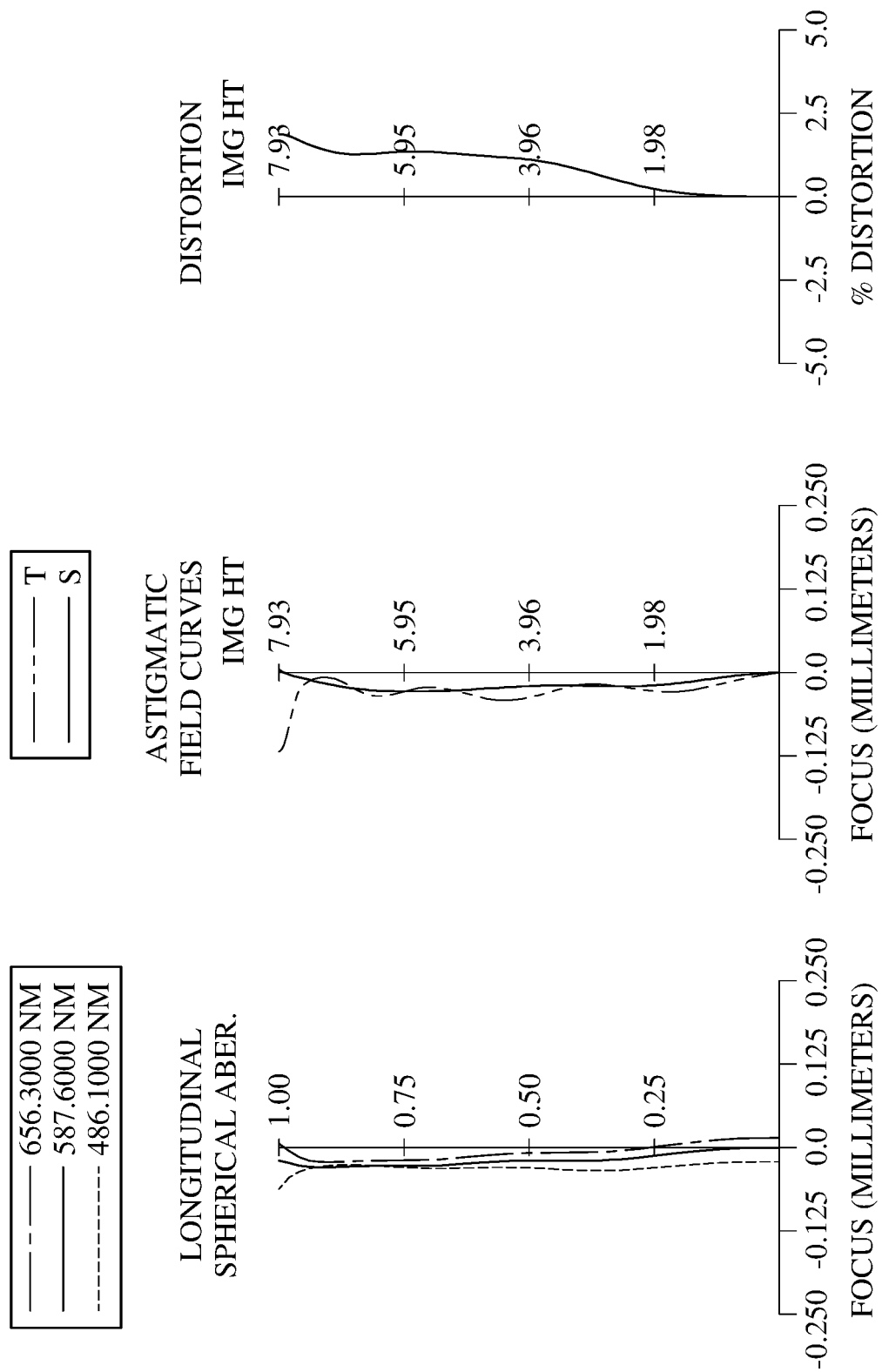
FIG. 12 shows spherical aberration curves, astigmatic field curves and a distortion curve of the image capturing unit according to the 6th embodiment.

FIG. 11 is a schematic view of an image capturing unit according to the 6th embodiment of the present disclosure. FIG. 12 shows, in order from left to right, spherical aberration curves, astigmatic field curves and a distortion curve of the image capturing unit according to the 6th embodiment. In FIG. 11, the image capturing unit includes the photographing lens assembly (its reference numeral is omitted) of the present disclosure and an image sensor 699. The photographing lens assembly includes, in order from an object side to an image side, an aperture stop 600, a first lens element 610, a second lens element 620, a third lens element 630, a stop 601, a fourth lens element 640, a fifth lens element 650, a sixth lens element 660, a seventh lens element 670, an eighth lens element 680, an IR-cut filter 690 and an image surface 695. The photographing lens assembly includes eight lens elements (610, 620, 630, 640, 650, 660, 670 and 680) with no additional lens element disposed between each of the adjacent eight lens elements.

The first lens element 610 with positive refractive power has an object-side surface 611 being convex in a paraxial region thereof and an image-side surface 612 being concave in a paraxial region thereof. The first lens element 610 is made of plastic material and has the object-side surface 611 and the image-side surface 612 being both aspheric. The object-side surface 611 of the first lens element 610 has at least one inflection point.

The second lens element 620 with negative refractive power has an object-side surface 621 being convex in a paraxial region thereof and an image-side surface 622 being concave in a paraxial region thereof. The second lens element 620 is made of plastic material and has the object-side surface 621 and the image-side surface 622 being both aspheric.

The third lens element 630 with positive refractive power has an object-side surface 631 being convex in a paraxial region thereof and an image-side surface 632 being concave in a paraxial region thereof. The third lens element 630 is made of plastic material and has the object-side surface 631 and the image-side surface 632 being both aspheric.

The fourth lens element 640 with negative refractive power has an object-side surface 641 being convex in a paraxial region thereof and an image-side surface 642 being concave in a paraxial region thereof. The fourth lens element 640 is made of plastic material and has the object-side surface 641 and the image-side surface 642 being both aspheric. The object-side surface 641 of the fourth lens element 640 has at least one inflection point. The image-side surface 642 of the fourth lens element 640 has at least one inflection point.

The fifth lens element 650 with positive refractive power has an object-side surface 651 being concave in a paraxial region thereof and an image-side surface 652 being convex in a paraxial region thereof. The fifth lens element 650 is made of plastic material and has the object-side surface 651 and the image-side surface 652 being both aspheric. The object-side surface 651 of the fifth lens element 650 has at least one inflection point. The image-side surface 652 of the fifth lens element 650 has at least one inflection point.

The sixth lens element 660 with negative refractive power has an object-side surface 661 being convex in a paraxial region thereof and an image-side surface 662 being concave in a paraxial region thereof. The sixth lens element 660 is made of plastic material and has the object-side surface 661 and the image-side surface 662 being both aspheric. The object-side surface 661 of the sixth lens element 660 has at least one inflection point. The image-side surface 662 of the sixth lens element 660 has at least one inflection point. The image-side surface 662 of the sixth lens element 660 has one convex critical point in an off-axis region thereof.

The seventh lens element 670 with positive refractive power has an object-side surface 671 being convex in a paraxial region thereof and an image-side surface 672 being concave in a paraxial region thereof. The seventh lens element 670 is made of plastic material and has the object-side surface 671 and the image-side surface 672 being both aspheric. The object-side surface 671 of the seventh lens element 670 has at least one inflection point. The image-side surface 672 of the seventh lens element 670 has at least one inflection point. The object-side surface 671 of the seventh lens element 670 has one concave critical point in an off-axis region thereof. The image-side surface 672 of the seventh lens element 670 has one convex critical point in an off-axis region thereof.

The eighth lens element 680 with negative refractive power has an object-side surface 681 being concave in a paraxial region thereof and an image-side surface 682 being concave in a paraxial region thereof. The eighth lens element 680 is made of plastic material and has the object-side surface 681 and the image-side surface 682 being both aspheric. The object-side surface 681 of the eighth lens element 680 has at least one inflection point. The image-side surface 682 of the eighth lens element 680 has at least one inflection point. The object-side surface 681 of the eighth lens element 680 has one convex critical point in an off-axis region thereof.

The IR-cut filter 690 is made of glass material and located between the eighth lens element 680 and the image surface 695, and will not affect the focal length of the photographing lens assembly. The image sensor 699 is disposed on or near the image surface 695 of the photographing lens assembly.

The detailed optical data of the 6th embodiment are shown in Table 11 and the aspheric surface data are shown in Table 12 below.

TABLE 11

6th Embodiment
f = 8.81 mm, Fno = 1.95, HFOV = 41.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | | Plano | −1.005 | | | | |
| 2 | Lens 1 | 2.965 | (ASP) | 1.125 | Plastic | 1.545 | 56.1 | 7.19 |
| 3 | | 10.548 | (ASP) | 0.036 | | | | |
| 4 | Lens 2 | 8.395 | (ASP) | 0.320 | Plastic | 1.669 | 19.5 | −16.62 |
| 5 | | 4.711 | (ASP) | 0.313 | | | | |
| 6 | Lens 3 | 8.429 | (ASP) | 0.391 | Plastic | 1.544 | 56.0 | 58.24 |
| 7 | | 11.296 | (ASP) | 0.219 | | | | |
| 8 | Stop | Plano | | 0.316 | | | | |
| 9 | Lens 4 | 32.317 | (ASP) | 0.350 | Plastic | 1.669 | 19.5 | −51.72 |
| 10 | | 16.638 | (ASP) | 0.156 | | | | |
| 11 | Lens 5 | −39.288 | (ASP) | 0.398 | Plastic | 1.566 | 37.4 | 44.14 |
| 12 | | −15.328 | (ASP) | 0.951 | | | | |
| 13 | Lens 6 | 7.731 | (ASP) | 0.450 | Plastic | 1.614 | 26.0 | −217.28 |
| 14 | | 7.146 | (ASP) | 0.592 | | | | |
| 16 | Lens 7 | 5.450 | (ASP) | 0.570 | Plastic | 1.566 | 37.4 | 14.04 |
| 17 | | 16.695 | (ASP) | 1.428 | | | | |
| 18 | Lens 8 | −3.915 | (ASP) | 0.700 | Plastic | 1.534 | 55.9 | −6.62 |
| 19 | | 38.321 | (ASP) | 0.257 | | | | |
| 20 | IR-cut Filter | Plano | | 0.300 | Glass | 1.517 | 64.2 | — |
| 21 | | Plano | | 0.621 | | | | |
| 22 | Image | Plano | | 0.000 | | | | |

Note:
Reference wavelength is 587.6 nm (d-line).
An effective radius of the stop 601 (Surface 8) is 1.805 mm.

TABLE 12

Aspheric Coefficients

| Surface # | 2 | 3 | 4 | 5 | 6 | 7 |
|---|---|---|---|---|---|---|
| k= | 5.7480E−02 | −8.3952E+01 | 3.0541E+00 | −1.4162E−02 | −3.0590E+01 | 9.9139E−01 |
| A4= | −1.5347E−04 | 2.8235E−03 | −7.5420E−03 | −1.7368E−03 | 2.1127E−04 | −6.9651E−03 |
| A6= | 1.2457E−04 | 3.3129E−03 | 8.2228E−03 | 4.2824E−03 | 6.1184E−04 | 2.0502E−04 |
| A8= | −1.4240E−04 | −3.2230E−03 | −5.0444E−03 | −1.7486E−03 | 7.0183E−04 | 4.4877E−03 |
| A10= | 6.5063E−05 | 1.5163E−03 | 2.1305E−03 | 7.6327E−04 | −2.8298E−04 | −6.2691E−03 |
| A12= | −2.2077E−05 | −3.7641E−04 | −4.9878E−04 | −1.6663E−04 | 1.9368E−04 | 5.2950E−03 |
| A14= | 3.7984E−06 | 4.7454E−05 | 5.9079E−05 | 2.7061E−05 | −6.4185E−05 | −2.6645E−03 |
| A16= | −3.1043E−07 | −2.4133E−06 | −2.6775E−06 | −2.9945E−06 | 1.7636E−05 | 8.0162E−04 |
| A18= | — | — | — | — | −3.4668E−06 | −1.3315E−04 |
| A20= | — | — | — | — | 3.1101E−07 | 9.4790E−06 |

| Surface # | 9 | 10 | 11 | 12 | 13 | 14 |
|---|---|---|---|---|---|---|

TABLE 12-continued

| Aspheric Coefficients | | | | | | |
|---|---|---|---|---|---|---|
| k= | 9.0000E+01 | 0.0000E+00 | −9.0000E+01 | 0.0000E+00 | 2.9451E+00 | −5.6127E+01 |
| A4= | −2.0104E−02 | −2.2831E−02 | −2.5984E−02 | −2.4380E−02 | −2.7781E−02 | −1.7162E−02 |
| A6= | 4.2632E−03 | 9.1154E−03 | 6.9128E−03 | 6.3782E−03 | 8.8566E−03 | 3.3145E−03 |
| A8= | −9.2762E−03 | −1.1372E−02 | −2.9076E−03 | −3.6656E−03 | −4.4466E−03 | −1.1206E−03 |
| A10= | 9.3540E−03 | 8.0099E−03 | −3.9750E−04 | 1.5808E−03 | 1.5724E−03 | 2.9197E−04 |
| A12= | −5.9223E−03 | −3.7385E−03 | 9.6375E−04 | −4.1180E−04 | −4.0367E−04 | −6.2062E−05 |
| A14= | 2.3461E−03 | 1.1647E−03 | −3.6688E−04 | 8.1184E−05 | 6.8701E−05 | 8.8767E−06 |
| A16= | −5.6987E−04 | −2.3129E−04 | 6.6792E−05 | −1.1149E−05 | −7.2067E−06 | −7.3808E−07 |
| A18= | 7.6615E−05 | 2.6170E−05 | −6.2626E−06 | 8.4547E−07 | 4.1837E−07 | 3.2073E−08 |
| A20= | −4.3031E−06 | −1.2594E−06 | 2.4378E−07 | −2.5600E−08 | −1.0181E−08 | −5.6345E−10 |

| Surface # | 15 | 16 | 17 | 18 |
|---|---|---|---|---|
| k= | −8.1102E+00 | 1.2533E+01 | −6.4915E−01 | 0.0000E+00 |
| A4= | −1.1014E−02 | 1.9256E−03 | 3.1295E−03 | −5.3128E−03 |
| A6= | −1.9661E−03 | −5.1217E−03 | −9.8576E−04 | 1.6036E−04 |
| A8= | 1.0465E−04 | 9.7921E−04 | 2.3230E−04 | 3.6832E−05 |
| A10= | 1.0659E−04 | −8.5796E−05 | −2.3017E−05 | −6.8226E−06 |
| A12= | −2.7895E−05 | 1.9279E−06 | 1.2617E−06 | 5.3289E−07 |
| A14= | 3.1582E−06 | 2.8783E−07 | −4.1355E−08 | −2.2847E−08 |
| A16= | −1.8579E−07 | −2.8074E−08 | 8.0975E−10 | 5.5453E−10 |
| A18= | 5.5563E−09 | 1.0319E−09 | −8.7475E−12 | −7.1206E−12 |
| A20= | −6.6990E−11 | −1.4266E−11 | 4.0071E−14 | 3.7505E−14 |

In the 6th embodiment, the equation of the aspheric surface profiles of the aforementioned lens elements is the same as the equation of the 1st embodiment. Also, the definitions of these parameters shown in the following table are the same as those stated in the aforementioned embodiments with corresponding values for the 6th embodiment, so an explanation in this regard will not be provided again.

Moreover, these parameters can be calculated from Table 11 and Table 12 as the following values and satisfy the following conditions:

| 6th Embodiment | | | |
|---|---|---|---|
| f [mm] | 8.81 | |f8/f4| | 0.13 |
| Fno | 1.95 | |f8/f5| | 0.15 |
| HFOV [deg.] | 41.5 | |f8/f6| | 0.03 |
| ΣCT/ΣAT | 1.07 | |f8/f7| | 0.47 |
| T78/T12 | 39.67 | f/f2 | −0.53 |
| T78/T23 | 4.56 | f/R12 | 1.23 |
| T78/T34 | 2.67 | TL/ImgH | 1.20 |
| T78/T45 | 9.15 | ImgH/R1 | 2.67 |
| T78/T56 | 1.50 | V1/N1 | 36.30 |
| T78/T67 | 2.41 | V2/N2 | 11.65 |
| ΣAT/T78 | 2.81 | V3/N3 | 36.26 |
| ImgH/Y11 | 3.51 | V4/N4 | 11.65 |
| (R15 + R16)/(R15 − R16) | −0.81 | V5/N5 | 23.91 |
| |f1/f8| | 1.09 | V6/N6 | 16.09 |
| |f/f3| + |f/f4| + |f/f5| + |f/f6| | 0.56 | V7/N7 | 23.91 |
| ImgH/BL | 6.73 | V8/N8 | 36.46 |
| |f1/f2| | 0.43 | V20 | 2 |
| |f1/f3| | 0.12 | V40 | 5 |
| |f1/f4| | 0.14 | NLR_80 | 1 |
| |f1/f5| | 0.16 | NLR_50 | 0 |
| |f1/f6| | 0.03 | Yc71 [mm] | 1.55 |
| |f1/f7| | 0.51 | Yc72 [mm] | 1.46 |
| f5/R9 | −1.12 | Yc71/Yc72 | 1.06 |
| |f8/f2| | 0.40 | Yc81 [mm] | 5.45 |
| |f8/f3| | 0.11 | Yc81/ImgH | 0.69 |

7th Embodiment

Figure 13:
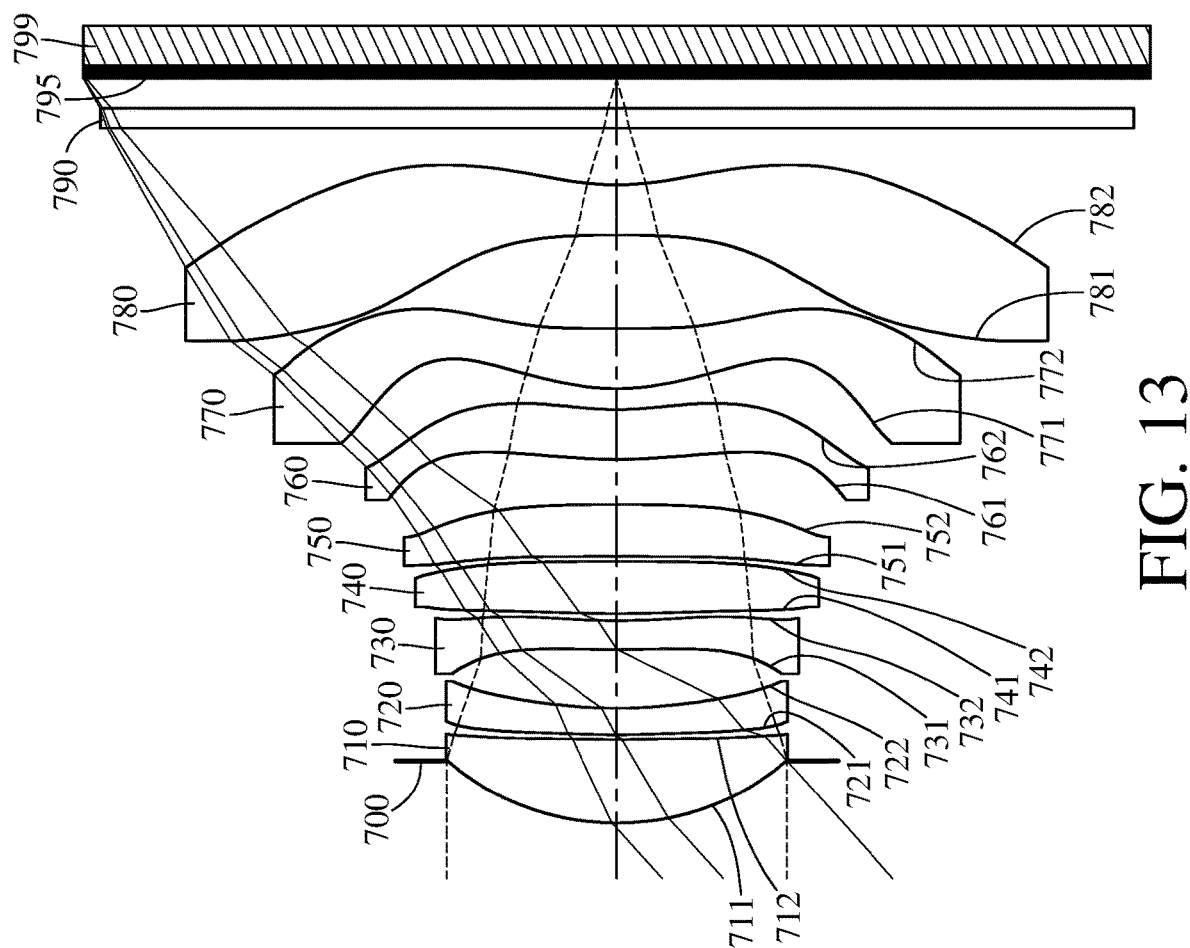
FIG. 13 is a schematic view of an image capturing unit according to the 7th embodiment of the present disclosure.
Figure 14:
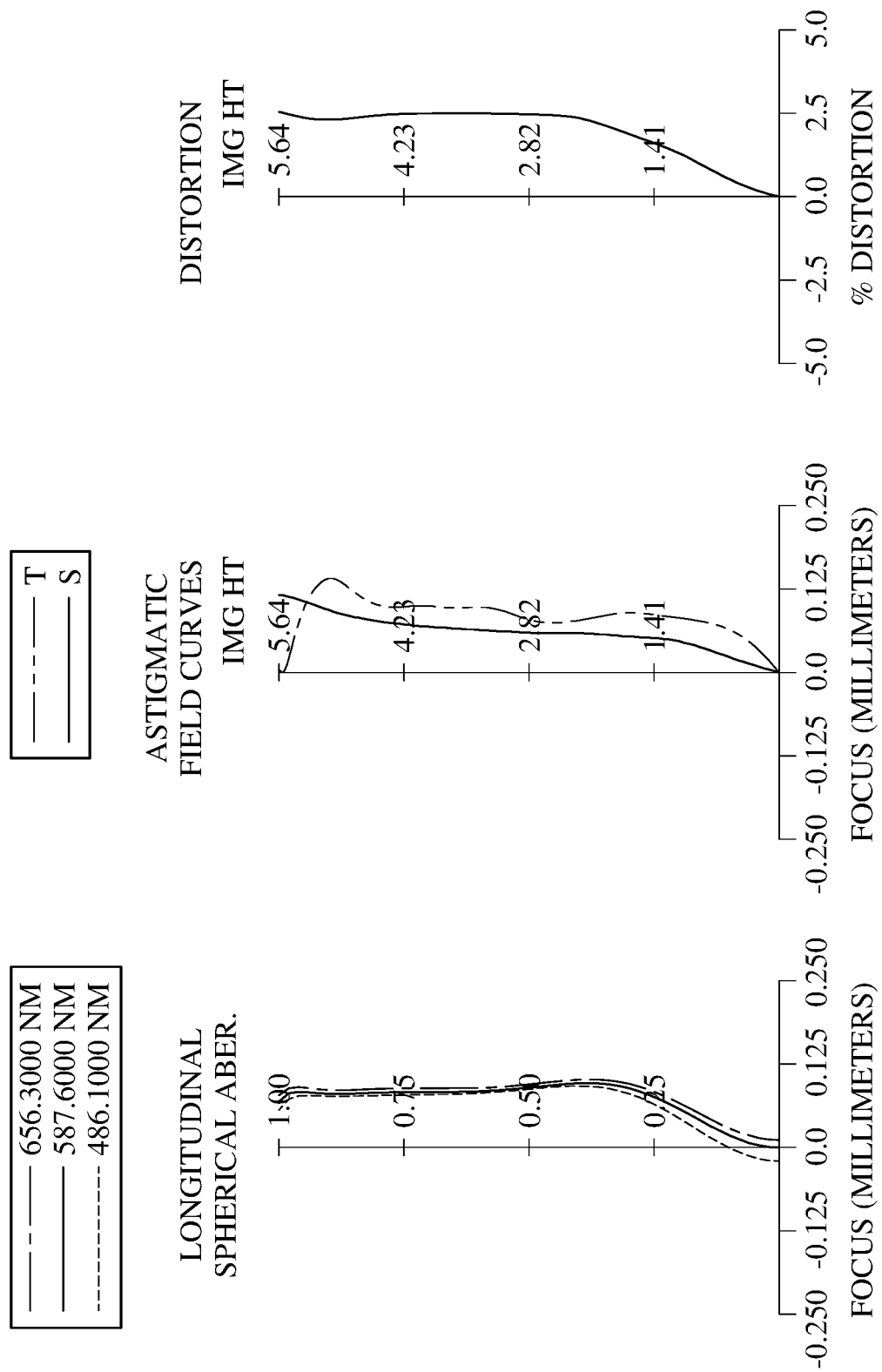
FIG. 14 shows spherical aberration curves, astigmatic field curves and a distortion curve of the image capturing unit according to the 7th embodiment.

FIG. 13 is a schematic view of an image capturing unit according to the 7th embodiment of the present disclosure. FIG. 14 shows, in order from left to right, spherical aberration curves, astigmatic field curves and a distortion curve of the image capturing unit according to the 7th embodiment. In FIG. 13, the image capturing unit includes the photographing lens assembly (its reference numeral is omitted) of the present disclosure and an image sensor 799. The photographing lens assembly includes, in order from an object side to an image side, an aperture stop 700, a first lens element 710, a second lens element 720, a third lens element 730, a fourth lens element 740, a fifth lens element 750, a sixth lens element 760, a seventh lens element 770, an eighth lens element 780, an IR-cut filter 790 and an image surface 795. The photographing lens assembly includes eight lens elements (710, 720, 730, 740, 750, 760, 770 and 780) with no additional lens element disposed between each of the adjacent eight lens elements.

The first lens element 710 with positive refractive power has an object-side surface 711 being convex in a paraxial region thereof and an image-side surface 712 being concave in a paraxial region thereof. The first lens element 710 is made of plastic material and has the object-side surface 711 and the image-side surface 712 being both aspheric. The image-side surface 712 of the first lens element 710 has at least one inflection point.

The second lens element 720 with negative refractive power has an object-side surface 721 being convex in a paraxial region thereof and an image-side surface 722 being concave in a paraxial region thereof. The second lens element 720 is made of plastic material and has the object-side surface 721 and the image-side surface 722 being both aspheric. The object-side surface 721 of the second lens element 720 has at least one inflection point.

The third lens element 730 with negative refractive power has an object-side surface 731 being convex in a paraxial region thereof and an image-side surface 732 being concave in a paraxial region thereof. The third lens element 730 is made of plastic material and has the object-side surface 731 and the image-side surface 732 being both aspheric. The object-side surface 731 of the third lens element 730 has at least one inflection point. The image-side surface 732 of the third lens element 730 has at least one inflection point.

The fourth lens element 740 with positive refractive power has an object-side surface 741 being convex in a paraxial region thereof and an image-side surface 742 being convex in a paraxial region thereof. The fourth lens element 740 is made of plastic material and has the object-side surface 741 and the image-side surface 742 being both aspheric. The object-side surface 741 of the fourth lens element 740 has at least one inflection point.

The fifth lens element 750 with positive refractive power has an object-side surface 751 being concave in a paraxial region thereof and an image-side surface 752 being convex in a paraxial region thereof. The fifth lens element 750 is made of plastic material and has the object-side surface 751 and the image-side surface 752 being both aspheric. The object-side surface 751 of the fifth lens element 750 has at least one inflection point. The image-side surface 752 of the fifth lens element 750 has at least one inflection point.

The sixth lens element 760 with negative refractive power has an object-side surface 761 being convex in a paraxial region thereof and an image-side surface 762 being concave in a paraxial region thereof. The sixth lens element 760 is made of plastic material and has the object-side surface 761 and the image-side surface 762 being both aspheric. The object-side surface 761 of the sixth lens element 760 has at least one inflection point. The image-side surface 762 of the sixth lens element 760 has at least one inflection point. The image-side surface 762 of the sixth lens element 760 has one convex critical point in an off-axis region thereof.

The seventh lens element 770 with positive refractive power has an object-side surface 771 being convex in a paraxial region thereof and an image-side surface 772 being convex in a paraxial region thereof. The seventh lens element 770 is made of plastic material and has the object-side surface 771 and the image-side surface 772 being both aspheric. The object-side surface 771 of the seventh lens element 770 has at least one inflection point. The image-side surface 772 of the seventh lens element 770 has at least one inflection point. The object-side surface 771 of the seventh lens element 770 has one concave critical point in an off-axis region thereof. The image-side surface 772 of the seventh lens element 770 has one convex critical point in an off-axis region thereof.

The eighth lens element 780 with negative refractive power has an object-side surface 781 being concave in a paraxial region thereof and an image-side surface 782 being concave in a paraxial region thereof. The eighth lens element 780 is made of plastic material and has the object-side surface 781 and the image-side surface 782 being both aspheric. The object-side surface 781 of the eighth lens element 780 has at least one inflection point. The image-side surface 782 of the eighth lens element 780 has at least one inflection point.

The IR-cut filter 790 is made of glass material and located between the eighth lens element 780 and the image surface 795, and will not affect the focal length of the photographing lens assembly. The image sensor 799 is disposed on or near the image surface 795 of the photographing lens assembly.

The detailed optical data of the 7th embodiment are shown in Table 13 and the aspheric surface data are shown in Table 14 below.

TABLE 13

7th Embodiment
f = 6.05 mm, Fno = 1.68, HFOV = 42.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.662 | | | | |
| 2 | Lens 1 | 2.848 | (ASP) | 0.889 | Plastic | 1.544 | 55.9 | 6.26 |
| 3 | | 15.522 | (ASP) | 0.050 | | | | |
| 4 | Lens 2 | 8.291 | (ASP) | 0.280 | Plastic | 1.639 | 23.5 | −18.43 |
| 5 | | 4.800 | (ASP) | 0.621 | | | | |
| 6 | Lens 3 | 13.910 | (ASP) | 0.307 | Plastic | 1.639 | 23.5 | −19.63 |
| 7 | | 6.536 | (ASP) | 0.076 | | | | |
| 8 | Lens 4 | 15.313 | (ASP) | 0.551 | Plastic | 1.544 | 55.9 | 17.64 |
| 9 | | −25.352 | (ASP) | 0.055 | | | | |
| 10 | Lens 5 | −31.159 | (ASP) | 0.548 | Plastic | 1.544 | 55.9 | 530.13 |
| 11 | | −28.293 | (ASP) | 0.486 | | | | |
| 12 | Lens 6 | 4.982 | (ASP) | 0.527 | Plastic | 1.544 | 55.9 | −17.71 |
| 13 | | 3.161 | (ASP) | 0.222 | | | | |
| 14 | Lens 7 | 2.589 | (ASP) | 0.637 | Plastic | 1.544 | 55.9 | 4.65 |
| 15 | | −97.439 | (ASP) | 0.989 | | | | |
| 16 | Lens 8 | −17.070 | (ASP) | 0.540 | Plastic | 1.544 | 55.9 | −4.41 |
| 17 | | 2.820 | (ASP) | 0.600 | | | | |
| 18 | IR-cut Filter | Plano | | 0.210 | Glass | 1.517 | 64.2 | — |
| 19 | | Plano | | 0.314 | | | | |
| 20 | Image | Plano | | 0.000 | | | | |

Note:
Reference wavelength is 587.6 nm (d-line).
An effective radius of the object-side surface 771 (Surface 14) is 2.920 mm.

TABLE 14

Aspheric Coefficients

| Surface # | 2 | 3 | 4 | 5 | 6 | 7 |
|---|---|---|---|---|---|---|
| k= | −4.3247E−02 | −2.9488E+01 | −3.1493E+00 | 1.5479E+00 | −9.8639E+01 | −1.7126E+00 |
| A4= | −7.2354E−04 | −6.1645E−02 | −8.5724E−02 | −3.7931E−02 | −4.2235E−02 | −4.1547E−02 |
| A6= | 5.1876E−03 | 8.0348E−02 | 1.0117E−01 | 3.4302E−02 | 1.1058E−02 | 1.3798E−02 |
| A8= | −5.4198E−03 | −5.9195E−02 | −7.1311E−02 | −2.1600E−02 | −9.8184E−03 | −1.4085E−02 |

TABLE 14-continued

| Aspheric Coefficients | | | | | | |
|---|---|---|---|---|---|---|
| A10= | 3.4689E−03 | 2.8368E−02 | 3.2983E−02 | 9.3534E−03 | 6.2085E−03 | 1.0516E−02 |
| A12= | −1.2455E−03 | −8.6436E−03 | −9.7300E−03 | −2.7984E−03 | −2.7860E−03 | −4.1140E−03 |
| A14= | 2.4248E−04 | 1.4993E−03 | 1.6503E−03 | 5.2426E−04 | 7.2191E−04 | 8.1978E−04 |
| A16= | −2.0632E−05 | −1.1146E−04 | −1.1864E−04 | −4.2042E−05 | −7.7402E−05 | −6.4324E−05 |

| Surface # | 8 | 9 | 10 | 11 | 12 | 13 |
|---|---|---|---|---|---|---|
| k= | −3.5832E−02 | 5.0000E+01 | −2.7186E+01 | 2.5560E+01 | −6.2160E+01 | −9.1461E+00 |
| A4= | −9.2127E−03 | 3.7310E−02 | 3.4949E−02 | −1.2667E−02 | −1.5085E−02 | −1.0569E−01 |
| A6= | 5.9744E−03 | −5.0900E−02 | −3.7140E−02 | 5.8655E−03 | 8.1691E−03 | 5.3257E−02 |
| A8= | −1.3299E−02 | 2.3748E−02 | −4.7288E−04 | −1.1612E−02 | −2.0117E−03 | −1.9800E−02 |
| A10= | 1.1441E−02 | 5.2849E−04 | 2.1200E−02 | 8.8996E−03 | −2.2742E−03 | 4.0318E−03 |
| A12= | −4.4620E−03 | −5.2292E−03 | −1.5283E−02 | −3.6532E−03 | 1.7697E−03 | −1.8531E−04 |
| A14= | 7.6688E−04 | 2.2881E−03 | 5.2335E−03 | 8.8272E−04 | −5.8479E−04 | −1.1134E−04 |
| A16= | −1.7547E−05 | −4.5642E−04 | −9.7394E−04 | −1.2761E−04 | 1.0420E−04 | 2.7532E−05 |
| A18= | −9.8805E−06 | 4.4103E−05 | 9.4856E−05 | 1.0436E−05 | −9.7644E−06 | −2.6358E−06 |
| A20= | 8.0523E−07 | −1.6468E−06 | −3.7998E−06 | −3.7250E−07 | 3.7844E−07 | 9.4157E−08 |

| Surface # | 14 | 15 | 16 | 17 |
|---|---|---|---|---|
| k= | −6.8559E−01 | −6.4714E+01 | −6.5972E+01 | −1.2685E+00 |
| A4= | −3.2981E−02 | 6.7871E−02 | −4.3748E−02 | −5.9563E−02 |
| A6= | 4.3990E−03 | −2.1938E−02 | 3.9086E−03 | 1.3345E−02 |
| A8= | −8.8376E−04 | 1.9648E−03 | 7.3118E−04 | −2.3296E−03 |
| A10= | −8.3132E−04 | 2.9896E−04 | −1.7980E−04 | 2.8396E−04 |
| A12= | 3.9909E−04 | −1.0507E−04 | 1.7026E−05 | −2.3279E−05 |
| A14= | −7.6983E−05 | 1.3501E−05 | −9.1195E−07 | 1.2609E−06 |
| A16= | 7.7080E−06 | −9.3576E−07 | 2.9668E−08 | −4.3376E−08 |
| A18= | −3.9063E−07 | 3.4397E−08 | −5.6168E−10 | 8.5886E−10 |
| A20= | 7.8560E−09 | −5.2416E−10 | 4.8409E−12 | −7.4463E−12 |

In the 7th embodiment, the equation of the aspheric surface profiles of the aforementioned lens elements is the same as the equation of the 1st embodiment. Also, the definitions of these parameters shown in the following table are the same as those stated in the aforementioned embodiments with corresponding values for the 7th embodiment, so an explanation in this regard will not be provided again.

Moreover, these parameters can be calculated from Table 13 and Table 14 as the following values and satisfy the following conditions:

| 7th Embodiment | | | |
|---|---|---|---|
| f [mm] | 6.05 | |f8/f3| | 0.22 |
| Fno | 1.68 | |f8/f4| | 0.25 |
| HFOV [deg.] | 42.0 | |f8/f5| | 0.01 |
| ΣCT/ΣAT | 1.71 | |f8/f6| | 0.25 |
| T78/T12 | 19.78 | |f8/f7| | 0.95 |
| T78/T23 | 1.59 | f/f2 | −0.23 |
| T78/T34 | 13.01 | f/R12 | 1.91 |
| T78/T45 | 17.98 | TL/ImgH | 1.40 |
| T78/T56 | 2.03 | ImgH/R1 | 1.98 |
| T78/T67 | 4.45 | V1/N1 | 36.23 |
| ΣAT/T78 | 2.53 | V2/N2 | 14.34 |
| ImgH/Y11 | 3.12 | V3/N3 | 14.34 |
| (R15 + R16)/(R15 − R16) | 0.72 | V4/N4 | 36.23 |
| |f1/f8| | 1.42 | V5/N5 | 36.23 |
| |f/f3| + |f/f4| + |f/f5| + |f/f6| | 1.00 | V6/N6 | 36.23 |
| ImgH/BL | 5.02 | V7/N7 | 36.23 |
| |f1/f2| | 0.34 | V8/N8 | 36.23 |
| |f1/f3| | 0.32 | V20 | 0 |
| |f1/f4| | 0.35 | V40 | 2 |
| |f1/f5| | 0.01 | NLR_80 | 2 |
| |f1/f6| | 0.35 | NLR_50 | 1 |
| |f1/f7| | 1.35 | Yc71 [mm] | 1.73 |
| f5/R9 | −17.01 | Yc72 [mm] | 2.06 |
| |f8/f2| | 0.24 | Yc71/Yc72 | 0.84 |

8th Embodiment

Figure 15:
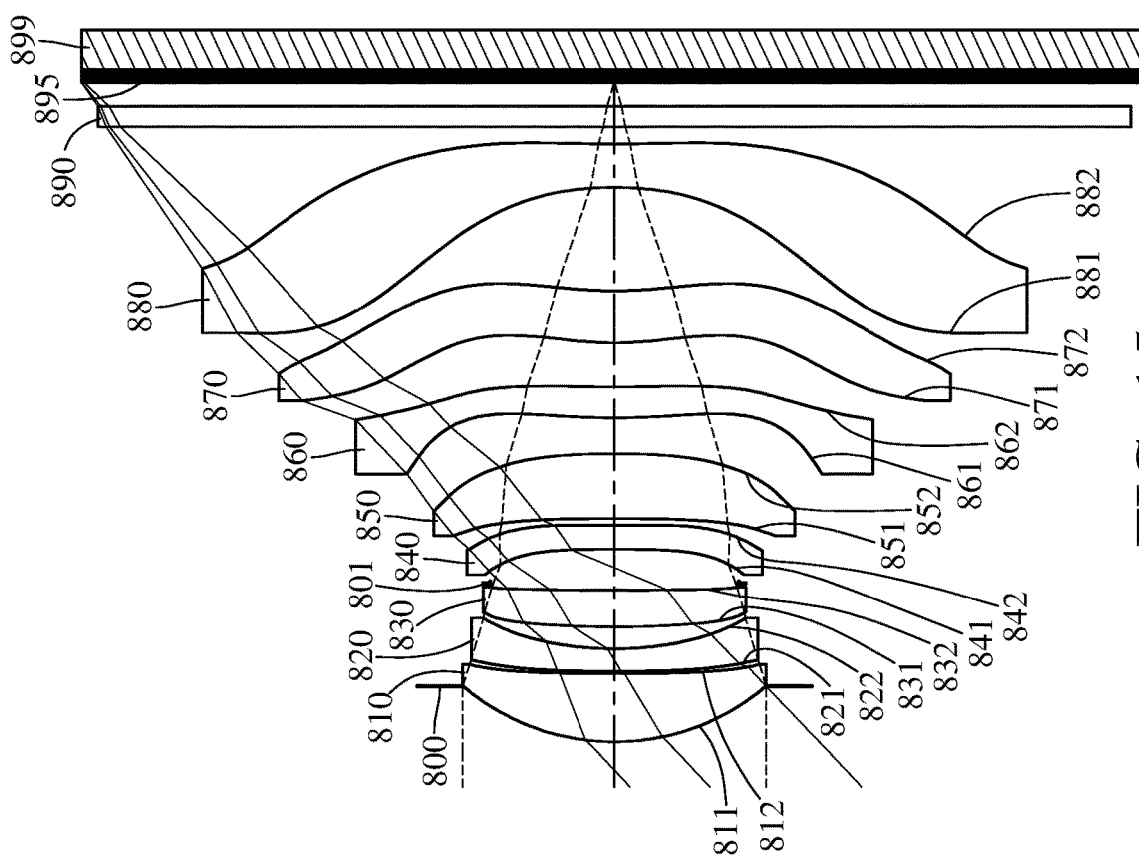
FIG. 15 is a schematic view of an image capturing unit according to the 8th embodiment of the present disclosure.
Figure 16:
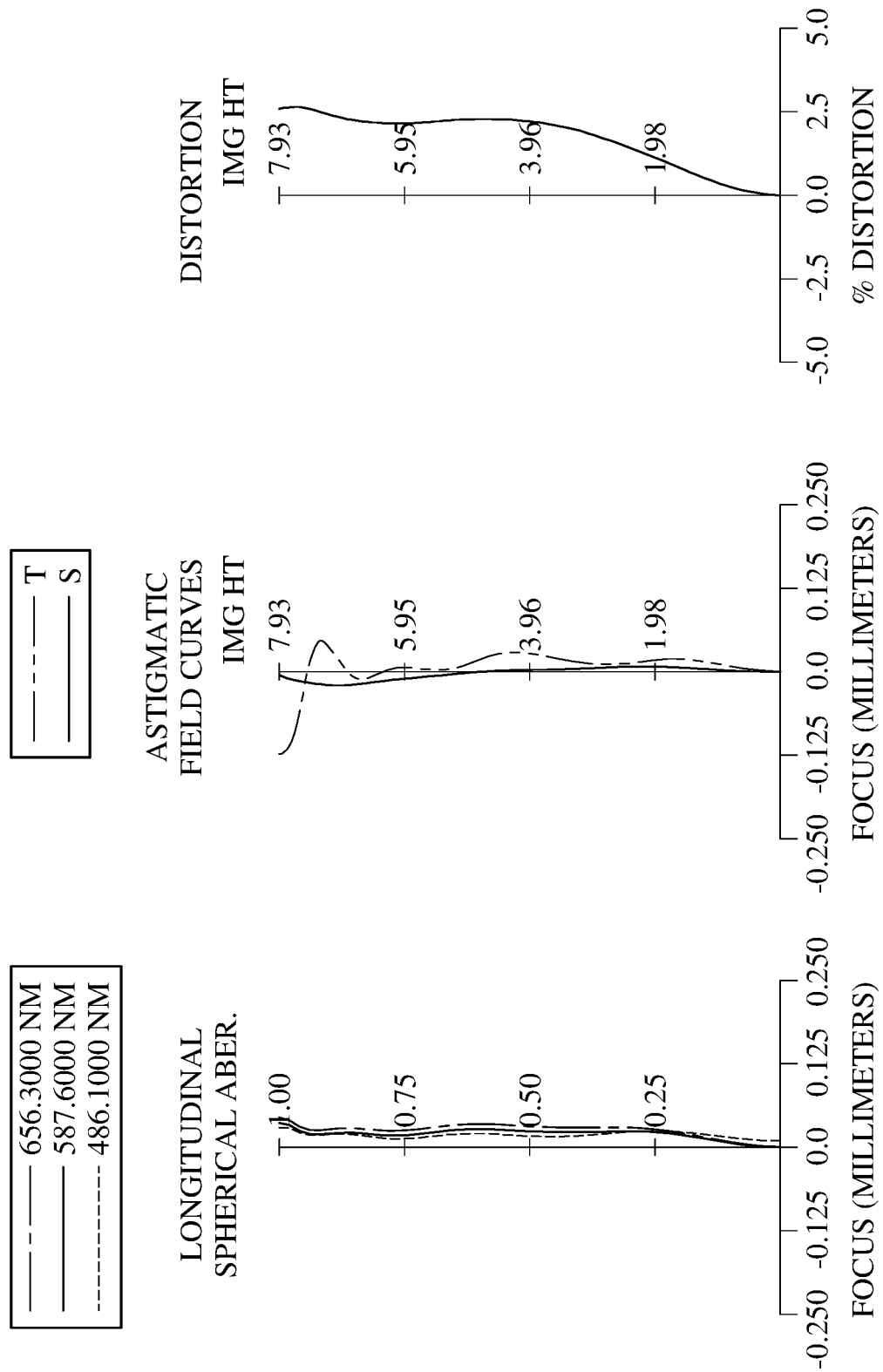
FIG. 16 shows spherical aberration curves, astigmatic field curves and a distortion curve of the image capturing unit according to the 8th embodiment.

FIG. 15 is a schematic view of an image capturing unit according to the 8th embodiment of the present disclosure. FIG. 16 shows, in order from left to right, spherical aberration curves, astigmatic field curves and a distortion curve of the image capturing unit according to the 8th embodiment. In FIG. 15, the image capturing unit includes the photographing lens assembly (its reference numeral is omitted) of the present disclosure and an image sensor 899. The photographing lens assembly includes, in order from an object side to an image side, an aperture stop 800, a first lens element 810, a second lens element 820, a third lens element 830, a stop 801, a fourth lens element 840, a fifth lens element 850, a sixth lens element 860, a seventh lens element 870, an eighth lens element 880, an IR-cut filter 890 and an image surface 895. The photographing lens assembly includes eight lens elements (810, 820, 830, 840, 850, 860, 870 and 880) with no additional lens element disposed between each of the adjacent eight lens elements.

The first lens element 810 with positive refractive power has an object-side surface 811 being convex in a paraxial region thereof and an image-side surface 812 being convex in a paraxial region thereof. The first lens element 810 is made of glass material and has the object-side surface 811 and the image-side surface 812 being both aspheric. The image-side surface 812 of the first lens element 810 has at least one inflection point.

The second lens element 820 with negative refractive power has an object-side surface 821 being concave in a paraxial region thereof and an image-side surface 822 being concave in a paraxial region thereof. The second lens element 820 is made of plastic material and has the object-side surface 821 and the image-side surface 822 being both aspheric. The object-side surface 821 of the second lens element 820 has at least one inflection point. The image-side surface 822 of the second lens element 820 has at least one inflection point.

The third lens element 830 with positive refractive power has an object-side surface 831 being convex in a paraxial region thereof and an image-side surface 832 being concave in a paraxial region thereof. The third lens element 830 is made of plastic material and has the object-side surface 831 and the image-side surface 832 being both aspheric. The image-side surface 832 of the third lens element 830 has at least one inflection point.

The fourth lens element 840 with negative refractive power has an object-side surface 841 being concave in a paraxial region thereof and an image-side surface 842 being concave in a paraxial region thereof. The fourth lens element 840 is made of plastic material and has the object-side surface 841 and the image-side surface 842 being both aspheric. The image-side surface 842 of the fourth lens element 840 has at least one inflection point.

The fifth lens element 850 with positive refractive power has an object-side surface 851 being concave in a paraxial region thereof and an image-side surface 852 being convex in a paraxial region thereof. The fifth lens element 850 is made of plastic material and has the object-side surface 851 and the image-side surface 852 being both aspheric. The object-side surface 851 of the fifth lens element 850 has at least one inflection point. The image-side surface 852 of the fifth lens element 850 has at least one inflection point.

The sixth lens element 860 with positive refractive power has an object-side surface 861 being convex in a paraxial region thereof and an image-side surface 862 being concave in a paraxial region thereof. The sixth lens element 860 is made of plastic material and has the object-side surface 861 and the image-side surface 862 being both aspheric. The object-side surface 861 of the sixth lens element 860 has at least one inflection point. The image-side surface 862 of the sixth lens element 860 has at least one inflection point. The image-side surface 862 of the sixth lens element 860 has one convex critical point in an off-axis region thereof.

The seventh lens element 870 with positive refractive power has an object-side surface 871 being convex in a paraxial region thereof and an image-side surface 872 being concave in a paraxial region thereof. The seventh lens element 870 is made of plastic material and has the object-side surface 871 and the image-side surface 872 being both aspheric. The object-side surface 871 of the seventh lens element 870 has at least one inflection point. The image-side surface 872 of the seventh lens element 870 has at least one inflection point. The object-side surface 871 of the seventh lens element 870 has one concave critical point in an off-axis region thereof. The image-side surface 872 of the seventh lens element 870 has one convex critical point in an off-axis region thereof.

The eighth lens element 880 with negative refractive power has an object-side surface 881 being concave in a paraxial region thereof and an image-side surface 882 being concave in a paraxial region thereof. The eighth lens element 880 is made of plastic material and has the object-side surface 881 and the image-side surface 882 being both aspheric. The object-side surface 881 of the eighth lens element 880 has at least one inflection point. The image-side surface 882 of the eighth lens element 880 has at least one inflection point. The object-side surface 881 of the eighth lens element 880 has one convex critical point in an off-axis region thereof.

The IR-cut filter 890 is made of glass material and located between the eighth lens element 880 and the image surface 895, and will not affect the focal length of the photographing lens assembly. The image sensor 899 is disposed on or near the image surface 895 of the photographing lens assembly.

The detailed optical data of the 8th embodiment are shown in Table 15 and the aspheric surface data are shown in Table 16 below.

TABLE 15

8th Embodiment
f = 8.13 mm, Fno = 1.80, HFOV = 43.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.829 | | | | |
| 2 | Lens 1 | 3.491 | (ASP) | 1.022 | Glass | 1.613 | 59.0 | 5.52 |
| 3 | | −100.000 | (ASP) | 0.035 | | | | |
| 4 | Lens 2 | −376.427 | (ASP) | 0.330 | Plastic | 1.583 | 30.2 | −8.79 |
| 5 | | 5.193 | (ASP) | 0.326 | | | | |
| 6 | Lens 3 | 14.839 | (ASP) | 0.549 | Plastic | 1.566 | 37.4 | 40.57 |
| 7 | | 41.383 | (ASP) | 0.103 | | | | |
| 8 | Stop | Plano | | 0.507 | | | | |
| 9 | Lens 4 | −54.436 | (ASP) | 0.360 | Plastic | 1.704 | 14.2 | −29.74 |
| 10 | | 34.115 | (ASP) | 0.096 | | | | |
| 11 | Lens 5 | −431.056 | (ASP) | 0.968 | Plastic | 1.544 | 56.0 | 27.97 |
| 12 | | −14.710 | (ASP) | 0.540 | | | | |
| 13 | Lens 6 | 10.476 | (ASP) | 0.460 | Plastic | 1.583 | 30.2 | 32.86 |
| 14 | | 22.771 | (ASP) | 0.652 | | | | |
| 15 | Lens 7 | 4.766 | (ASP) | 0.778 | Plastic | 1.544 | 56.0 | 33.58 |
| 16 | | 6.078 | (ASP) | 1.545 | | | | |
| 17 | Lens 8 | −5.055 | (ASP) | 0.645 | Plastic | 1.559 | 40.4 | −7.24 |
| 18 | | 21.114 | (ASP) | 0.257 | | | | |
| 19 | IR-cut Filter | Plano | | 0.300 | Glass | 1.517 | 64.2 | — |
| 20 | | Plano | | 0.358 | | | | |
| 21 | Image | Plano | | 0.000 | | | | |

Note:
Reference wavelength is 587.6 nm (d-line).
An effective radius of the stop 801 (Surface 8) is 1.850 mm.
An effective radius of the object–side surface 871 (Surface 15) is 4.650 mm.

TABLE 16

Aspheric Coefficients

| Surface # | 2 | 3 | 4 | 5 | 6 | 7 |
|---|---|---|---|---|---|---|
| k= | 2.5490E-01 | -9.0000E+01 | 0.0000E+00 | 0.0000E+00 | -8.9945E+01 | 0.0000E+00 |
| A4= | -9.0446E-04 | 2.4171E-02 | 3.1515E-02 | 9.6055E-03 | 3.8666E-03 | -2.8945E-03 |
| A6= | 2.2065E-04 | -1.4186E-02 | -2.0772E-02 | -8.8614E-03 | -2.1668E-03 | 5.3749E-04 |
| A8= | -4.0537E-05 | 5.2303E-03 | 8.6641E-03 | 5.8800E-03 | 1.4873E-03 | -1.0088E-03 |
| A10= | -6.8005E-05 | -1.0097E-03 | -1.9744E-03 | -2.2406E-03 | -7.1893E-04 | 1.1310E-03 |
| A12= | 3.4612E-05 | 8.6420E-05 | 2.3218E-04 | 4.9474E-04 | 3.9369E-04 | -6.2235E-04 |
| A14= | -6.7951E-06 | -6.7448E-07 | -1.1134E-05 | -4.5397E-05 | -1.5372E-04 | 2.0876E-04 |
| A16= | 4.9321E-07 | -1.5958E-07 | — | — | 4.3344E-05 | -3.7152E-05 |
| A18= | — | — | — | — | -6.9018E-06 | 2.7238E-06 |
| A20= | — | — | — | — | 4.3026E-07 | — |

| Surface # | 9 | 10 | 11 | 12 | 13 | 14 |
|---|---|---|---|---|---|---|
| k= | 0.0000E+00 | 0.0000E+00 | 7.0971E+01 | 0.0000E+00 | 0.0000E+00 | 0.0000E+00 |
| A4= | -2.3218E-02 | -2.8288E-02 | -1.7640E-02 | -1.3169E-02 | -1.0450E-02 | -1.7523E-02 |
| A6= | 6.8379E-03 | 1.0752E-02 | 9.5140E-03 | 9.5378E-04 | 2.7474E-03 | 7.9075E-03 |
| A8= | -1.1205E-02 | -8.2444E-03 | -5.0650E-03 | -5.7870E-04 | -1.6769E-03 | -3.1255E-03 |
| A10= | 9.5546E-03 | 3.9084E-03 | 1.8218E-03 | 4.2830E-04 | 3.5735E-04 | 6.5457E-04 |
| A12= | -5.2947E-03 | -1.1650E-03 | -3.5832E-04 | -1.6753E-04 | -3.1999E-05 | -7.7097E-05 |
| A14= | 1.8972E-03 | 2.2734E-04 | 2.0245E-05 | 3.8340E-05 | 3.9576E-07 | 5.3775E-06 |
| A16= | -4.1968E-04 | -2.9869E-05 | 4.1073E-06 | -5.4230E-06 | 9.6705E-08 | -2.2076E-07 |
| A18= | 5.1838E-05 | 2.5191E-06 | -6.8646E-07 | 4.2758E-07 | -3.7376E-09 | 4.9182E-09 |
| A20= | -2.7424E-06 | -1.0068E-07 | 2.9440E-08 | -1.3885E-08 | — | -4.5638E-11 |

| Surface # | 15 | 16 | 17 | 18 |
|---|---|---|---|---|
| k= | -4.7595E-01 | 0.0000E+00 | -1.0000E+00 | 0.0000E+00 |
| A4= | -3.2241E-02 | -1.9241E-02 | -1.1426E-02 | -9.9457E-03 |
| A6= | 4.8141E-03 | 1.4150E-03 | 1.4806E-03 | 9.7519E-04 |
| A8= | -9.6253E-04 | -1.4898E-04 | -1.8119E-04 | -7.4125E-05 |
| A10= | 1.3834E-04 | 1.5359E-05 | 2.0856E-05 | 3.8217E-06 |
| A12= | -1.1947E-05 | -9.2820E-07 | -1.4877E-06 | -1.2243E-07 |
| A14= | 6.3124E-07 | 2.5295E-08 | 6.2734E-08 | 1.9177E-09 |
| A16= | -2.0278E-08 | 8.8144E-11 | -1.5528E-09 | 2.9238E-12 |
| A18= | 3.6603E-10 | -1.9993E-11 | 2.1018E-11 | -4.9263E-13 |
| A20= | -2.8547E-12 | 3.0731E-13 | -1.2072E-13 | 4.4147E-15 |

In the 8th embodiment, the equation of the aspheric surface profiles of the aforementioned lens elements is the same as the equation of the 1st embodiment. Also, the definitions of these parameters shown in the following table are the same as those stated in the aforementioned embodiments with corresponding values for the 8th embodiment, so an explanation in this regard will not be provided again.

Moreover, these parameters can be calculated from Table 15 and Table 16 as the following values and satisfy the following conditions:

| 8th Embodiment | | | |
|---|---|---|---|
| f [mm] | 8.13 | |f8/f4| | 0.24 |
| Fno | 1.80 | |f8/f5| | 0.26 |
| HFOV [deg.] | 43.5 | |f8/f6| | 0.22 |
| ΣCT/ΣAT | 1.34 | |f8/f7| | 0.22 |
| T78/T12 | 44.14 | f/f2 | -0.93 |
| T78/T23 | 4.74 | f/R12 | 0.36 |
| T78/T34 | 2.53 | TL/ImgH | 1.24 |
| T78/T45 | 16.09 | ImgH/R1 | 2.27 |
| T78/T56 | 2.86 | V1/N1 | 36.57 |
| T78/T67 | 2.37 | V2/N2 | 19.11 |
| ΣAT/T78 | 2.46 | V3/N3 | 23.91 |
| ImgH/Y11 | 3.51 | V4/N4 | 8.33 |
| (R15 + R16)/(R15 − R16) | -0.61 | V5/N5 | 36.26 |
| |f1/f8| | 0.76 | V6/N6 | 19.11 |
| |f1/f3| + |f1/f4| + |f1/f5| + |f1/f6| | 1.01 | V7/N7 | 36.26 |
| ImgH/BL | 8.67 | V8/N8 | 25.95 |
| |f1/f2| | 0.63 | V20 | 1 |
| |f1/f3| | 0.14 | V40 | 4 |
| |f1/f4| | 0.19 | NLR_80 | 3 |
| |f1/f5| | 0.20 | NLR_50 | 1 |

-continued

| 8th Embodiment | | | |
|---|---|---|---|
| |f1/f6| | 0.17 | Yc71 [mm] | 1.56 |
| |f1/f7| | 0.16 | Yc72 [mm] | 1.70 |
| f5/R9 | -0.06 | Yc71/Yc72 | 0.92 |
| |f8/f2| | 0.82 | Yc81 [mm] | 5.22 |
| |f8/f3| | 0.18 | Yc81/ImgH | 0.66 |

9th Embodiment

Figure 17:
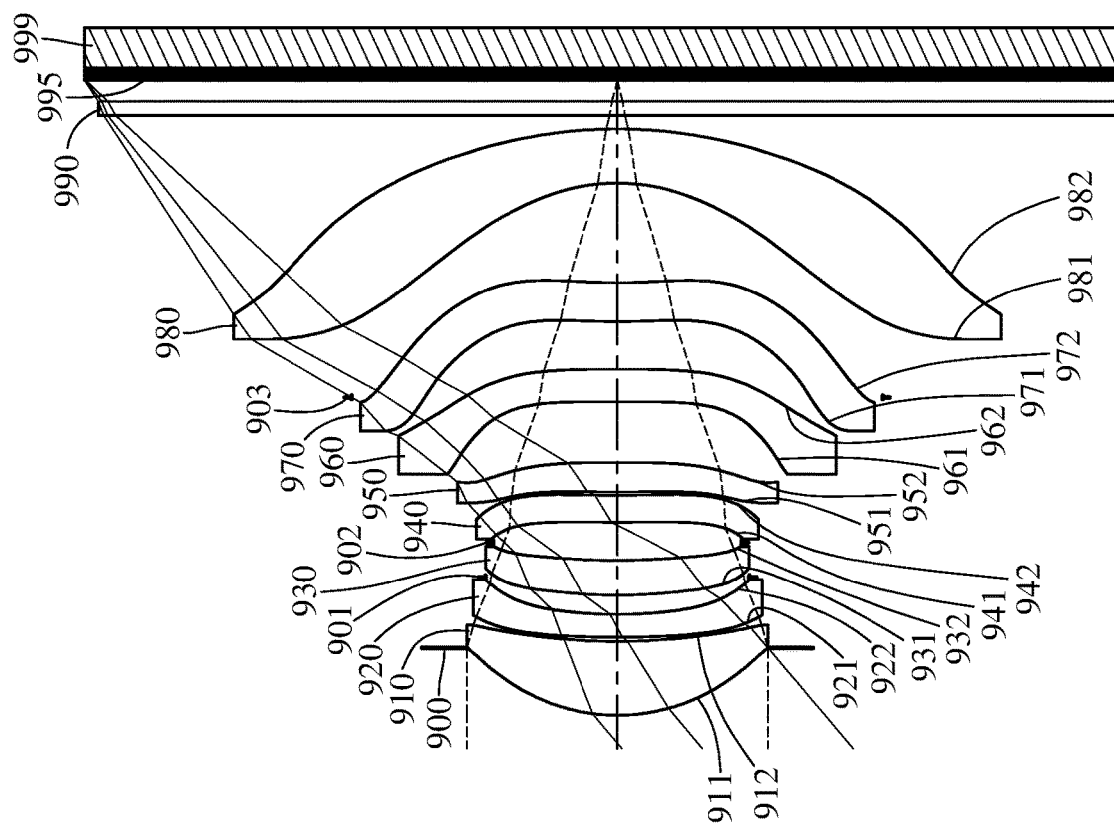
FIG. 17 is a schematic view of an image capturing unit according to the 9th embodiment of the present disclosure.
Figure 18:
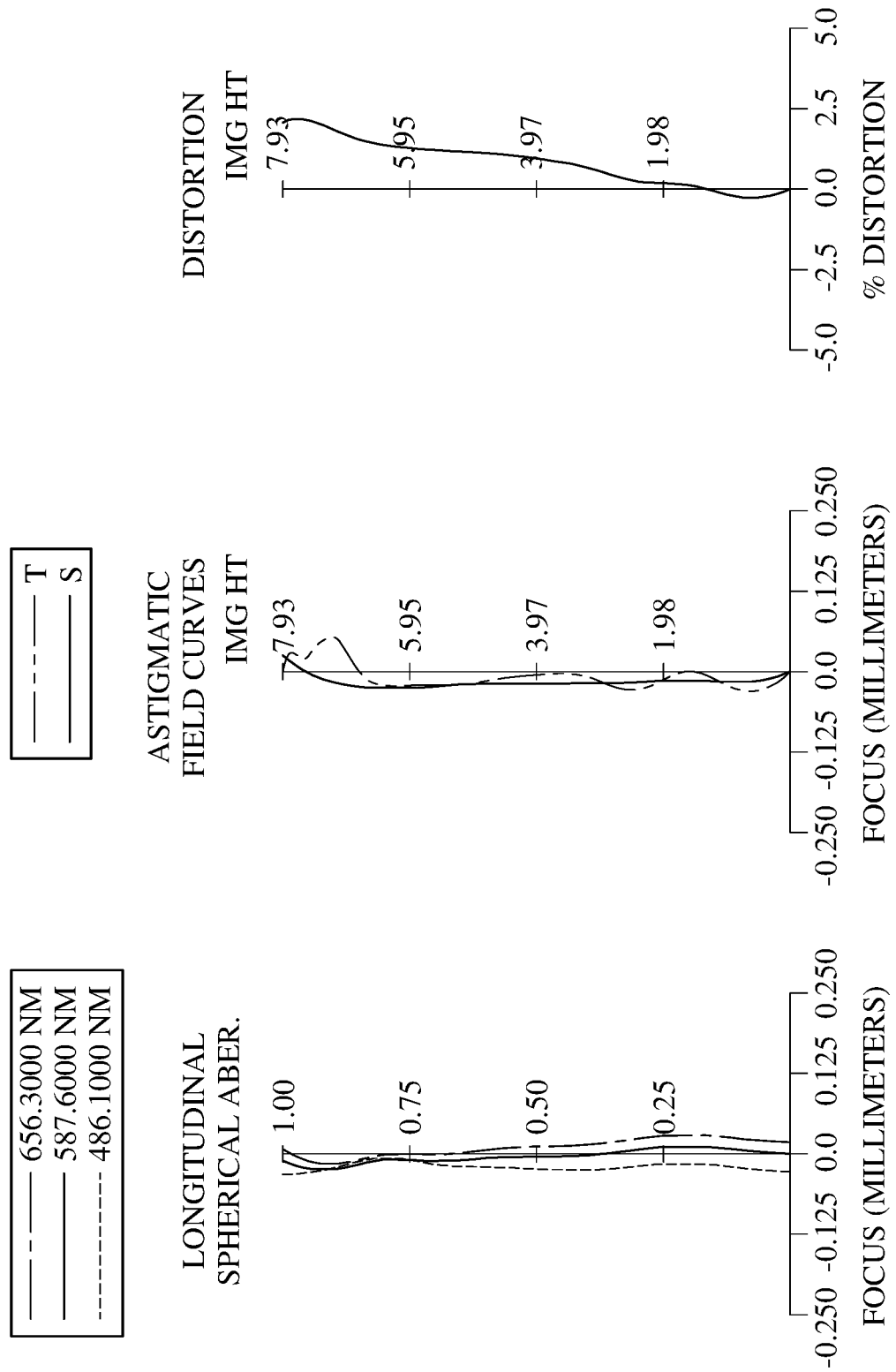
FIG. 18 shows spherical aberration curves, astigmatic field curves and a distortion curve of the image capturing unit according to the 9th embodiment.

FIG. 17 is a schematic view of an image capturing unit according to the 9th embodiment of the present disclosure. FIG. 18 shows, in order from left to right, spherical aberration curves, astigmatic field curves and a distortion curve of the image capturing unit according to the 9th embodiment. In FIG. 17, the image capturing unit includes the photographing lens assembly (its reference numeral is omitted) of the present disclosure and an image sensor 999. The photographing lens assembly includes, in order from an object side to an image side, an aperture stop 900, a first lens element 910, a second lens element 920, a stop 901, a third lens element 930, a stop 902, a fourth lens element 940, a fifth lens element 950, a sixth lens element 960, a seventh lens element 970, a stop 903, an eighth lens element 980, an IR-cut filter 990 and an image surface 995. The photographing lens assembly includes eight lens elements (910, 920, 930, 940, 950, 960, 970 and 980) with no additional lens element disposed between each of the adjacent eight lens elements.

The first lens element 910 with positive refractive power has an object-side surface 911 being convex in a paraxial region thereof and an image-side surface 912 being concave in a paraxial region thereof. The first lens element 910 is made of plastic material and has the object-side surface 911 and the image-side surface 912 being both aspheric. The object-side surface 911 of the first lens element 910 has at least one inflection point. The image-side surface 912 of the first lens element 910 has at least one inflection point.

The second lens element 920 with negative refractive power has an object-side surface 921 being convex in a paraxial region thereof and an image-side surface 922 being concave in a paraxial region thereof. The second lens element 920 is made of plastic material and has the object-side surface 921 and the image-side surface 922 being both aspheric. The image-side surface 922 of the second lens element 920 has at least one inflection point.

The third lens element 930 with positive refractive power has an object-side surface 931 being convex in a paraxial region thereof and an image-side surface 932 being concave in a paraxial region thereof. The third lens element 930 is made of plastic material and has the object-side surface 931 and the image-side surface 932 being both aspheric.

The fourth lens element 940 with negative refractive power has an object-side surface 941 being convex in a paraxial region thereof and an image-side surface 942 being concave in a paraxial region thereof. The fourth lens element 940 is made of plastic material and has the object-side surface 941 and the image-side surface 942 being both aspheric. The object-side surface 941 of the fourth lens element 940 has at least one inflection point. The image-side surface 942 of the fourth lens element 940 has at least one inflection point.

The fifth lens element 950 with positive refractive power has an object-side surface 951 being convex in a paraxial region thereof and an image-side surface 952 being convex in a paraxial region thereof. The fifth lens element 950 is made of plastic material and has the object-side surface 951 and the image-side surface 952 being both aspheric. The object-side surface 951 of the fifth lens element 950 has at least one inflection point. The image-side surface 952 of the fifth lens element 950 has at least one inflection point.

The sixth lens element 960 with positive refractive power has an object-side surface 961 being concave in a paraxial region thereof and an image-side surface 962 being convex in a paraxial region thereof. The sixth lens element 960 is made of plastic material and has the object-side surface 961 and the image-side surface 962 being both aspheric. The object-side surface 961 of the sixth lens element 960 has at least one inflection point. The image-side surface 962 of the sixth lens element 960 has at least one inflection point.

The seventh lens element 970 with negative refractive power has an object-side surface 971 being convex in a paraxial region thereof and an image-side surface 972 being concave in a paraxial region thereof. The seventh lens element 970 is made of plastic material and has the object-side surface 971 and the image-side surface 972 being both aspheric. The object-side surface 971 of the seventh lens element 970 has at least one inflection point. The image-side surface 972 of the seventh lens element 970 has at least one inflection point. The object-side surface 971 of the seventh lens element 970 has one concave critical point in an off-axis region thereof. The image-side surface 972 of the seventh lens element 970 has one convex critical point in an off-axis region thereof.

The eighth lens element 980 with negative refractive power has an object-side surface 981 being concave in a paraxial region thereof and an image-side surface 982 being convex in a paraxial region thereof. The eighth lens element 980 is made of plastic material and has the object-side surface 981 and the image-side surface 982 being both aspheric. The object-side surface 981 of the eighth lens element 980 has at least one inflection point. The image-side surface 982 of the eighth lens element 980 has at least one inflection point. The object-side surface 981 of the eighth lens element 980 has one convex critical point in an off-axis region thereof.

The IR-cut filter 990 is made of glass material and located between the eighth lens element 980 and the image surface 995, and will not affect the focal length of the photographing lens assembly. The image sensor 999 is disposed on or near the image surface 995 of the photographing lens assembly.

The detailed optical data of the 9th embodiment are shown in Table 17 and the aspheric surface data are shown in Table 18 below.

TABLE 17

9th Embodiment
f = 9.20 mm, Fno = 2.05, HFOV = 40.2 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −1.005 | | | | |
| 2 | Lens 1 | 2.850 | (ASP) | 1.104 | Plastic | 1.545 | 56.1 | 7.28 |
| 3 | | 8.747 | (ASP) | 0.063 | | | | |
| 4 | Lens 2 | 15.808 | (ASP) | 0.340 | Plastic | 1.669 | 19.5 | −17.88 |
| 5 | | 6.750 | (ASP) | 0.557 | | | | |
| 6 | Stop | Plano | | −0.271 | | | | |
| 7 | Lens 3 | 6.862 | (ASP) | 0.522 | Plastic | 1.544 | 56.0 | 46.60 |
| 8 | | 9.156 | (ASP) | 0.266 | | | | |
| 9 | Stop | Plano | | 0.306 | | | | |
| 10 | Lens 4 | 43.787 | (ASP) | 0.400 | Plastic | 1.669 | 19.5 | −63.26 |
| 11 | | 21.442 | (ASP) | 0.051 | | | | |
| 12 | Lens 5 | 25.066 | (ASP) | 0.440 | Plastic | 1.566 | 37.4 | 29.77 |
| 13 | | −51.073 | (ASP) | 0.905 | | | | |
| 14 | Lens 6 | −109.723 | (ASP) | 0.485 | Plastic | 1.614 | 26.0 | 80.18 |
| 15 | | −34.032 | (ASP) | 0.713 | | | | |
| 16 | Lens 7 | 9.581 | (ASP) | 0.580 | Plastic | 1.566 | 37.4 | −87.87 |
| 17 | | 7.858 | (ASP) | −1.713 | | | | |
| 18 | Stop | Plano | | 3.204 | | | | |
| 19 | Lens 8 | −2.802 | (ASP) | 0.806 | Plastic | 1.534 | 55.9 | −9.25 |
| 20 | | −7.130 | (ASP) | 0.200 | | | | |

TABLE 17-continued

9th Embodiment
f = 9.20 mm, Fno = 2.05, HFOV = 40.2 deg.

| Surface # | | Curvature Radius | Thickness | Material | Index | Abbe # | Focal Length |
|---|---|---|---|---|---|---|---|
| 21 | IR-cut Filter | Plano | 0.210 | Glass | 1.517 | 64.2 | — |
| 22 | | Plano | 0.311 | | | | |
| 23 | Image | Plano | 0.000 | | | | |

Note:
Reference wavelength is 587.6 nm (d-line).
An effective radius of the stop 901 (Surface 6) is 1.970 mm.
An effective radius of the stop 902 (Surface 9) is 1.850 mm.
An effective radius of the stop 903 (Surface 18) is 3.960 mm.

TABLE 18

Aspheric Coefficients

| Surface # | 2 | 3 | 4 | 5 | 7 | 8 |
|---|---|---|---|---|---|---|
| k= | -2.5516E-01 | -4.9010E+01 | 1.4950E+01 | 3.6995E+00 | -2.7774E+01 | 7.3688E-01 |
| A4= | 1.2669E-03 | 7.6921E-03 | 3.4519E-05 | -2.4070E-03 | -3.3601E-03 | -8.6929E-03 |
| A6= | 2.5909E-04 | -3.6966E-03 | 1.8902E-03 | 4.6333E-03 | 9.2441E-04 | -6.9669E-03 |
| A8= | -1.6543E-04 | 9.8774E-04 | -4.8134E-04 | -1.5918E-04 | 9.3482E-04 | 1.8781E-02 |
| A10= | 8.1122E-05 | -3.6064E-05 | 2.9078E-04 | -2.0738E-04 | -1.2348E-04 | -2.2848E-02 |
| A12= | -2.1961E-05 | -2.8830E-05 | -7.4940E-05 | 1.2560E-04 | 8.4976E-05 | 1.7365E-02 |
| A14= | 2.2121E-06 | 5.3196E-06 | 9.9569E-06 | -1.2569E-05 | -5.7998E-05 | -8.1428E-03 |
| A16= | -1.3350E-07 | -3.5859E-07 | -6.4303E-07 | -1.6000E-06 | 2.8759E-05 | 2.3046E-03 |
| A18= | — | — | — | — | -7.0467E-06 | -3.6124E-04 |
| A20= | — | — | — | — | 6.5412E-07 | 2.4176E-05 |

| Surface # | 10 | 11 | 12 | 13 | 14 | 15 |
|---|---|---|---|---|---|---|
| k= | -8.0052E+01 | -8.5936E+01 | 6.0370E+01 | -8.5249E+01 | 9.0000E+01 | 4.6043E+01 |
| A4= | -8.1650E-03 | 2.5696E-03 | -8.3846E-03 | -1.7900E-02 | -6.8009E-03 | -1.1935E-02 |
| A6= | -8.4894E-03 | -3.1615E-02 | -2.4708E-02 | -4.1086E-03 | -1.1711E-02 | 5.0735E-03 |
| A8= | 5.4177E-03 | 2.8737E-02 | 2.0424E-02 | 4.7695E-03 | 1.1916E-02 | -6.3410E-03 |
| A10= | -2.1121E-03 | -1.6942E-02 | -8.1112E-03 | -3.0427E-03 | -1.1356E-02 | 3.5508E-03 |
| A12= | -3.0459E-04 | 6.3287E-03 | 1.1450E-03 | 1.4235E-03 | 6.9905E-03 | -1.2705E-03 |
| A14= | 6.6972E-04 | -1.5524E-03 | 2.6124E-04 | -4.3676E-04 | -2.8027E-03 | 3.1471E-04 |
| A16= | -2.8319E-04 | 2.5421E-04 | -1.2168E-04 | 8.1062E-05 | 7.4111E-04 | -5.3379E-05 |
| A18= | 5.3121E-05 | -2.6197E-05 | 1.6939E-05 | -8.0422E-06 | -1.2772E-04 | 6.0008E-06 |
| A20= | -3.9223E-06 | 1.2859E-06 | -8.4495E-07 | 3.2287E-07 | 1.3724E-05 | -4.2419E-07 |

| Surface # | 16 | 17 | 19 | 20 |
|---|---|---|---|---|
| k= | 2.6075E+00 | -8.0223E+01 | -1.8386E+00 | -3.5522E+01 |
| A4= | -4.4102E-02 | -2.4049E-02 | -8.1575E-03 | -1.9547E-02 |
| A6= | 9.6786E-03 | 1.2141E-02 | 6.4202E-03 | 1.1392E-02 |
| A8= | 3.0956E-04 | -1.1886E-02 | -2.7743E-03 | -4.6117E-03 |
| A10= | -4.0705E-04 | 7.5623E-03 | 6.5877E-04 | 1.1943E-03 |
| A12= | 2.8122E-03 | -3.3210E-03 | -9.6778E-05 | -2.0725E-04 |
| A14= | -1.0344E-03 | 1.0326E-03 | 9.4992E-06 | 2.5077E-05 |
| A16= | 2.4238E-04 | -2.2958E-04 | -6.4799E-07 | -2.1704E-06 |
| A18= | -3.8062E-05 | 3.6697E-05 | 3.1223E-08 | 1.3606E-07 |
| A20= | 4.0381E-06 | -4.2115E-06 | -1.0610E-09 | -6.1842E-09 |

In the 9th embodiment, the equation of the aspheric surface profiles of the aforementioned lens elements is the same as the equation of the 1st embodiment. Also, the definitions of these parameters shown in the following table are the same as those stated in the aforementioned embodiments with corresponding values for the 9th embodiment, so an explanation in this regard will not be provided again.

Moreover, these parameters can be calculated from Table 17 and Table 18 as the following values and satisfy the following conditions:

| 9th Embodiment | | | |
|---|---|---|---|
| f [mm] | 9.20 | |f8/f4| | 0.15 |
| Fno | 2.05 | |f8/f5| | 0.31 |
| HFOV [deg.] | 40.2 | |f8/f6| | 0.12 |
| ΣCT/ΣAT | 1.15 | |f8/f7| | 0.11 |
| T78/T12 | 23.67 | f/f2 | -0.51 |
| T78/T23 | 5.21 | f/R12 | -0.27 |
| T78/T34 | 2.61 | TL/ImgH | 1.20 |
| T78/T45 | 29.24 | ImgH/R1 | 2.78 |
| T78/T56 | 1.65 | V1/N1 | 36.30 |
| T78/T67 | 2.09 | V2/N2 | 11.65 |
| ΣAT/T78 | 2.74 | V3/N3 | 36.26 |
| ImgH/Y11 | 3.54 | V4/N4 | 11.65 |
| (R15 + R16)/(R15 - R16) | -2.30 | V5/N5 | 23.91 |

-continued

9th Embodiment

| | | | |
|---|---|---|---|
| \|f1/f8\| | 0.79 | V6/N6 | 16.09 |
| \|f/f3\| + \|f/f4\| + \|f/f5\| + \|f/f6\| | 0.77 | V7/N7 | 23.91 |
| ImgH/BL | 11.00 | V8/N8 | 36.46 |
| \|f1/f2\| | 0.41 | V20 | 2 |
| \|f1/f3\| | 0.16 | V40 | 5 |
| \|f1/f4\| | 0.12 | NLR_80 | 3 |
| \|f1/f5\| | 0.24 | NLR_50 | 1 |
| \|f1/f6\| | 0.09 | Yc71 [mm] | 0.87 |
| \|f1/f7\| | 0.08 | Yc72 [mm] | 1.07 |
| f5/R9 | 1.19 | Yc71/Yc72 | 0.81 |
| \|f8/f2\| | 0.52 | Yc81 [mm] | 5.22; 5.43 |
| \|f8/f3\| | 0.20 | Yc81/ImgH | 0.66; 0.68 |

10th Embodiment

Figure 19:
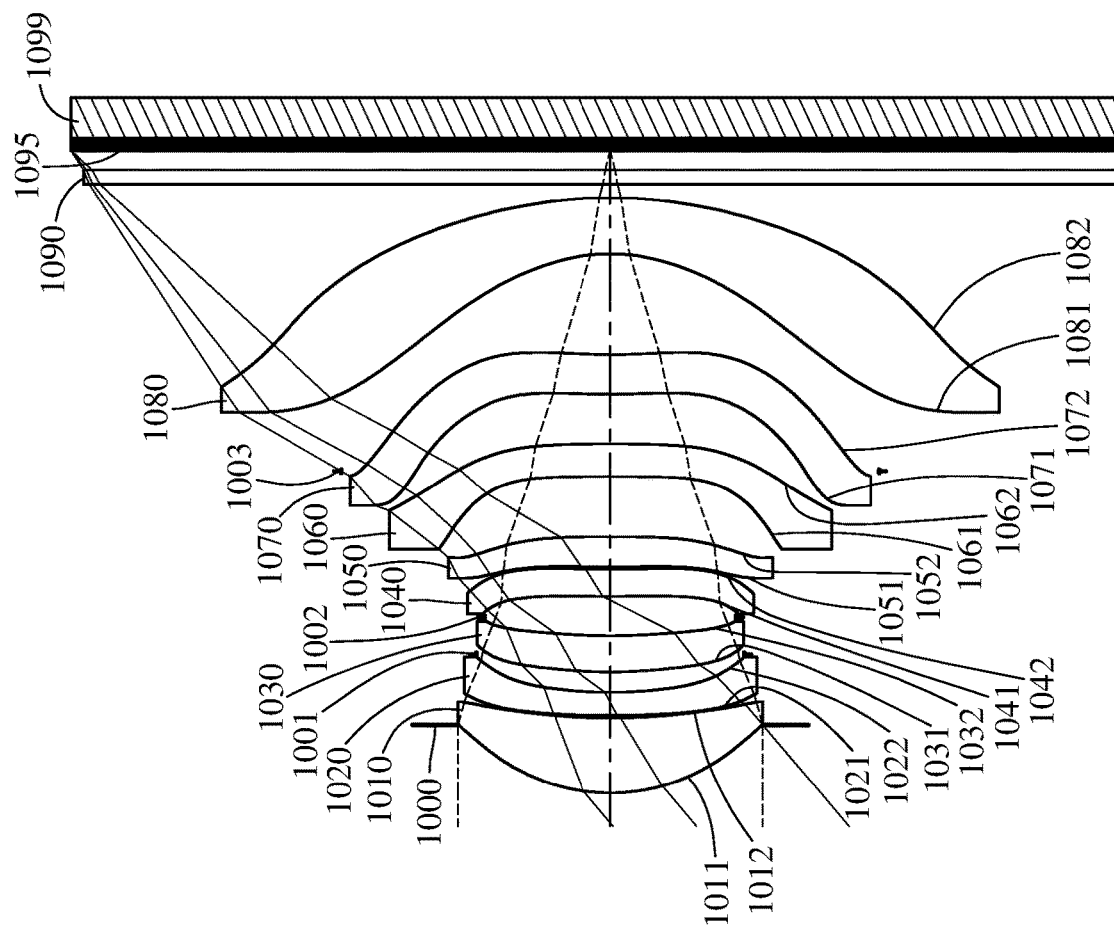
FIG. 19 is a schematic view of an image capturing unit according to the 10th embodiment of the present disclosure.
Figure 20:
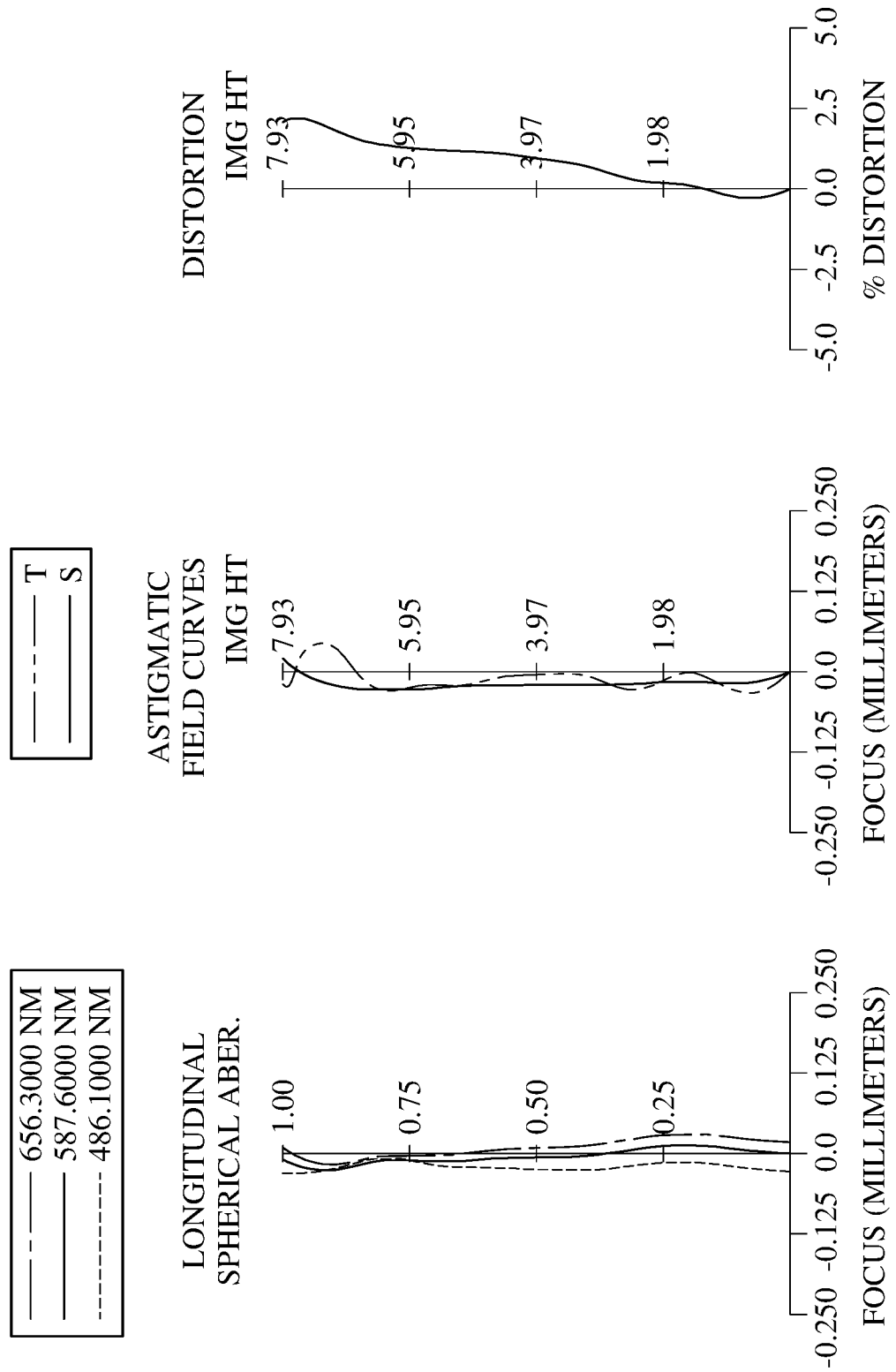
FIG. 20 shows spherical aberration curves, astigmatic field curves and a distortion curve of the image capturing unit according to the 10th embodiment.

FIG. 19 is a schematic view of an image capturing unit according to the 10th embodiment of the present disclosure. FIG. 20 shows, in order from left to right, spherical aberration curves, astigmatic field curves and a distortion curve of the image capturing unit according to the 10th embodiment. In FIG. 19, the image capturing unit includes the photographing lens assembly (its reference numeral is omitted) of the present disclosure and an image sensor 1099. The photographing lens assembly includes, in order from an object side to an image side, an aperture stop 1000, a first lens element 1010, a second lens element 1020, a stop 1001, a third lens element 1030, a stop 1002, a fourth lens element 1040, a fifth lens element 1050, a sixth lens element 1060, a seventh lens element 1070, a stop 1003, an eighth lens element 1080, an IR-cut filter 1090 and an image surface 1095. The photographing lens assembly includes eight lens elements (1010, 1020, 1030, 1040, 1050, 1060, 1070 and 1080) with no additional lens element disposed between each of the adjacent eight lens elements.

The first lens element 1010 with positive refractive power has an object-side surface 1011 being convex in a paraxial region thereof and an image-side surface 1012 being concave in a paraxial region thereof. The first lens element 1010 is made of plastic material and has the object-side surface 1011 and the image-side surface 1012 being both aspheric. The object-side surface 1011 of the first lens element 1010 has at least one inflection point. The image-side surface 1012 of the first lens element 1010 has at least one inflection point.

The second lens element 1020 with negative refractive power has an object-side surface 1021 being convex in a paraxial region thereof and an image-side surface 1022 being concave in a paraxial region thereof. The second lens element 1020 is made of plastic material and has the object-side surface 1021 and the image-side surface 1022 being both aspheric. The image-side surface 1022 of the second lens element 1020 has at least one inflection point.

The third lens element 1030 with positive refractive power has an object-side surface 1031 being convex in a paraxial region thereof and an image-side surface 1032 being concave in a paraxial region thereof. The third lens element 1030 is made of plastic material and has the object-side surface 1031 and the image-side surface 1032 being both aspheric.

The fourth lens element 1040 with negative refractive power has an object-side surface 1041 being convex in a paraxial region thereof and an image-side surface 1042 being concave in a paraxial region thereof. The fourth lens element 1040 is made of plastic material and has the object-side surface 1041 and the image-side surface 1042 being both aspheric. The object-side surface 1041 of the fourth lens element 1040 has at least one inflection point. The image-side surface 1042 of the fourth lens element 1040 has at least one inflection point.

The fifth lens element 1050 with positive refractive power has an object-side surface 1051 being convex in a paraxial region thereof and an image-side surface 1052 being convex in a paraxial region thereof. The fifth lens element 1050 is made of plastic material and has the object-side surface 1051 and the image-side surface 1052 being both aspheric. The object-side surface 1051 of the fifth lens element 1050 has at least one inflection point. The image-side surface 1052 of the fifth lens element 1050 has at least one inflection point.

The sixth lens element 1060 with positive refractive power has an object-side surface 1061 being concave in a paraxial region thereof and an image-side surface 1062 being convex in a paraxial region thereof. The sixth lens element 1060 is made of plastic material and has the object-side surface 1061 and the image-side surface 1062 being both aspheric. The object-side surface 1061 of the sixth lens element 1060 has at least one inflection point. The image-side surface 1062 of the sixth lens element 1060 has at least one inflection point.

The seventh lens element 1070 with negative refractive power has an object-side surface 1071 being convex in a paraxial region thereof and an image-side surface 1072 being concave in a paraxial region thereof. The seventh lens element 1070 is made of plastic material and has the object-side surface 1071 and the image-side surface 1072 being both aspheric. The object-side surface 1071 of the seventh lens element 1070 has at least one inflection point. The image-side surface 1072 of the seventh lens element 1070 has at least one inflection point. The object-side surface 1071 of the seventh lens element 1070 has one concave critical point in an off-axis region thereof. The image-side surface 1072 of the seventh lens element 1070 has one convex critical point in an off-axis region thereof.

The eighth lens element 1080 with negative refractive power has an object-side surface 1081 being concave in a paraxial region thereof and an image-side surface 1082 being convex in a paraxial region thereof. The eighth lens element 1080 is made of plastic material and has the object-side surface 1081 and the image-side surface 1082 being both aspheric. The object-side surface 1081 of the eighth lens element 1080 has at least one inflection point. The image-side surface 1082 of the eighth lens element 1080 has at least one inflection point.

The IR-cut filter 1090 is made of glass material and located between the eighth lens element 1080 and the image surface 1095, and will not affect the focal length of the photographing lens assembly. The image sensor 1099 is disposed on or near the image surface 1095 of the photographing lens assembly.

The detailed optical data of the 10th embodiment are shown in Table 19 and the aspheric surface data are shown in Table 20 below.

TABLE 19

10th Embodiment
f = 9.19 mm, Fno = 2.05, HFOV = 40.2 deg.

| Surface | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −1.008 | | | | |
| 2 | Lens 1 | 2.844 | (ASP) | 1.109 | Plastic | 1.545 | 56.1 | 7.26 |
| 3 | | 8.733 | (ASP) | 0.040 | | | | |
| 4 | Lens 2 | 15.699 | (ASP) | 0.340 | Plastic | 1.669 | 19.5 | −18.05 |
| 5 | | 6.766 | (ASP) | 0.559 | | | | |
| 6 | Stop | Plano | | −0.262 | | | | |
| 7 | Lens 3 | 6.801 | (ASP) | 0.537 | Plastic | 1.544 | 56.0 | 47.48 |
| 8 | | 8.975 | (ASP) | 0.269 | | | | |
| 9 | Stop | Plano | | 0.309 | | | | |
| 10 | Lens 4 | 50.516 | (ASP) | 0.400 | Plastic | 1.669 | 19.5 | −61.00 |
| 11 | | 22.503 | (ASP) | 0.035 | | | | |
| 12 | Lens 5 | 25.964 | (ASP) | 0.440 | Plastic | 1.566 | 37.4 | 29.54 |
| 13 | | −46.684 | (ASP) | 0.894 | | | | |
| 14 | Lens 6 | −95.799 | (ASP) | 0.485 | Plastic | 1.614 | 26.0 | 77.12 |
| 15 | | −31.740 | (ASP) | 0.731 | | | | |
| 16 | Lens 7 | 9.733 | (ASP) | 0.580 | Plastic | 1.566 | 37.4 | −77.26 |
| 17 | | 7.790 | (ASP) | −1.717 | | | | |
| 18 | Stop | Plano | | 3.204 | | | | |
| 19 | Lens 8 | −2.790 | (ASP) | 0.832 | Plastic | 1.534 | 55.9 | −9.42 |
| 20 | | −6.923 | (ASP) | 0.200 | | | | |
| 21 | IR-cut Filter | Plano | | 0.210 | Glass | 1.517 | 64.2 | — |
| 22 | | Plano | | 0.281 | | | | |
| 23 | Image | Plano | | 0.000 | | | | |

Note:
Reference wavelength is 587.6 nm (d-line).
An effective radius of the stop 1001 (Surface 6) is 1.970 mm.
An effective radius of the stop 1002 (Surface 9) is 1.850 mm.
An effective radius of the stop 1003 (Surface 18) is 3.960 mm.

TABLE 20

Aspheric Coefficients

| Surface # | 2 | 3 | 4 | 5 | 7 | 8 |
|---|---|---|---|---|---|---|
| k= | −2.5454E−01 | −4.8239E+01 | 1.4370E+01 | 3.6243E+00 | −2.6644E+01 | 1.2054E+00 |
| A4= | 1.2843E−03 | 7.9045E−03 | −6.8922E−05 | −2.6397E−03 | −3.5008E−03 | −8.7087E−03 |
| A6= | 2.8931E−04 | −4.4096E−03 | 1.7429E−03 | 5.0108E−03 | 1.2759E−03 | −6.9922E−03 |
| A8= | −1.5985E−04 | 1.6821E−03 | −1.9920E−04 | −2.7822E−04 | 6.5965E−04 | 1.9109E−02 |
| A10= | 6.4890E−05 | −3.3640E−04 | 1.5279E−04 | −1.9411E−04 | 1.6951E−04 | −2.3395E−02 |
| A12= | −1.3085E−05 | 3.6593E−05 | −5.1711E−05 | 1.1680E−04 | −1.3853E−04 | 1.7868E−02 |
| A14= | 2.6115E−07 | −1.6211E−06 | 9.8012E−06 | −9.6286E−06 | 4.0835E−05 | −8.4181E−03 |
| A16= | 1.0851E−08 | −8.1599E−08 | −8.3984E−07 | −1.8611E−06 | 2.8995E−06 | 2.3925E−03 |
| A18= | — | — | — | — | −3.3146E−06 | −3.7632E−04 |
| A20= | — | — | — | — | 4.2573E−07 | 2.5250E−05 |

| Surface # | 10 | 11 | 12 | 13 | 14 | 15 |
|---|---|---|---|---|---|---|
| k= | −8.3212E+01 | −8.5936E+01 | 6.1796E+01 | −8.4937E+01 | 9.0000E+01 | 4.6043E+01 |
| A4= | −8.0410E−03 | 6.0432E−03 | −4.5362E−03 | −1.8173E−02 | −5.8928E−03 | −1.0718E−02 |
| A6= | −7.8031E−03 | −3.8345E−02 | −3.3572E−02 | −4.2480E−03 | −1.3667E−02 | 3.1792E−03 |
| A8= | 4.2470E−03 | 3.3442E−02 | 2.7635E−02 | 5.1361E−03 | 1.3746E−02 | −4.9036E−03 |
| A10= | −8.8435E−04 | −1.7963E−02 | −1.0833E−02 | −3.2901E−03 | −1.2507E−02 | 2.8993E−03 |
| A12= | −1.1262E−03 | 5.9569E−03 | 1.6033E−03 | 1.5399E−03 | 7.5358E−03 | −1.0721E−03 |
| A14= | 1.0138E−03 | −1.2694E−03 | 2.5742E−04 | −4.7501E−04 | −2.9972E−03 | 2.7305E−04 |
| A16= | −3.6880E−04 | 1.8085E−04 | −1.3207E−04 | 8.8593E−05 | 7.9186E−04 | −4.7406E−05 |
| A18= | 6.4500E−05 | −1.7099E−05 | 1.8403E−05 | −8.8180E−06 | −1.3704E−04 | 5.4335E−06 |
| A20= | −4.5373E−06 | 8.3533E−07 | −9.1138E−07 | 3.5491E−07 | 1.4848E−05 | −3.9038E−07 |

| Surface # | 16 | 17 | 19 | 20 |
|---|---|---|---|---|
| k= | 2.6075E+00 | −8.0223E+01 | −1.8386E+00 | −3.5522E+01 |
| A4= | −4.1201E−02 | −1.9914E−02 | −8.4603E−03 | −2.1616E−02 |
| A6= | 2.9262E−03 | 4.5528E−03 | 5.9825E−03 | 1.2546E−02 |
| A8= | 7.4762E−03 | −4.8183E−03 | −2.3631E−03 | −5.0338E−03 |
| A10= | −8.6449E−03 | 3.5275E−03 | 5.2295E−04 | 1.3093E−03 |
| A12= | 4.7511E−03 | −1.7788E−03 | −7.2169E−05 | −2.2930E−04 |

TABLE 20-continued

| Aspheric Coefficients | | | |
|---|---|---|---|
| A14= | −1.6014E−03 | 6.2026E−04 | 6.6903E−06 | 2.7986E−05 |
| A16= | 3.5842E−04 | −1.5056E−04 | −4.3291E−07 | −2.4369E−06 |
| A18= | −5.4740E−05 | 2.5704E−05 | 1.9856E−08 | 1.5323E−07 |
| A20= | 5.7088E−06 | −3.0984E−06 | −6.4400E−10 | −6.9671E−09 |

In the 10th embodiment, the equation of the aspheric surface profiles of the aforementioned lens elements is the same as the equation of the 1st embodiment. Also, the definitions of these parameters shown in the following table are the same as those stated in the aforementioned embodiments with corresponding values for the 10th embodiment, so an explanation in this regard will not be provided again.

Moreover, these parameters can be calculated from Table 19 and Table 20 as the following values and satisfy the following conditions:

| 10th Embodiment | | | |
|---|---|---|---|
| f [mm] | 9.19 | |f8/f4| | 0.15 |
| Fno | 2.05 | |f8/f5| | 0.32 |
| HFOV [deg.] | 40.2 | |f8/f6| | 0.12 |
| ΣCT/ΣAT | 1.16 | |f8/f7| | 0.12 |
| T78/T12 | 37.18 | f/f2 | −0.51 |
| T78/T23 | 5.01 | f/R12 | −0.29 |
| T78/T34 | 2.57 | TL/ImgH | 1.19 |
| T78/T45 | 42.49 | ImgH/R1 | 2.79 |
| T78/T56 | 1.66 | V1/N1 | 36.30 |
| T78/T67 | 2.03 | V2/N2 | 11.65 |
| ΣAT/T78 | 2.73 | V3/N3 | 36.26 |
| ImgH/Y11 | 3.54 | V4/N4 | 11.65 |
| (R15 + R16)/(R15 − R16) | −2.35 | V5/N5 | 23.91 |
| |f1/f8| | 0.77 | V6/N6 | 16.09 |
| |f/f3| + |f/f4| + |f/f5| + |f/f6| | 0.77 | V7/N7 | 23.91 |
| ImgH/BL | 11.48 | V8/N8 | 36.46 |
| |f1/f2| | 0.40 | V20 | 2 |
| |f1/f3| | 0.15 | V40 | 5 |
| |f1/f4| | 0.12 | NLR_80 | 3 |
| |f1/f5| | 0.25 | NLR_50 | 1 |
| |f1/f6| | 0.09 | Yc71 [mm] | 0.86 |
| |f1/f7| | 0.09 | Yc72 [mm] | 1.07 |
| f5/R9 | 1.14 | Yc71/Yc72 | 0.80 |
| |f8/f2| | 0.52 | Yc81 [mm] | 5.25; 5.44 |
| |f8/f3| | 0.20 | Yc81/ImgH | 0.66; 0.69 |

11th Embodiment

Figure 21:
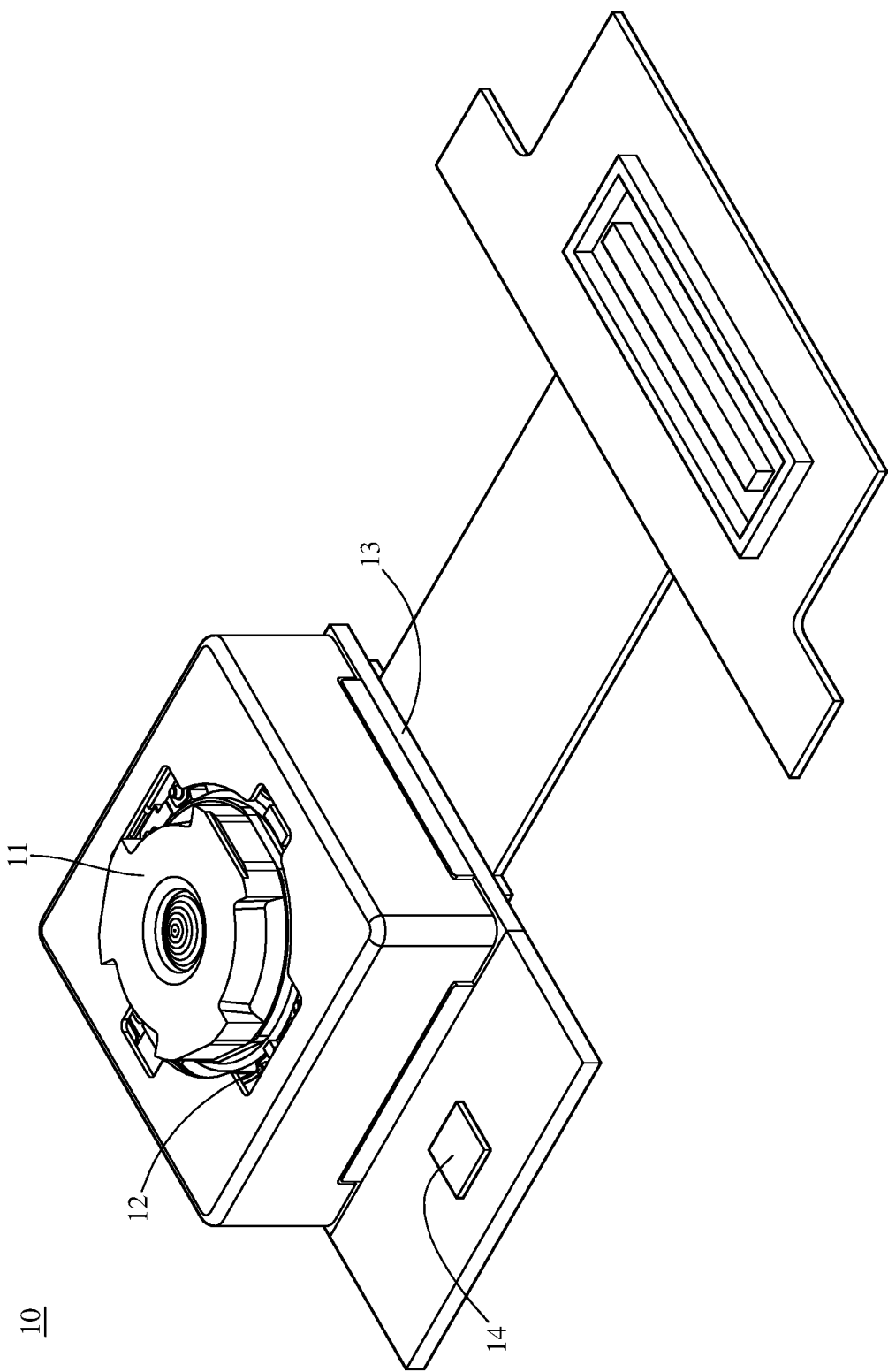
FIG. 21 is a perspective view of an image capturing unit according to the 11th embodiment of the present disclosure.

FIG. 21 is a perspective view of an image capturing unit according to the 11th embodiment of the present disclosure. In this embodiment, an image capturing unit 10 is a camera module including a lens unit 11, a driving device 12, an image sensor 13 and an image stabilizer 14. The lens unit 11 includes the photographing lens assembly disclosed in the 1st embodiment, a barrel and a holder member (their reference numerals are omitted) for holding the photographing lens assembly; the lens unit 11 may include the photographing lens assembly disclosed in other embodiments, and the present disclosure is not limited thereto. The imaging light converges in the lens unit 11 of the image capturing unit 10 to generate an image with the driving device 12 utilized for image focusing on the image sensor 13, and the generated image is then digitally transmitted to other electronic component for further processing.

The driving device 12 can have auto focusing functionality, and different driving configurations can be obtained through the usages of voice coil motors (VCM), micro electro-mechanical systems (MEMS), piezoelectric systems, or shape memory alloy materials. The driving device 12 is favorable for obtaining a better imaging position of the lens unit 11, so that a clear image of the imaged object can be captured by the lens unit 11 with different object distances. The image sensor 13 (for example, CCD or CMOS), which can feature high photosensitivity and low noise, is disposed on the image surface of the photographing lens assembly to provide higher image quality.

The image stabilizer 14, such as an accelerometer, a gyro sensor and a Hall Effect sensor, is configured to work with the driving device 12 to provide optical image stabilization (OIS). The driving device 12 working with the image stabilizer 14 is favorable for compensating for pan and tilt of the lens unit 11 to reduce blurring associated with motion during exposure. In some cases, the compensation can be provided by electronic image stabilization (EIS) with image processing software, thereby improving image quality while in motion or low-light conditions.

12th Embodiment

Figure 22:
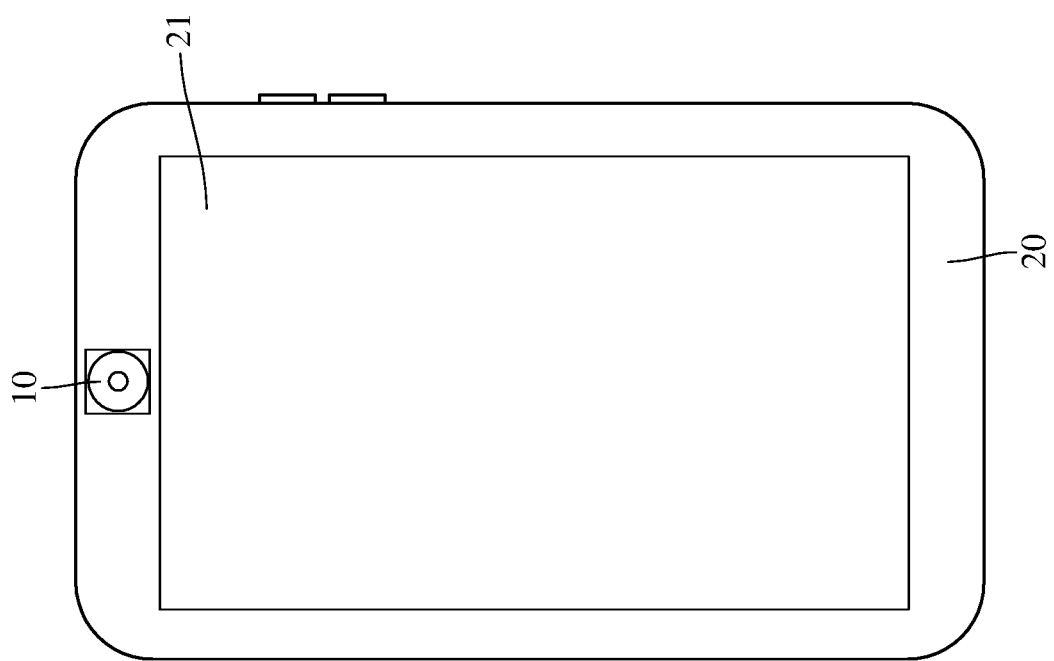
FIG. 22 is a perspective view of an electronic device according to the 12th embodiment of the present disclosure.

FIG. 22 is a perspective view of an electronic device according to the 12th embodiment of the present disclosure.

In this embodiment, an electronic device 20 is a smartphone including an image capturing unit 10 disclosed in the 11th embodiment and a display unit 21. In FIG. 22, the image capturing unit 10 and the display unit 21 are both disposed on the same side of the electronic device 20. The image capturing unit 10 is a front-facing camera of the electronic device 20 for taking selfies, but the present disclosure is not limited thereto.

13th Embodiment

Figure 23:
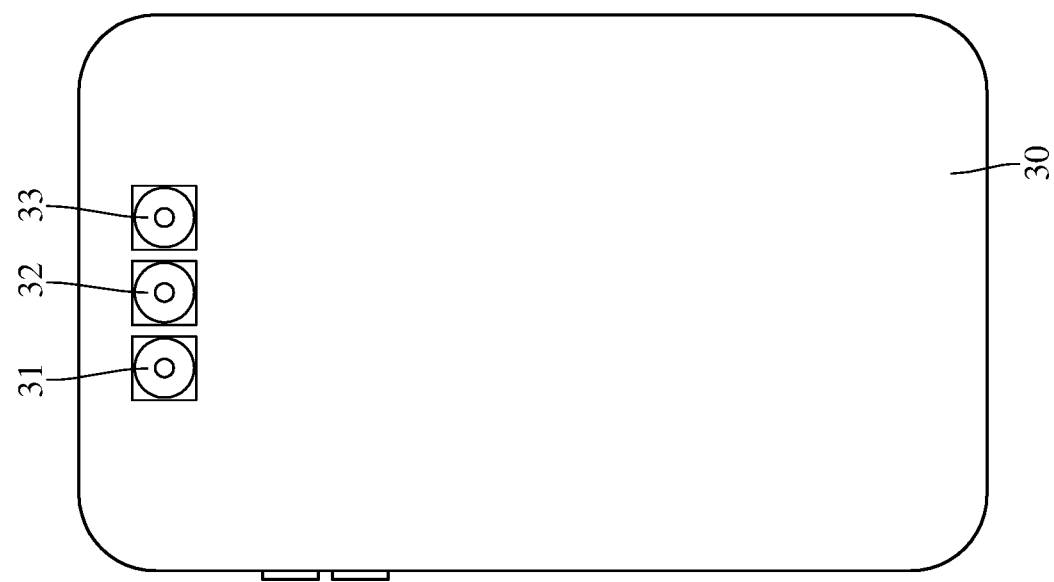
FIG. 23 is a perspective view of an electronic device according to the 13th embodiment of the present disclosure.

FIG. 23 is a perspective view of an electronic device according to the 13th embodiment of the present disclosure.

In this embodiment, an electronic device 30 is a smartphone including an image capturing unit 31, an image capturing unit 32, an image capturing unit 33 and a display unit (its reference number is omitted). In this embodiment, the image capturing units 31, 32 and 33 have different fields of view (e.g., the image capturing unit 31 is a telephoto image capturing unit, the image capturing unit 32 is a standard image capturing unit and the image capturing unit 33 is a wide-angle image capturing unit), such that the electronic device 30 has various magnification ratios so as to meet the requirement of optical zoom functionality. The image capturing unit 32 includes the photographing lens assembly disclosed in the 3rd embodiment and an image sensor (their reference numbers are omitted), but the disclosure is not limited thereto. In some other embodiments, the image capturing unit 32 may include the photographing lens assembly disclosed in another embodiment. In this embodiment, the image capturing unit 31, 32 and 33 are all disposed on one side of the electronic device 30, while the display unit is disposed on another side of the electronic device 30.

14th Embodiment

Figure 24:
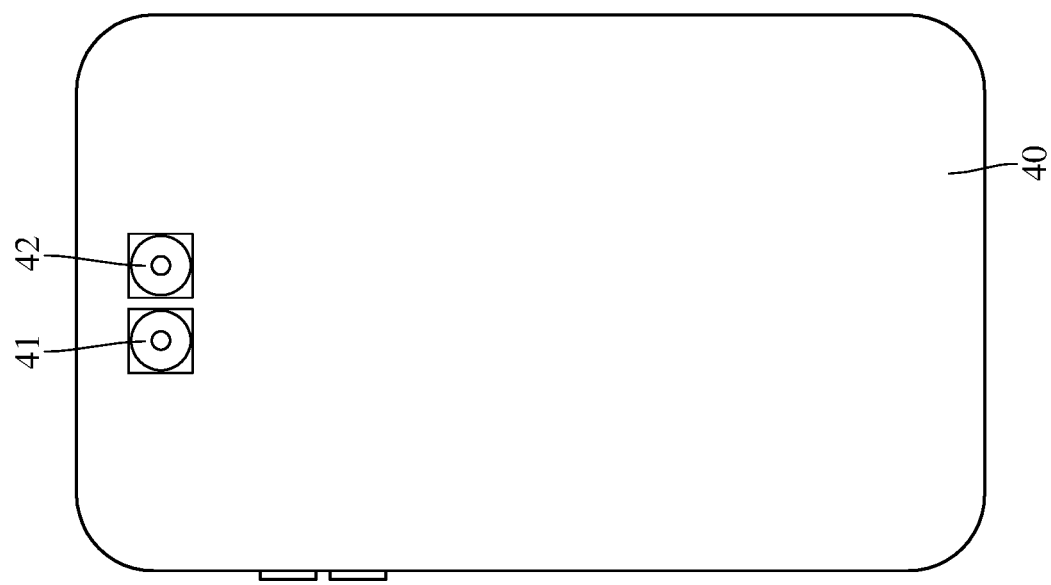
FIG. 24 is a perspective view of an electronic device according to the 14th embodiment of the present disclosure.

FIG. 24 is a perspective view of an electronic device according to the 14th embodiment of the present disclosure.

In this embodiment, an electronic device 40 is a smartphone including an image capturing unit 41, an image capturing unit 42 and a display unit (its reference number is omitted). In this embodiment, the image capturing units 41 and 42 have different fields of view (e.g., the image capturing unit 41 is a wide-angle image capturing unit and the image capturing unit 42 is a standard image capturing unit), such that the electronic device 40 has various magnification ratios so as to meet the requirement of optical zoom functionality. The image capturing unit 42 includes the photographing lens assembly disclosed in the 3rd embodiment and an image sensor (their reference numbers are omitted), but the disclosure is not limited thereto. In some other embodiments, the image capturing unit 42 may include the photographing lens assembly disclosed in another embodiment. In this embodiment, the image capturing unit 41 and 42 are both disposed on one side of the electronic device 40, while the display unit is disposed on another side of the electronic device 40.

These embodiments with smartphones are only exemplary for showing the image capturing units 10, 32, 42 of the present disclosure installed in an electronic device, and the present disclosure is not limited thereto. The image capturing units 10, 32, 42 can be optionally applied to optical systems with a movable focus. Furthermore, the photographing lens assembly of the image capturing units 10, 32, 42 features good capability in aberration corrections and high image quality, and can be applied to 3D (three-dimensional) image capturing applications, in products such as digital cameras, mobile devices, digital tablets, smart televisions, network surveillance devices, dashboard cameras, vehicle backup cameras, multi-camera devices, image recognition systems, motion sensing input devices, wearable devices and other electronic imaging devices.

The foregoing description, for the purpose of explanation, has been described with reference to specific embodiments. It is to be noted that TABLES 1-20 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. A photographing lens assembly comprising a total of eight lens elements, and the eight lens elements being, in order from an object side to an image side, a first lens element, a second lens element, a third lens element, a fourth lens element, a fifth lens element, a sixth lens element, a seventh lens element and an eighth lens element;

wherein the first lens element with positive refractive power has an object-side surface being convex in a paraxial region thereof, the second lens element has negative refractive power, the eighth lens element with negative refractive power has an object-side surface being concave in a paraxial region thereof, at least one lens element of the photographing lens assembly has at least one lens surface having at least one inflection point, and an axial distance between the second lens element and the third lens element is smaller than an axial distance between the third lens element and the fourth lens element;

wherein a focal length of the photographing lens assembly is f, a focal length of the first lens element is f1, a focal length of the third lens element is f3, a focal length of the fourth lens element is f4, a focal length of the fifth lens element is f5, a focal length of the sixth lens element is f6, a focal length of the eighth lens element is f8, an axial distance between the object-side surface of the first lens element and an image surface is TL, a maximum image height of the photographing lens assembly is ImgH, an axial distance between an image-side surface of the eighth lens element and the image surface is BL, an f-number of the photographing lens assembly is Fno, a curvature radius of an object-side surface of the fifth lens element is R9, and the following conditions are satisfied:

$|f1/f8|<1.25;$ $0.56 \leq |f/f3|+|f/f4|+|f/f5|+|f/f6|<1.50;$ $0.50<TL/\text{ImgH}<1.30;$ $4.0<\text{ImgH}/BL<20.0;$ $0.8<Fno<2.05;$ and $f5/R9<2.80.$ 2. The photographing lens assembly of claim 1, wherein the focal length of the photographing lens assembly is f, the focal length of the third lens element is f3, the focal length of the fourth lens element is f4, the focal length of the fifth lens element is f5, the focal length of the sixth lens element is f6, and the following condition is satisfied:

$0.56 \leq |f/f3|+|f/f4|+|f/f5|+|f/f6|<1.25.$

3. The photographing lens assembly of claim 1, wherein a curvature radius of the object-side surface of the eighth lens element is R15, a curvature radius of the image-side surface of the eighth lens element is R16, and the following condition is satisfied:

$(R15+R16)/(R15-R16)<0.30.$

4. The photographing lens assembly of claim 1, wherein the focal length of the photographing lens assembly is f, a curvature radius of an image-side surface of the sixth lens element is R12, and the following condition is satisfied:

$-1.25<f/R12.$

5. The photographing lens assembly of claim 1, wherein the seventh lens element has an image-side surface being concave in a paraxial region thereof, the maximum image height of the photographing lens assembly is ImgH, the axial distance between the image-side surface of the eighth lens element and the image surface is BL, and the following condition is satisfied:

$6.0<\text{ImgH}/BL<12.0.$

6. The photographing lens assembly of claim 1, wherein the seventh lens element has an object-side surface having one concave critical point in an off-axis region thereof, the seventh lens element has an image-side surface having one convex critical point in an off-axis region thereof, a vertical distance between the concave critical point on the object-side surface of the seventh lens element and an optical axis is Yc71, a vertical distance between the convex critical point on the image-side surface of the seventh lens element and the optical axis is Yc72, and the following condition is satisfied:

$0.30 < Yc71/Yc72 < 3.0$.

7. The photographing lens assembly of claim 1, wherein the maximum image height of the photographing lens assembly is ImgH, a curvature radius of the object-side surface of the first lens element is R1, and the following condition is satisfied:

$1.75 < \text{ImgH}/R1$.

8. The photographing lens assembly of claim 1, wherein a sum of axial distances between each of all adjacent lens elements of the photographing lens assembly is ΣAT, an axial distance between the seventh lens element and the eighth lens element is T78, and the following condition is satisfied:

$\Sigma AT/T78 < 3.0$.

9. The photographing lens assembly of claim 1, wherein an Abbe number of the first lens element is V1, an Abbe number of the second lens element is V2, an Abbe number of the third lens element is V3, an Abbe number of the fourth lens element is V4, an Abbe number of the fifth lens element is V5, an Abbe number of the sixth lens element is V6, an Abbe number of the seventh lens element is V7, an Abbe number of the eighth lens element is V8, an Abbe number of the i-th lens element is Vi, a refractive index of the first lens element is N1, a refractive index of the second lens element is N2, a refractive index of the third lens element is N3, a refractive index of the fourth lens element is N4, a refractive index of the fifth lens element is N5, a refractive index of the sixth lens element is N6, a refractive index of the seventh lens element is N7, a refractive index of the eighth lens element is N8, a refractive index of the i-th lens element is Ni, and at least one lens element of the photographing lens assembly satisfies the following condition:

$5.0 < Vi/Ni < 11.9$, wherein $i = 1,2,3,4,5,6,7$ or $8$.

10. The photographing lens assembly of claim 1, wherein the focal length of the first lens element is f1, a focal length of the second lens element is f2, the focal length of the third lens element is f3, the focal length of the fourth lens element is f4, the focal length of the fifth lens element is f5, the focal length of the sixth lens element is f6, a focal length of the seventh lens element is f7, and the following conditions are satisfied:

$|f1/f2| < 1.0$;

$|f1/f3| < 1.0$;

$|f1/f4| < 1.0$;

$|f1/f5| < 1.0$;

$|f1/f6| < 1.0$; and $|f1/f7| < 1.0$.

11. The photographing lens assembly of claim 1, wherein a focal length of the second lens element is f2, the focal length of the third lens element is f3, the focal length of the fourth lens element is f4, the focal length of the fifth lens element is f5, the focal length of the sixth lens element is f6, a focal length of the seventh lens element is f7, the focal length of the eighth lens element is f8, and the following conditions are satisfied:

$|f8/f2| < 1.0$;

$|f8/f3| < 1.0$;

$|f8/f4| < 1.0$;

$|f8/f5| < 1.0$;

$|f8/f6| < 1.0$; and $|f8/f7| < 1.0$.

12. The photographing lens assembly of claim 1, wherein a sum of central thicknesses of all lens elements of the photographing lens assembly is ΣCT, a sum of axial distances between each of all adjacent lens elements of the photographing lens assembly is ΣAT, and the following condition is satisfied:

$0.80 < \Sigma CT/\Sigma AT < 1.60$.

13. The photographing lens assembly of claim 1, wherein the maximum image height of the photographing lens assembly is ImgH, a maximum effective radius of the object-side surface of the first lens element is Y11, and the following condition is satisfied:

$2.5 < \text{ImgH}/Y11 < 5.0$.

14. The photographing lens assembly of claim 1, wherein the focal length of the photographing lens assembly is f, a curvature radius of an object-side surface of one lens element of the photographing lens assembly is Ro, a curvature radius of an image-side surface of the lens element of the photographing lens assembly is Ri, a total number of lens elements satisfying the condition of $f/|Ro| + f/|Ri| < 0.8$ in the photographing lens assembly is NLR_80, and the following condition is satisfied:

$1 \leq NLR\_80$.

15. The photographing lens assembly of claim 1, wherein the object-side surface of the eighth lens element has one convex critical point in an off-axis region thereof, a vertical distance between the convex critical point on the object-side surface of the eighth lens element and an optical axis is Yc81, the maximum image height of the photographing lens assembly is ImgH, and the following condition is satisfied:

$0.20 < Yc81/\text{ImgH} < 0.80$.

16. An image capturing unit, comprising:
the photographing lens assembly of claim 1; and
an image sensor disposed on the image surface of the photographing lens assembly.

17. An electronic device, comprising:
the image capturing unit of claim 16.

* * * * *